United States Patent
Wang et al.

(10) Patent No.: US 12,445,316 B2
(45) Date of Patent: Oct. 14, 2025

(54) BLOCKCHAIN DATA PROCESSING METHOD, APPARATUS, AND DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Zongyou Wang, Shenzhen (CN); Jun Liang, Shenzhen (CN); Like Shu, Shenzhen (CN); Hu Lan, Shenzhen (CN); Yifang Shi, Shenzhen (CN); Zhiyong Liao, Shenzhen (CN); Qucheng Liu, Shenzhen (CN); Hanqing Liu, Shenzhen (CN); Yangjun Huang, Shenzhen (CN); Kaixuan Nie, Shenzhen (CN); Gengliang Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 139 days.

(21) Appl. No.: 18/510,310

(22) Filed: Nov. 15, 2023

(65) Prior Publication Data
US 2024/0205032 A1    Jun. 20, 2024

Related U.S. Application Data

(63) Continuation of application No. PCT/CN2023/114284, filed on Aug. 22, 2023.

(30) Foreign Application Priority Data

Dec. 15, 2022  (CN) .......................... 202211637944.0
Dec. 15, 2022  (CN) .......................... 202211637945.5

(51) Int. Cl.
*H04L 29/06* (2006.01)
*H04L 9/00* (2022.01)

(52) U.S. Cl.
CPC ....................................... *H04L 9/50* (2022.05)

(58) Field of Classification Search
None
See application file for complete search history.

(56) References Cited

U.S. PATENT DOCUMENTS

2019/0332702 A1    10/2019   Manamohan et al.
2020/0125738 A1*   4/2020    Mahatwo ................ H04L 63/20
(Continued)

FOREIGN PATENT DOCUMENTS

CN    110598446 A  * 12/2019 .......... G06F 11/3409
CN    110601857 A     12/2019
(Continued)

OTHER PUBLICATIONS

CN-110598446-Translation (Year: 2019).*
(Continued)

*Primary Examiner* — Shin-Hon (Eric) Chen
(74) *Attorney, Agent, or Firm* — Morgan, Lewis & Bockius LLP

(57) ABSTRACT

A blockchain data processing method is performed by an electronic device. The method includes: packaging a local consensus transaction, a main chain binding height, and a main chain read dataset into a local consensus block; broadcasting the local consensus block to a local verification node, where the local verification node is configured to obtain obtaining a voting consensus result corresponding to a transaction execution result of the local consensus transaction when a synchronized block height is greater than or equal to the main chain binding height, and a synchronized read dataset is consistent with the main chain read dataset;

(Continued)

and uploading, when determining that consensus is reached based on the voting consensus result returned by the local verification node, the local consensus block to a local consensus sub-chain corresponding to a local consensus network.

20 Claims, 20 Drawing Sheets

(56) References Cited

U.S. PATENT DOCUMENTS

| | | | | |
|---|---|---|---|---|
| 2020/0366495 | A1 | 11/2020 | Mahoney | |
| 2021/0326484 | A1* | 10/2021 | Zeng | G06F 21/64 |
| 2022/0182375 | A1* | 6/2022 | Xu | H04L 63/126 |
| 2023/0316273 | A1* | 10/2023 | Zhu | G06Q 20/3825 705/75 |
| 2023/0353394 | A1* | 11/2023 | Zhu | H04L 9/50 |
| 2023/0360046 | A1* | 11/2023 | Zhu | G06Q 40/123 |
| 2024/0205032 | A1* | 6/2024 | Wang | H04L 9/3239 |
| 2024/0235860 | A9* | 7/2024 | Zhu | H04L 9/006 |

FOREIGN PATENT DOCUMENTS

| | | | | |
|---|---|---|---|---|
| CN | 112541758 | A | 3/2021 | |
| CN | 113067707 | A | 7/2021 | |
| CN | 113253995 | A * | 8/2021 | G06F 8/30 |
| CN | 113421097 | B * | 11/2021 | G06Q 20/3825 |
| CN | 114511319 | A | 5/2022 | |

OTHER PUBLICATIONS

CN-113253995-Translation (Year: 2021).*
CN-113421097-Translation (Year: 2021).*
Tencent Technology, ISR, PCT/CN2023/114284, Nov. 21, 2023, 2 pgs.

* cited by examiner

BLOCKCHAIN DATA PROCESSING METHOD, APPARATUS, AND DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2023/114284, entitled "BLOCKCHAIN DATA PROCESSING METHOD, APPARATUS, AND DEVICE, COMPUTER-READABLE STORAGE MEDIUM, AND COMPUTER PROGRAM PRODUCT" filed on Aug. 22, 2023, which is based on and claims priority to Chinese Patent Applications No. 202211637945.5 and 202211637944.0, filed both on Dec. 15, 2022, all of which are incorporated herein by reference in their entireties.

FIELD OF THE TECHNOLOGY

This application relates to the field of blockchain technologies, and in particular, to a blockchain data processing method, apparatus, and device, a computer-readable storage medium, and a computer program product.

BACKGROUND OF THE DISCLOSURE

In a single blockchain including a service network and a core consensus network, a service node located in the service network needs to rely on a consensus node deployed in the core consensus network for transaction packaging and block consensus. Therefore, a service node deployed in a service network of a single blockchain system does not participate in the block consensus, but serves as a ledger synchronization tool for a single chain involved in the single blockchain system.

It was found that, since a blockchain involved in the single blockchain system is the single chain, service transactions submitted by different service parties through different service nodes are collectively submitted to the core consensus network. In this way, the obtained transactions may be packaged in a unified manner by the consensus node (for example, a packaging node) in the core consensus network. As a result, a block that participates in consensus on the single chain includes service transactions related to different service parties. Based on this, any block on the single chain includes service transactions submitted by different service parties through different service nodes. Therefore, when a specific service node (for example, a service node A) in the service network synchronizes from the single chain of the core consensus network to a corresponding block, the service node not only synchronizes to ledger data of transactions related to the service node, but also synchronizes to ledger data of transactions related to other service parties, thereby affecting security and privacy of transaction data on the chain.

SUMMARY

Embodiments of this application provide a blockchain data processing method, apparatus, and device, a computer-readable storage medium, and a computer program product, to improve security and privacy of transaction data on the chain.

An embodiment of this application provides a blockchain data processing method, performed by a local consensus node in a local consensus network, the local consensus network being deployed in a service network of a multi-layer chain network, a core consensus network independent of the service network being further deployed in the multi-layer chain network, and the core consensus network including a core consensus node; and the method including:
 packaging a local consensus transaction, a main chain binding height, and a main chain read dataset into a local consensus block, the local consensus transaction being a service transaction executed in the local consensus network, the main chain binding height being a block height of a first global consensus block, the first global consensus block being synchronized from a main chain of the core consensus node when packaging the local consensus transaction, the main chain read dataset being obtained by clearing from a first global contract state and being used for executing the local consensus transaction, and the first global contract state being a read dataset that is read when a global consensus transaction in the first global consensus block is executed;
 broadcasting the local consensus block to a local verification node, the local verification node being configured to obtain a voting consensus result corresponding to a transaction execution result of the local consensus transaction when a synchronized block height is greater than or equal to the main chain binding height, and a synchronized read dataset is consistent with the main chain read dataset, and the local verification node being a consensus node other than the local consensus node in the local consensus network: and
 when determining that consensus is reached based on the voting consensus result returned by the local verification node, uploading the local consensus block to a local consensus sub-chain corresponding to the local consensus network, and writing the local consensus block into a local consensus ledger database.

An embodiment of this application provides a blockchain data processing method. The method is performed by a core consensus node in a core consensus network: the core consensus network is deployed in a multi-layer chain network: a local consensus network is deployed in a service network independent of the core consensus network in the multi-layer chain network, where the local consensus network includes a local consensus node, and the method includes:
 obtaining a main chain synchronization request transmitted by the local consensus node, the main chain synchronization request carrying a block height of a third global consensus block, and the third global consensus block being a global consensus block that the local consensus node synchronizes from a main chain before synchronizing a first global consensus block;
 determining, from the main chain, a global consensus block whose block height is greater than the block height of the third global consensus block as the first global consensus block that is not synchronized to the local consensus node;
 obtaining a first global contract state of the first global consensus block from the main chain: the first global contract state being a read dataset that is read when a global consensus transaction in the first global consensus block is executed; and
 returning the first global consensus block and the first global contract state to the local consensus node, the local consensus node being configured to package a local consensus transaction, a main chain binding height, and a main chain read dataset into a local consensus block based on a block height of the first global consensus block and the first global contract state, and upload the local consensus block to the local consensus network when reaching consensus on the local consensus block based on the local consensus network.

An embodiment of this application provides a first blockchain data processing apparatus, running on a local consensus node in a local consensus network, the local consensus network being deployed in a service network of a multi-layer chain network, a core consensus network independent of the service network being further deployed in the multi-layer chain network, the core consensus network including a core consensus node, and the first blockchain data processing apparatus including:

a packaging module, configured to package a local consensus transaction, a main chain binding height, and a main chain read dataset into a local consensus block, the local consensus transaction being a service transaction executed in the local consensus network, the main chain binding height being a block height of a first global consensus block, the first global consensus block being synchronized from a main chain of the core consensus node when packaging the local consensus transaction, the main chain read dataset being obtained by clearing from a first global contract state and being used for executing the local consensus transaction, and the first global contract state being a read dataset that is read when a global consensus transaction in the first global consensus block is executed;

a consensus module, configured to broadcast the local consensus block to a local verification node, the local verification node being configured to obtain a voting consensus result corresponding to a transaction execution result of the local consensus transaction when a synchronized block height is greater than or equal to the main chain binding height, and a synchronized read dataset is consistent with the main chain read dataset, and the local verification node being a consensus node other than the local consensus node in the local consensus network: and a processing module, configured to, when determining that consensus is reached based on the voting consensus result returned by the local verification node, upload the local consensus block to a local consensus sub-chain corresponding to the local consensus network, and write the local consensus block into a local consensus ledger database.

An embodiment of this application provides a second blockchain data processing apparatus, running on a core consensus node in a core consensus network, and the core consensus network being deployed in a multi-layer chain network: a local consensus network being deployed in a service network in the multi-layer chain network, and the local consensus network being constructed by the core consensus node that is in the core consensus network and that is independent of the service network: and the second blockchain data processing apparatus including:

an obtaining module, configured to obtain a main chain synchronization request transmitted by the local consensus node, the main chain synchronization request carrying a block height of a third global consensus block, and the third global consensus block being a global consensus block that the local consensus node synchronizes from a main chain before synchronizing a first global consensus block;

a determining module, configured to determine, from the main chain, a global consensus block whose block height is greater than the block height of the third global consensus block as the first global consensus block that is not synchronized to the local consensus node;

the obtaining module being further configured to obtain a first global contract state of the first global consensus block from the main chain: the first global contract state being a read dataset that is read when a global consensus transaction in the first global consensus block is executed: and a data returning module, configured to return the first global consensus block and the first global contract state to the local consensus node, the local consensus node being configured to package a local consensus transaction, a main chain binding height, and a main chain read dataset into a local consensus block based on the block height of the first global consensus block and the first global contract state, and upload the local consensus block to the local consensus network when reaching consensus on the local consensus block based on the local consensus network.

An embodiment of this application provides an electronic device for blockchain data processing. The electronic device includes a memory and a processor. The memory is connected to the processor. The memory is configured to store a computer program, and the processor is configured to invoke the computer program, to enable the electronic device to perform the blockchain data processing method applied in the local consensus node provided in this embodiment of this application, or to enable the electronic device to perform the blockchain data processing method applied in the core consensus node provided in this embodiment of this application.

An embodiment of this application provides a computer-readable storage medium, storing a computer program, the computer program being loaded and executed by a processor, to enable an electronic device to perform the blockchain data processing method applied in the local consensus node provided in this embodiment of this application, or to enable the electronic device to perform the blockchain data processing method applied in the core consensus node provided in this embodiment of this application.

An embodiment of this application provides a computer program product, including a computer program or computer-executable instructions, the computer program or computer-executable instructions, when executed by a processor, implementing the blockchain data processing method applied in the local consensus node provided in this embodiment of this application, or implementing the blockchain data processing method applied in the core consensus node provided in this embodiment of this application.

In this embodiment of this application, a to-be-uploaded local consensus block may establish an association relationship with the main chain through the main chain binding height and the main chain read dataset, perform block consensus through the local consensus block and the local verification node in the local consensus network, and when determining that block consensus is reached, upload the local consensus block to the local consensus sub-chain, and write the local consensus block into the local consensus ledger database that is independent of the main chain sub-ledger database. Through the foregoing process, block consensus on the local consensus block may be implemented in the local consensus network. The local consensus block on which block consensus is reached is written into the local consensus sub-chain, so that transaction data involved in the transaction executed in the local consensus network may be stored in the associated local consensus sub-chain, to implement level independent management of transaction data of a service transaction of each service party, and to implement isolation of different service data, thereby improving security and privacy of the transaction data on the chain.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and other embodiments also are contemplated and can be understood from the accompanying drawings.

DESCRIPTION OF EMBODIMENTS

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person skilled in the art based on the embodiments of this application without creative efforts shall fall within the protection scope of this application.

Figure 1:
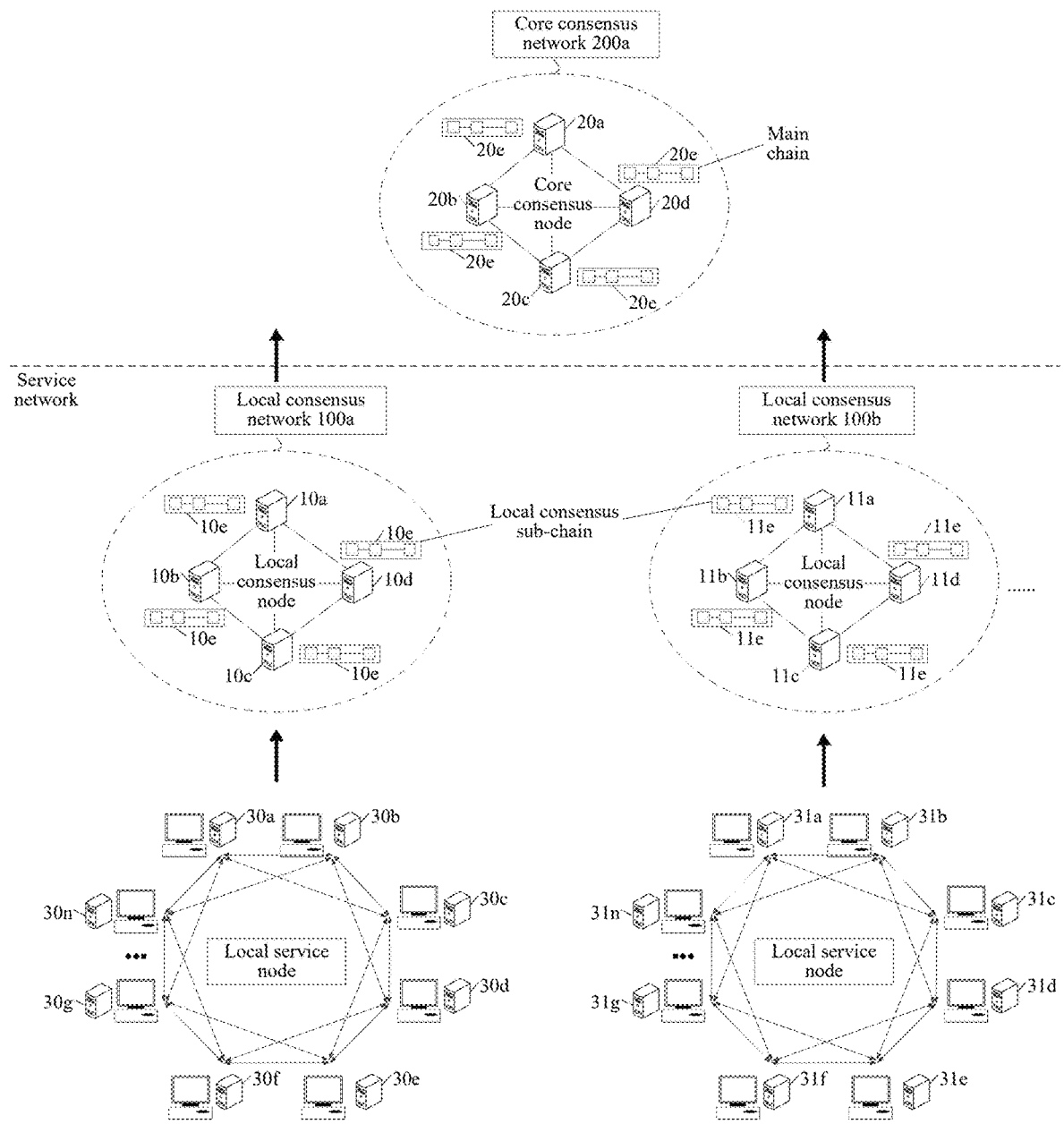
FIG. 1 is a schematic diagram of an architecture of a multi-layer chain network according to an embodiment of this application.

FIG. 1 is a schematic diagram of an architecture of a multi-layer chain network according to an embodiment of this application. As shown in FIG. 1, the architecture of the multi-layer chain network may be applied to a blockchain-based data system (hereinafter referred to as a blockchain system), such as a blockchain electronic bill system. A blockchain network corresponding to the blockchain data system may be the multi-layer chain network. The multi-layer chain network includes a service network and a core consensus network. The service network is in a public network, and the core consensus network is in a private network (for example, a private cloud); and one or more local consensus networks that are independent of each other may be deployed in the service network. The local consensus network in the service network may be represented as a local consensus network 100a, a local consensus network 100b, and the like shown in FIG. 1. Only two local consensus networks are exemplified herein. A quantity of local consensus networks is not limited herein, and the core consensus network may be represented as a core consensus network 200a shown in FIG. 1.

In the local consensus network 100a as shown in FIG. 1, a plurality of local consensus nodes are deployed, and for example, a local consensus node 10a, a local consensus node 10b, a local consensus node 10c, and a local consensus node 10d are shown. A quantity of local consensus nodes deployed in the local consensus network 100a is not limited herein. With the change of service requirements, the quantity of local consensus nodes may change continuously. The local consensus node in the local consensus network 100a has a block consensus function, and may maintain a local consensus sub-chain associated with the local consensus network 100a. For example, a blockchain jointly maintained by the plurality of local consensus nodes in the local consensus network 100a is a local consensus sub-chain 10e. In addition, the service network further includes one or more local service nodes that have a network connection relationship with the local consensus network 100a. For example, a local service node 30a, a local service node 30b, a local service node 30c, a local service node 30d, a local service node 30e, a local service node 30f, a local service node 30g, . . . , and a local service node 30n are shown. A quantity of local service nodes is not limited herein. For example, the local consensus sub-chain in the local consensus network 100a is a blockchain independently managed by a service party A, and the local service node that has a network connection relationship with the local consensus network 100a is a local service node corresponding to the service party A. The local service node that has the network connection relationship with the local consensus network 100a may submit a to-be-processed service transaction (such as a service transaction A) to the local consensus node in the local consensus network 100a, and the local consensus node in the local consensus network 100a packages the service transaction A into a local consensus block A; and finally, after block consensus is reached for the local consensus block A in the local consensus network 100a, the local consensus node in the local consensus network 100a uploads the local consensus block A to the local consensus sub-chain 10e.

Similarly, in the local consensus network 100b as shown in FIG. 1, a plurality of local consensus nodes are deployed, and for example, a local consensus node 11a, a local consensus node 11b, a local consensus node 11c, and a local consensus node 11d are shown. A quantity of local consensus nodes deployed in the local consensus network 100b is not limited herein. With the change of service requirements, the quantity of local consensus nodes may change continuously. The local consensus node in the local consensus network 100b has a block consensus function, and may maintain a local consensus sub-chain associated with the local consensus network 100b. For example, a blockchain jointly maintained by the plurality of local consensus nodes in the local consensus network 100b is a local consensus sub-chain 11e. In addition, the service network further includes one or more local service nodes that have a network connection relationship with the local consensus network 100b. For example, a local service node 31a, a local service node 31b, a local service node 31c, a local service node 31d, a local service node 31e, a local service node 31f, a local service node 31g, . . . , and a local service node 31n are shown. A quantity of local service nodes is not limited herein. For example, the local consensus sub-chain in the local consensus network 100b is a blockchain independently managed by a service party B, and the local service node that has a network connection relationship with the local consensus network 100b is a local service node corresponding to the service party B. The local service node that has the network connection relationship with the local consensus network 100b may submit a to-be-processed service transaction (such as a service transaction B) to the local consensus node in the local consensus network 100b, and the local consensus node in the local consensus network 100b packages the service transaction B into a local consensus block B; and finally, after block consensus is reached for the local consensus block B in the local consensus network 100b, the local consensus node in the local consensus network 100b uploads the local consensus block B to the local consensus sub-chain 11e.

Correspondingly, in the core consensus network 200a as shown in FIG. 1, a plurality of core consensus nodes are deployed, and for example, a core consensus node 20a, a core consensus node 20b, a core consensus node 20c, and a core consensus node 20d are shown. A quantity of core consensus nodes deployed in the core consensus network 200a is not limited herein. With the change of service requirements, the quantity of core consensus nodes may change continuously. In addition, a blockchain jointly maintained by the plurality of core consensus nodes in the core consensus network 200a is a main chain 20e. It is to be understood that a local consensus node in each local consensus network may synchronize a global consensus block on a main chain from the main chain. It is to be understood that the local consensus network is created through the core consensus node. In other words, a service object (such as a service party) may transmit a registration transaction and a configuration transaction for a local consensus sub-chain to the core consensus node, to activate the local consensus network, so that a genesis block in the local consensus sub-chain may be created on the local consensus node to start the local consensus sub-chain, thereby completing creation of the local consensus network and the local consensus sub-chain.

The local consensus node is a global service node corresponding to the core consensus node. In other words, the local consensus node may not only synchronize data on the main chain through the core consensus node, but also generate a service transaction and transmit the service transaction to the core consensus node. For example, the local consensus node may perform transaction summarization processing on a transaction execution result corresponding to the local consensus transaction in the local consensus network, to obtain transaction summarization information, generate an information on-chain transaction carrying the transaction summarization information, and finally transmits the information on-chain transaction to the core consensus node. The core consensus node writes the information on-chain transaction into the main chain.

A service transaction processed in the core consensus network is referred to as a global consensus transaction, and a service transaction processed in the local consensus network is referred to as the local consensus transaction. The global consensus transaction and the local consensus transaction may be different. Through a consensus mechanism for a local consensus block extracted in this embodiment of this application, consensus and on-chain processing on the local consensus block are implemented in the local consensus network, to move some global consensus transactions that may only be processed by the core consensus node in the core consensus network to the local consensus network and be executed by the local consensus node: in other words, move this part to the global consensus transaction in the local consensus network as the local consensus transaction, and write transaction data involved in the local consensus transaction into the local consensus sub-chain; and in this way, security of the transaction data involved in the local consensus transaction may be improved, and a service processing load may be shared for the core consensus network through the local consensus network, thereby reducing data confusion and stability on the main chain. In addition, a read dataset that needs to be read when executing the local consensus transaction may partially come from data obtained by clearing from the main chain. For example, the local consensus node may obtain global contract state data by clearing from the main chain. The global contract state data may refer to a read dataset that is read when global consensus on the main chain is invoked to execute the global consensus transaction. Therefore, when executing the local consensus transaction, reference may be made to the data on the main chain, to reuse contract state data on the main chain.

In the blockchain data system, the core consensus node is configured to perform consensus in the core consensus network in which a corresponding main chain is located. The local consensus node is configured to perform consensus in the local consensus network in which a corresponding local consensus sub-chain is located. A principle in which the core consensus network or any local consensus network writes transaction data involved in the service transaction into a corresponding blockchain ledger (for example, a distributed database) is the same. Using the local consensus network as an example, a process of writing the transaction data in the local consensus network into the corresponding blockchain ledger may be: A client transmits the transaction data to a specific local service node, and then the transaction data is transmitted between local service nodes in the local consensus network in the form of a baton, until a designated local consensus node (for example, the local consensus node 10a in the local consensus network 100a) in the local consensus network receives the transaction data. In this case, the local consensus node packages the transaction data into a block, to perform block consensus with other local consensus nodes subsequently. Therefore, after the block consensus is passed, the local consensus block that passes the consensus may be written into a distributed database of the local consensus network (for example, the local consensus network 100a) in which the block is located.

It is to be understood that a blockchain is a new application mode of computer technologies such as distributed data storage, point-to-point transmission, a consensus mechanism, and an encryption algorithm. The blockchain is used for organizing data in chronological order and encrypt the data into a ledger, making it impossible to be tampered with and forged, and may simultaneously verify, store, and update the data. The blockchain is essentially a decentralized database. Each node in the database stores an identical blockchain. A blockchain network divides the nodes into a core node and a light node (for example, may be referred to as an SPV node), where the core node is configured to perform consensus on the entire blockchain network. In other words, the core node is a consensus node in the blockchain network. A process of writing transaction data in the blockchain network into a ledger (for example, a local ledger) includes: The client transmits the transaction data to the light node, and then the transaction data is transmitted between the light nodes in the blockchain network in the form of a baton, until the consensus node receives the transaction data. The consensus node then packages the transaction data into a block, to perform consensus with other consensus nodes subsequently. Therefore, after the consensus is passed, at least one block carrying the transaction data may be written into the distributed database in parallel through a storage layer. In this way, a limitation of a blockchain structure of the blockchain may be fundamentally broke through, which may effectively improve storage efficiency of data storage. It is to be understood that the consensus node in the core consensus network is the core consensus node (the core consensus node 20a in the core consensus network 200a as shown in FIG. 1). A consensus node in the local consensus network is both a core node having a block consensus capability in the local consensus network and a light node (for example, the local consensus node 11a in the local consensus network 100b as shown in FIG. 1) that may clear the transaction data from the main chain in the service network.

It is to be understood that the blockchain system may include a smart contract. In the blockchain system, the smart contract is code executed by each node (including the consensus node) of the blockchain. Through the smart contract, any logic may be executed and a result is obtained. For example, when one transaction service request is initiated through the client, in response to the transaction service request, the smart contract that has been deployed on the blockchain is invoked. Subsequently, the data node or the light node on the blockchain may transmit the transaction service request to the consensus node, to invoke the smart contract running in each consensus node to execute the transaction service. It is to be understood that the blockchain may include one or more smart contracts. The smart contracts may be distinguished by a contract invoking address, a contract identity document (ID), or a contract name. The transaction service request initiated by the client may also carry the contract invoking address, the contract identity document, or the contract name of the smart contract, to specify a smart contract that needs to be run. If the smart contract specified by the client is a contract (namely, a service contract) that needs to read data, each consensus node first accesses a local cache at the storage layer to read the data. Finally, each consensus node verifies with each other whether execution results of each transaction are consistent (to be specific, performing consensus). If yes, a transaction execution result may be stored in respective local caches and local storage, and the transaction execution result of the transaction service may be returned to the client. The local cache is a system memory created in the storage layer, and the local storage is a hard disk space created in the storage layer for data storage. In this way, when a specific consensus node crashes or a system failure occurs, a phenomenon that the data in the system memory disappears, resulting in the data failing to be read does not occur. In other words, the consensus node may further read data through the local storage in the storage layer.

It is to be understood that in the blockchain data system, a peer-to-peer (P2P) network may be formed between any two blockchain nodes in any consensus network (for example, the local consensus network 100a or the core consensus network 200a). The P2P network may use a P2P protocol, where the P2P network is an application-layer protocol running over a transmission control protocol (TCP). Any device such as a server or a terminal may be added to the distributed system to become a blockchain node. Each blockchain node may include a hardware layer, an intermediate layer, an operating system layer, and an application layer.

It is to be understood that this embodiment of this application may bind one blockchain node to any type of service party (for example, entity objects such as any individual user, any enterprise, any institution, and the like) that accesses the blockchain network, so that a blockchain network including these blockchain nodes is collectively referred to as a consortium chain network. Therefore, there may be a one-to-one correspondence between the local consensus node 10a, the local consensus node 10b, and the like as shown in FIG. 1 and the corresponding service parties (namely, entity objects in a corresponding service scenario) to be accessed in the consortium chain network. The service scenarios may include an electronic bill scenario, a social scenario, a credit purchase scenario, a credit scenario, and the like. In this case, a target service in the corresponding service scenario may specifically include an electronic bill service, a social service, a credit purchase service, a credit service, and the like. Specific services in the corresponding service scenario are not listed one-by-one herein. Therefore, this embodiment of this application may be applied to any service scenario in which a blockchain network may be deployed, and the blockchain data system may also be adapted to a service scenario of a specific application.

It is to be understood that in different application scenarios, a service transaction executed on the local consensus network and a service party initiating the service transaction may be different. In other words, the local consensus network may be created based on different types of service parties. For example, service parties may be divided according to regions, and service parties in different regions access the local consensus network corresponding to their respective regions. For example, the main chain may be used for storing transaction data related to the national bill service. A service party in a region A may access a local consensus network A corresponding to the region A, to perform bill service transaction (such as performing a bill lottery service related to the region A in the region A) related to the region A in the local consensus network A. In this case, a local consensus sub-chain in the local consensus network A may be used for storing transaction data related to a bill service of the region A: and a service party in a region B may access a local consensus network B corresponding to the region B, to perform bill service transaction (such as performing a bill lottery service related to the region B in the region B) related to the region B in the local consensus network B. In this case, a local consensus sub-chain in the local consensus network B may be used for storing transaction data related to a bill service of the region B. In other words, through this embodiment of this application, a local consensus sub-chain that is independent of the main chain and exclusively serves various service parties may be built for various service parties. Service transactions related to each service party may be performed in local consensus networks corresponding to various service parties respectively, and transaction data involved in service transactions related to each service party is packaged and uploaded to the local consensus sub-chain associated with each service party. This may implement security, privacy, and data isolation of the transaction data.

Figure 2:
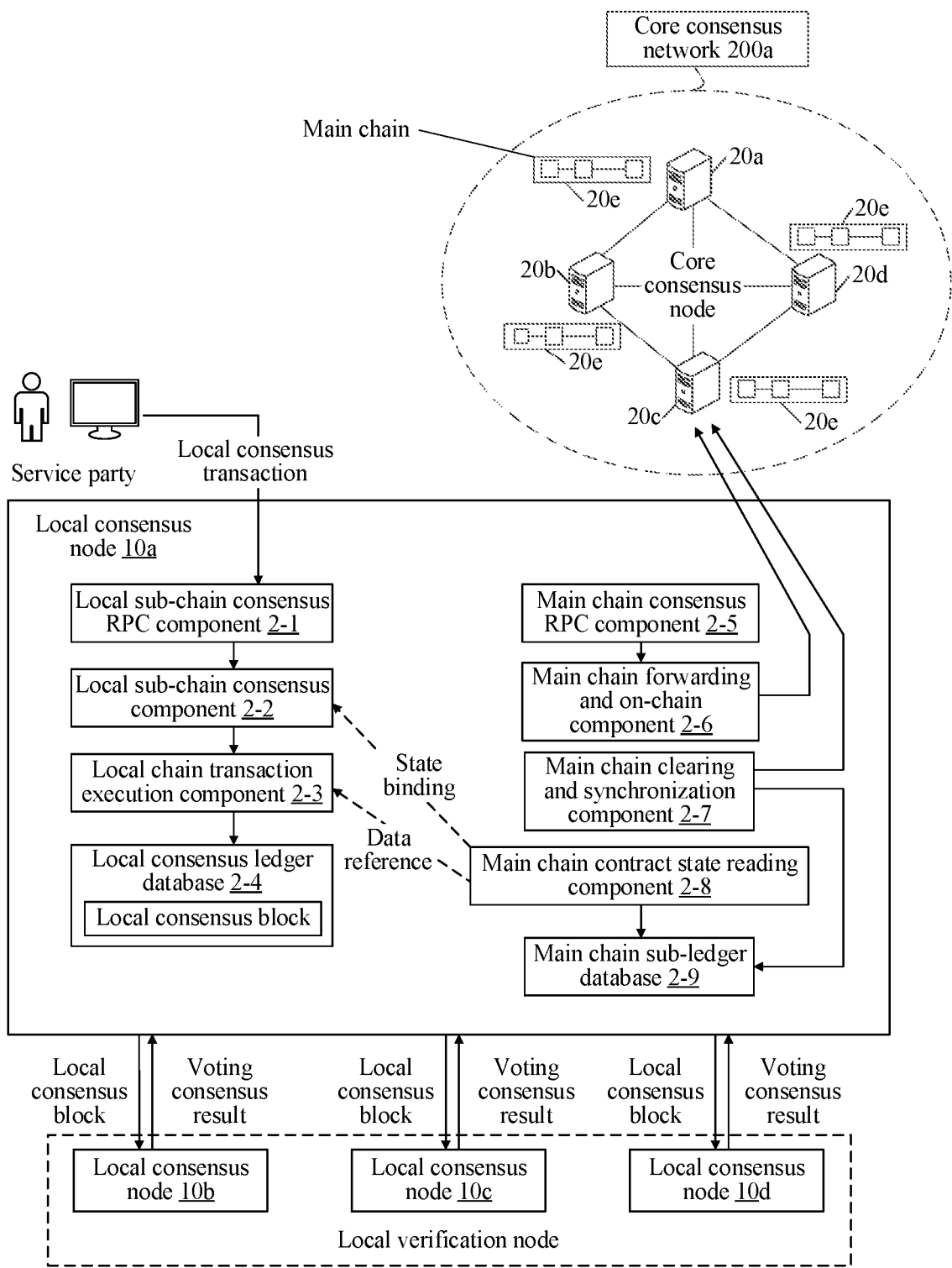
FIG. 2 is a schematic diagram of a block consensus scenario based on a local consensus network according to an embodiment of this application.

For ease of understanding, based on FIG. 1, FIG. 2 is a schematic diagram of a block consensus scenario based on a local consensus network according to an embodiment of this application. In this scenario, a consensus mechanism for a local consensus block is proposed. Through the consensus mechanism for the local consensus block, block consensus on a local consensus block that is different from the global consensus block on the main chain may be implemented in the local consensus network, and the block may be uploaded after the block consensus is reached, so that the local consensus network has a local consensus sub-chain that is different from the main chain. In addition, there is an association relationship between the local consensus block on the local consensus sub-chain and the main chain, to facilitate management of the local consensus sub-chain by the main chain. The local consensus node proposed in this embodiment of this application may be any local consensus node (such as the local consensus node 10*a*, the local consensus node 10*b*, or the local consensus node 10*c* in the local consensus network 100*a*) in FIG. 1. Block consensus and an on-chain process of the local consensus block may be: The local consensus node obtains a cached local consensus transaction from a transaction pool, to package the obtained local consensus transaction into the proposed block. In this case, a main chain binding height and a main chain read dataset may be obtained from a main chain sub-ledger database of the local consensus node, and the main chain binding height, the main chain read dataset, and the local consensus transaction may be jointly packaged into the proposed block. In this case, the proposed block including the main chain binding height, the main chain read dataset, and the local consensus transaction may be used as a local consensus block on which consensus is to be reached. When performing block consensus on the local consensus block, the local consensus block is broadcast to a local verification node (namely, the consensus node in the local consensus network other than the local consensus node) in the local consensus network. The local verification node may perform data review on the main chain binding height and the main chain read dataset in the local consensus block, and perform voting consensus on a transaction execution result obtained by executing the local consensus transaction when the data review succeeds, to obtain a voting consensus result. The local consensus node receives the voting consensus result returned by the local verification node, when determining that the block consensus is reached based on the voting consensus result, indicates that a consensus process on the local consensus block is completed, may upload the local consensus block to the maintained local consensus sub-chain, and write the local consensus block into the local consensus ledger database that is independent of the main chain sub-ledger database.

It is to be understood that the main chain read dataset refers to data that needs to be read from the main chain when executing the local consensus transaction, such as a global contract state of a global consensus service contract. Through the main chain binding height and the main chain read dataset, the local consensus block may have an association relationship with the main chain. In this way, the main chain read dataset may be referenced when executing the local consensus transaction in the local consensus block, and through the main chain binding height, each consensus node (namely, the local consensus node and the local verification node) verifies consistency of the main chain read dataset when performing data review on the main chain read dataset, to ensure that the transaction execution result of the local consensus transaction that is executed based on the main chain read dataset is consistent.

In addition, after the local consensus node broadcasts the local consensus block on which consensus is to be reached to the local verification node, both the local consensus node and the local verification node perform block consensus on the local consensus block in the same step. Using one consensus node as an example, a process of performing block consensus may be: performing data review on the main chain binding height and the main chain read dataset in the local consensus block, when the data review succeeds, executing the local consensus transaction in the local consensus block to obtain the transaction execution result, and verifying the transaction execution result (namely, the block consensus result) obtained by each consensus node with other consensus nodes, when determining that transaction execution results obtained by a specific quantity of consensus nodes are consistent with the transaction execution result that is obtained by the local consensus transaction, generating a voting consensus result indicating that the transaction results are consistent (to be specific, performing voting consensus), and when receiving voting consensus results returned by other consensus nodes and determining that a specific quantity of voting consensus results among the current voting consensus results indicate that the transaction results are consistent, determining that the block consensus is reached, and uploading the local consensus block to the maintained local consensus sub-chain. In other words, after the local consensus node broadcasts the local consensus block to the local verification node, and block consensus needs to be performed on both the local consensus node and the local verification node, block consensus operations that are performed are the same. For example, the local consensus node 10a uses the transaction execution result obtained by executing the local consensus transaction as a first transaction result, and obtains the transaction execution results obtained by the local consensus node 10b to the local consensus node 10d. The transaction execution results obtained by the local consensus node 10b to the local consensus node 10d are used as a second transaction result. The first transaction result is compared with the second transaction result. If it is determined that a specific quantity of second transaction results is the same as the first transaction result, it indicates that the transaction execution results are consistent. In this case, a voting consensus result indicating voting approval is generated. In another example, the local consensus node 10a obtains the voting consensus results obtained by the local consensus node 10b to the local consensus node 10d. If a quantity of results indicating voting approval among the voting consensus results obtained by the local consensus node 10a to the local consensus node 10d reaches a specific quantity, it indicates that the block consensus is reached.

It is to be understood that when performing block consensus, each local consensus node not only performs data review on the main chain binding height and the main chain read dataset, but also performs voting consensus on the transaction execution result, and determines whether block consensus is reached based on the voting consensus result obtained and received by each local consensus node. For example, in the local consensus network 100a in FIG. 1, when the local consensus node 10a broadcasts the local consensus block to the local consensus node 10b, the local consensus node 10c, and the local consensus node 10d, for the local consensus node 10a, the local consensus node 10b, the local consensus node 10c, and the local consensus node 10d are local verification nodes: for the local consensus node 10b, the local consensus node 10a, the local consensus node 10c, and the local consensus node 10d are local verification nodes: for the local consensus node 10c, the local consensus node 10b, the local consensus node 10a, and the local consensus node 10d are local verification nodes: for the local consensus node 10d, the local consensus node 10b, the local consensus node 10c, and the local consensus node 10a are local verification nodes; and the local consensus node 10a to the local consensus node 10d all perform data review on the main chain binding height and the main chain read dataset in the local consensus node, perform voting consensus on the transaction execution result (the transaction execution result also refers to the block consensus result obtained by performing block consensus on the local consensus block) obtained by executing the local consensus transaction and obtain the voting consensus result when the data review succeeds, and transmit the voting consensus result to the remaining local consensus nodes respectively (for example, the local consensus node 10a transmits the voting consensus result to the local consensus node 10b to the local consensus node 10d). The local consensus node 10a to the local consensus node 10d determine whether the block consensus is reached based on their own voting consensus results and the received voting consensus result, and when determining that the block consensus is reached, upload the local consensus block, to implement building of the local consensus sub-chain.

The local consensus node (such as the local consensus node 10a) may include: a local sub-chain consensus remote procedure call (RPC) component 2-1, a local sub-chain consensus component 2-2, a local chain transaction execution component 2-3, a local consensus ledger database 2-4, a main chain consensus RPC component 2-5, a main chain forwarding and on-chain component 2-6, a main chain clearing and synchronization component 2-7, a main chain contract state reading component 2-8, and a main chain sub-ledger database 2-9. It is to be understood that the local consensus node includes two parts (a part 1 corresponds to 2-1 to 2-4 shown in FIG. 2, and a part 2 corresponds to 2-5 to 2-9 shown in FIG. 2). The part 1 is used for receiving the local consensus transaction, packaging the local consensus transaction into the local consensus block, and performing block consensus and on-chain processing on the local consensus block: and the part 2 is used for synchronizing main chain data, and obtaining the main chain data (such as the global contract state that needs to be referenced from the main chain when executing local consensus transaction) related to the part 2 by clearing from the synchronized main chain data, and may further generate a service transaction that needs to be executed by the main chain and perform forwarding and on-chain processing on the service transaction. The local consensus ledger database 2-4 and the main chain sub-ledger database 2-9 are independent of each other.

The local consensus node 10a may synchronize the global consensus block on the main chain and the global contract state associated with the global consensus block from the core consensus node (for example, any one of a core consensus node 20a, a core consensus node 20b, a core consensus node 20c, and a core consensus node 20d) in the core consensus network 200a through the main chain clearing and synchronization component 2-7, and write the main chain data that is synchronized into the main chain sub-ledger database 2-9. For example, the local consensus node 10a may synchronize the main chain through the core consensus node 20c in the core consensus network 200a: and when generating a service transaction to be uploaded to the main chain, the local consensus node 10a may trigger the main chain consensus RPC component 2-5 to invoke the main chain forwarding and on-chain component 2-6, to forward the service transaction to be uploaded to the main chain to the core consensus node 20c. The core consensus node 20c writes the service transaction received from the main chain forwarding and on-chain component 2-6 into the main chain. For example, the main chain consensus RPC component 2-5 may perform transaction verification on the service transaction to be uploaded to the main chain, and invoke the main chain forwarding and on-chain component 2-6 through the main chain consensus RPC component 2-5 to forward the successfully verified service transaction to the core consensus node 20c.

When receiving the local consensus transaction, the local consensus node 10a may invoke the local sub-chain consensus RPC component 2-1 to perform transaction verification on the local consensus transaction and put the local consensus transaction into a transaction pool, and invoke the local sub-chain consensus component 2-2 through the local sub-chain consensus RPC component 2-1 to obtain the cached local consensus transaction from the transaction pool. The local sub-chain consensus component 2-2 packages the obtained local consensus transactions into the proposed block, and in this case, may invoke the main chain contract state reading component 2-8 through the local sub-chain consensus component 2-2, to obtain the main chain binding height and the main chain read dataset from the main chain sub-ledger database 2-9. The local sub-chain consensus component 2-2 jointly packages the obtained main chain binding height and main chain read dataset into the proposed block. The proposed block in this case is a local consensus block on which consensus is to be reached. The local consensus block performs state binding with the main chain through the main chain binding height, and performs data reference on the main chain through the main chain read dataset. When performing block consensus on the local consensus block, the local sub-chain consensus component 2-2 may broadcast the local consensus block to the local verification node (such as the local consensus node 10b to the local consensus node 10d) in the local consensus network, so that the local consensus node 10a and the local consensus node 10b to the local consensus node 10d perform voting consensus on the local consensus block.

The local consensus node 10a may perform data review on the main chain binding height and the main chain read dataset in the local consensus block through the local sub-chain consensus component 2-2, perform block consensus on the local consensus block to obtain the block consensus result when the data review succeeds, and perform voting consensus based on the block consensus result to obtain the voting consensus result. In this case, the local consensus node 10a may receive the voting consensus results returned by the local consensus node 10b to the local consensus node 10d. When it is determined that the block consensus is reached based on the voting consensus result of the local consensus node 10a and the voting consensus results returned by the local consensus node 10b to the local consensus node 10d, the local consensus block is uploaded to a local consensus sub-chain corresponding to the local consensus network, and the local consensus block is written into the main chain sub-ledger database 2-9. For example, the local sub-chain consensus component 2-2 may write the local consensus block into the main chain sub-ledger database 2-9, or write the local consensus block into the main chain sub-ledger database 2-9 through the local chain transaction execution component 2-3. It is to be understood that if the data review fails, a subsequent procedure of performing block consensus on the local consensus block ends.

That the local consensus node 10a performs block consensus on the local consensus block to obtain the block consensus result includes: invoking the local chain transaction execution component 2-3 through the local sub-chain consensus component 2-2 to execute the local consensus transaction in the local consensus block to obtain the transaction execution result, and using the transaction execution result as the block consensus result. In this case, when executing the local consensus transaction, the local chain transaction execution component 2-3 may invoke the local consensus service contract to read the main chain read dataset in the local consensus block, and execute the local consensus transaction through the main chain read dataset that is read, to implement data reference for the main chain. The local consensus node 10a may mutually verify whether the block consensus result of the local consensus node 10a is consistent with the block consensus results of other local consensus nodes through the local sub-chain consensus component 2-2 (for example, whether there are a specific quantity of block consensus results that are the same as the block consensus result obtained by the local consensus node 10a. If yes, it indicates that consensus is reached). If consensus is reached, a voting consensus result indicating voting approval is generated: if no consensus is reached, a voting consensus result indicating vote against is generated.

It is to be understood that a process in which block consensus is performed by the local consensus node 10b to the local consensus node 10d is the same as a process in which block consensus is performed by the local consensus node 10a. This is not described again in this embodiment of this application.

The core consensus node and the local consensus node that are involved in the embodiments of this application may be electronic devices. The electronic device may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform.

When the core consensus node or local consensus node in this embodiment of this application obtains service data (such as when a multi-layer chain network is applied in an electronic bill scenario, the service data may refer to an electronic receipt of the service object) of a service object (for example, the personal object or the enterprise object) across chains, a prompt interface or a pop-up window may be displayed. The prompt interface or the pop-up window is used for prompting the service object that the service object is currently collecting data such as bill assets, and after the service object transmits a confirmation operation to the prompt interface or the pop-up window, the related steps of data obtaining are started to be performed, otherwise are ended.

In addition, it is to be understood that in this embodiment of this application, service data of a service object such as a user may be involved (for example, when the local consensus transaction is executed in the local consensus block, according to different possibilities in the local consensus transaction, information such as invoicing information, credit information, tax refund information, entry and exit losses of a company, qualification of a company, and the like that needs to be obtained may be involved). When this embodiment of this application is applied to specific products or technologies, permission or consent of a service object such as a user needs to be obtained, and the collection, use, and processing of related data comply with related laws, regulations, and standards of related countries and regions.

The following describes a process of performing block consensus on the local consensus block in the local consensus network.

Figure 3:
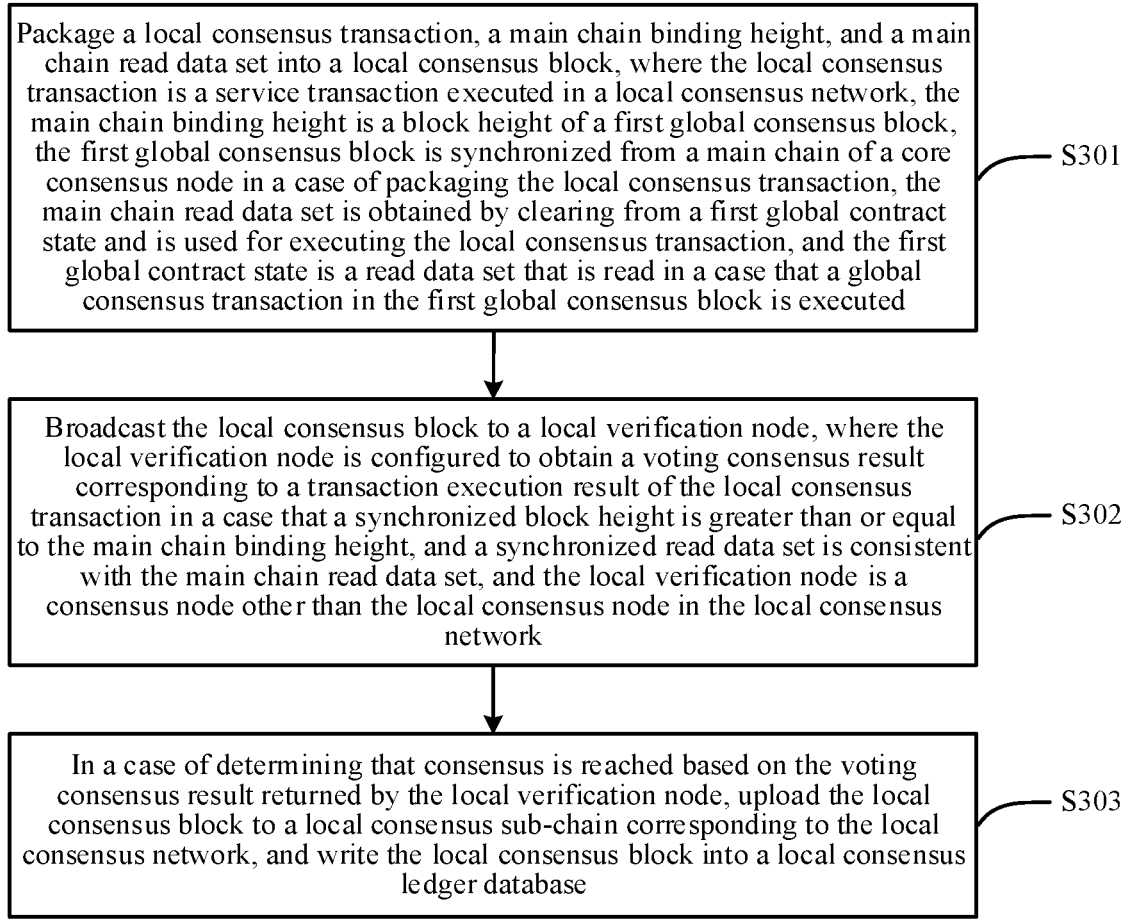
FIG. 3 is a schematic flowchart of a blockchain data processing method according to an embodiment of this application.

FIG. 3 is a schematic flowchart of a blockchain data processing method according to an embodiment of this application. As shown in FIG. 3, the method may be performed by a local consensus node in the local consensus network described above. For example, the local consensus node may be any local consensus node in the local consensus network 100a shown in FIG. 1. The method includes step S301 to step S303. Each step will be described below.

S301: Package a local consensus transaction, a main chain binding height, and a main chain read dataset into a local consensus block, where the local consensus transaction is a service transaction executed in a local consensus network, the main chain binding height is a block height of a first global consensus block, the first global consensus block is synchronized from a main chain of a core consensus node when packaging the local consensus transaction, the main chain read dataset is obtained by clearing from a first global contract state and is used for executing the local consensus transaction, and the first global contract state is a read dataset that is read when a global consensus transaction in the first global consensus block is executed.

Figure 4:
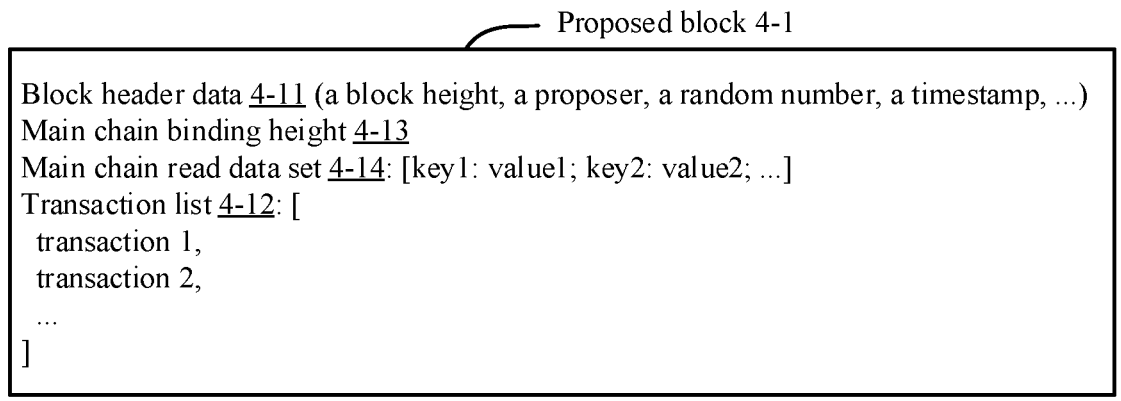
FIG. 4 is a schematic diagram of a proposed block according to an embodiment of this application.

The local consensus node may obtain the cached local consensus transaction from a transaction pool, and package the local consensus transaction into a proposed block. The proposed block includes block data such as a block header and a packaged transaction list. When the local consensus transaction is packaged into the proposed block, a block height of the global consensus block synchronized from the main chain may be obtained from a main chain sub-ledger database, and the synchronized block height in this case is used as the main chain binding height. The local consensus node may further obtain the main chain read dataset associated with the currently packaged local consensus transaction from the synchronized global consensus block. The main chain read dataset refers to data that needs to be read from the main chain when executing the local consensus transaction, such as an associated contract state of a global consensus service contract. The local consensus node may jointly package the main chain binding height, the main chain read dataset, and the local consensus transaction into the proposed block, to obtain a proposed block that is associated with the main chain. For example, FIG. 4 is a schematic diagram of a proposed block according to an embodiment of this application. The proposed block 4-1 may include block header data 4-11 (such as a block height, a proposer, a random number, a timestamp, and the like), a transaction list 4-12 of a local consensus transaction (for example, including a transaction 1, a transaction 2, and the like), a main chain binding height 4-13, and a main chain read dataset 4-14: the main chain read dataset 4-14 represents a global contract state that needs to be read from a main chain when executing a local consensus transaction in the transaction list 4-12. The main chain read dataset 4-14 includes one or more key-value pairs (for example, represented as [key 1: value 1: key 2: value 2, and the like]), "key x: value x" represents a key-value pair, the "key x" represents the read key-value data, and the "value x" represents the corresponding read value data: and for example, when the first global contract state that is read is an electronic bill template in an electronic bill issuance contract, the "key x" represents the electronic bill template, and the "value x" represents specific data corresponding to the electronic bill template.

For ease of understanding, the latest global consensus block that is synchronized when packaging the local consensus transaction may be referred to as a first global consensus block: and in other words, a main chain binding height is a block height of the first global consensus block that is synchronized from the main chain and that is maintained by a core consensus node when packaging the local consensus transaction. For example, a current block height of the global consensus block on the main chain is 100. When the local consensus node packages a local consensus transaction, a block height of the latest global consensus block synchronized from the main chain is 80, and the main chain binding height is 80. The latest synchronized global consensus block is the first global consensus block.

When a global consensus block corresponding to a maximum global block height is obtained from the main chain through the core consensus node, the global consensus block corresponding to the maximum global block height is used as the first global consensus block, and the maximum global block height is used as the main chain binding height. In other words, the local consensus node synchronizes a latest global consensus block uploaded to the main chain from the main chain, uses the latest global consensus block uploaded to the main chain as the first global consensus block, and uses a block height of the latest global consensus block uploaded to the main chain as the main chain binding height.

A main chain sub-ledger database is used for storing the first global consensus block synchronized from the main chain and the first global contract state associated with the first global consensus block. The first global contract state is a read dataset that is read when the global consensus service contract on the main chain is invoked in the core consensus network to execute the global consensus transaction in the first global consensus block. The main chain read dataset is the read dataset that needs to be read, that is obtained by clearing from the first global contract state data, and that is used for executing the local consensus transaction. The local consensus node may determine data (namely, key-value data) to be used by the local consensus transaction on the main chain when packaging the local consensus transaction, and read the to-be-used data from the main chain sub-ledger database (to be specific, read latest value data from the main chain sub-ledger database according to the key-value data), thereby obtaining the main chain read dataset and completing data reference for the main chain. For example, a service party draws a lottery based on an electronic bill issued on the main chain, and a lottery service transaction is performed in the local consensus network. A lottery rule may be declared in the global consensus service contract as a global contract state. When synchronizing data from the main chain, the local consensus node synchronizes the global contract state and puts the global contract state into the main chain sub-ledger database, and when packaging a lottery service transaction (referred to as a local consensus transaction) initiated by the service party, if determining to read a global contract state corresponding to the lottery rule from the main chain, the local consensus node obtains the lottery rule from the main chain sub-ledger database, to build the main chain read dataset and package the main chain read dataset into the local consensus block. Subsequently, the local consensus node may read the lottery rule from the main chain read dataset when executing the lottery service transaction in the local consensus block, and execute the lottery service transaction based on the lottery rule read from the main chain and a related local consensus service contract. In this case, the lottery rule represents the data referenced from the main chain. It is to be understood that according to different local consensus transactions, the global contract state referenced from the main chain is different in different scenarios and is determined according to a specific blockchain scenario. This is only an example and is not limited herein.

It is to be understood that the main chain binding height is used for performing state binding (also referred to as contract state data binding) on the local consensus block that currently performs block consensus and the main chain. In other words, the local consensus block determines the block height of the synchronized global consensus block when packaging the local consensus transaction, and obtains the latest main chain read dataset from the data synchronized to the main chain. For example, if the main chain binding height is 100, it indicates that when packaging the local consensus transaction, the global consensus block synchronized to the main chain is a global consensus block whose block height is 100. In global contract state data associated with the synchronized global consensus block whose block height is 100 and a previous global consensus block (namely, a global consensus block whose block height ranges from 0 to 100), the latest read dataset that needs to be read and is used for executing the local consensus transactions is cleared, to be used as the main chain read dataset.

In some embodiments, the local consensus network is created by the core consensus node in the core consensus network. When creating the local consensus network, the local consensus node creates a genesis block of the local consensus sub-chain to start the local consensus sub-chain: and the process includes: synchronously writing a target consensus block including a registration transaction from the main chain, where the registration transaction is a service transaction that applies to the core consensus node to register the local consensus sub-chain, the target consensus block includes a configuration transaction corresponding to the registration transaction, and the configuration transaction carries configuration information of the genesis block on the local consensus sub-chain, to obtain the configuration information from the target consensus block, and after information verification on the configuration information succeeds, creates a genesis block in the local consensus network, and starts the local consensus sub-chain based on the genesis block. It is to be understood that when the genesis block is created through the core consensus network and the local consensus sub-chain is started, it indicates that the local consensus network is created and activated.

It is to be understood that a registration transaction is initiated by the service party. The registration transaction may carry information such as hash data of the genesis block. The core consensus node executes the registration transaction to obtain a local consensus sub-chain identifier, and writes the registration transaction and the local consensus sub-chain identifier into the main chain. For example, after the registration transaction and the local consensus sub-chain identifier are written into the main chain, a block height at which the registration transaction is located is X. After registration succeeds, the service party may initiate a configuration transaction. The configuration transaction carries the configuration information of the genesis block in the local consensus sub-chain. The core consensus node may write the configuration transaction into the main chain. In this case, the configuration transaction may be written into the global consensus block in which the registration transaction is located, or the configuration transaction may be written into the global consensus block after the global consensus block in which the registration transaction is located. In other words, the block height at which the configuration transaction is located may be greater than or equal to X. Therefore, the local consensus node first needs to synchronize at least the global consensus block (namely, the target consensus block) with the block height X from the main chain, and search for the configuration information of the genesis block from the synchronized global consensus block. If the global consensus block with the block height X is not found, a subsequent global consensus block continues to be synchronized until the global consensus block including the configuration information is found. The local consensus node may specify an identifier of the local consensus sub-chain and configure the configuration information of the genesis block through a sub-chain startup service, and compare the configuration information obtained from the main chain with the configuration information configured on the local consensus node (to be specific, the information verification on the configuration information succeeds). When a comparison result indicates consistency (to be specific, the information verification succeeds), the genesis block is created, to start the local consensus sub-chain. In this case, the local consensus network is started accordingly.

S302: Broadcast the local consensus block to a local verification node, where the local verification node is configured to obtain a voting consensus result corresponding to a transaction execution result of the local consensus transaction when a synchronized block height is greater than or equal to the main chain binding height, and a synchronized read dataset is consistent with the main chain read dataset, and the local verification node is a consensus node other than the local consensus node in the local consensus network.

It is to be understood that when performing block consensus on the local consensus block, the local consensus block first needs to be broadcast to the local verification node in the local consensus network. The local verification node is a consensus node other than the local consensus node in the local consensus network. In other words, the local consensus network may include a plurality of local consensus nodes. When any local consensus node packages the local consensus transaction to generate the local consensus block and performs block consensus on the local consensus block, the remaining local consensus nodes in the local consensus network may be used as the local verification nodes of the current local consensus node. When receiving the local consensus block, any local verification node needs to perform block consensus on the local consensus block. In this case, for the any local verification node, remaining local consensus nodes corresponding to the any local verification node are also the local verification nodes of the any local verification node. Obviously, each local consensus node in the local consensus network performs the same block consensus process when performing block consensus on one local consensus block. When each local consensus block determines that the local consensus block reaches block consensus, each local consensus node uploads the local consensus block to the local consensus sub-chain.

When the local consensus block is broadcast to the local verification node in the local consensus network, a block consensus process performed by the local verification node on the local consensus block may be: performing data review on the main chain binding height and the main chain read dataset in the local consensus block, and performing legality verification (for example, performing format verification, validity verification, and the like on a local consensus transaction in a transaction list) on a block header and a transaction list in the local consensus block. If the data review succeeds and the legality verification succeeds, voting consensus is performed on a transaction execution result obtained by executing the local consensus transaction, to obtain a voting consensus result, and the voting consensus result is transmitted to the remaining local consensus nodes: and if the data review fails or the legal transaction fails, the block consensus procedure ends.

A process and a principle in which each local verification node performs data review on the main chain binding height and the main chain read dataset are the same, including: obtaining a block height of the latest global consensus block synchronized from the main chain when performing block consensus from the main chain sub-ledger database, using the block height (referred to as a block height of the second global consensus block) of the latest synchronized global consensus block as the main chain binding height, and performing data review on the main chain binding height and the main chain read dataset according to the block height of the second global consensus block.

It is to be understood that in a period in which the local consensus transaction is packaged into block consensus, the local consensus node may synchronize the global consensus block from the main chain. Correspondingly, the local verification node continuously synchronizes the global consensus block from the main chain. A process of synchronizing the global consensus block may be: invoking a main chain clearing and synchronization component to generate a main chain clearing and synchronization request, where the main chain clearing and synchronization request carries the block height of the first global consensus block, transmits the main chain clearing and synchronization request to the core consensus node, and receives the to-be-synchronized global block returned by the core consensus node. In this case, the to-be-synchronized global block may be used as the second global consensus block. The main chain clearing and synchronization request is used for indicating the core consensus node to determine the global consensus block that is not synchronized to the local consensus node from the main chain based on the global clearing and synchronization rule and the block height of the first global consensus block, and selecting the to-be-synchronized global block from the global consensus block that is not synchronized to the local consensus node. When receiving the to-be-synchronized global block, the local consensus node may determine whether the to-be-synchronized global block and the first global consensus block are the same global consensus block, to be specific, determine a block height of the to-be-synchronized global block and the block height of the first global consensus block.

Performing data review on the main chain binding height and the main chain read dataset according to the block height of the second global consensus block may be: using the block height of the second global consensus block as a target block height. If the main chain binding height is less than or equal to the target block height, a read dataset associated with the first global consensus block is searched from the main chain sub-ledger database, and the read dataset is used as a target read dataset. If the target read dataset is consistent with the main chain read dataset, it indicates that the data review succeeds. In other words, the local verification node obtains a read dataset associated with the first global consensus block from the local main chain sub-ledger database based on the main chain read dataset. The read dataset associated with the first global consensus block includes key-value data included in a plurality of key-value pairs, which is the same as the key-value data included in the plurality of key-value pairs included in the main chain read dataset. The local verification node searches locally for value data corresponding to the key-value data to build a read dataset associated with the first global consensus block. By comparing the main chain read dataset with the locally stored read dataset, consistency of the referenced main chain data may be ensured. For example, the main chain read dataset includes a key-value pair representing a lottery rule. The local verification node may search for the lottery rule from the local main chain sub-ledger database. The searched lottery rule is the key-value pair (namely, the key-value pair in the target read dataset) in the read dataset associated with the first global consensus block. The lottery rule in the main chain read dataset may be compared with the lottery rule in the target read dataset, to determine whether the key-value pair in the main chain read dataset in the local consensus block is consistent with the key-value pair that is locally synchronized.

The main chain binding height is less than or equal to the target block height, indicating that the global consensus block that the local verification node synchronizes to during block consensus is equal to or more than the global consensus block that the local consensus node synchronizes to when packaging the local consensus transaction. In other words, the local verification node locally stores the global contract state that the local consensus node synchronizes to when packaging the local consensus transaction. Therefore, the local verification node may perform data review through the main chain read dataset. The main chain binding height is greater than the target block height, indicating that the global consensus block that the local verification node synchronizes to during block consensus is less than the global consensus block that the local consensus node synchronizes to when packaging the local consensus transaction. In other words, the local verification node does not locally store all the global contract states that the local consensus node synchronizes to when packaging the local consensus transaction. Therefore, the local verification node cannot perform consistency verification on the main chain read dataset, and therefore cannot participate in the voting consensus of the local consensus block. In addition, the main chain binding height is less than or equal to the target block height, indicating that the local verification node has been synchronized to the global consensus block (namely, the first global consensus block) corresponding to the main chain binding height. Therefore, the target read dataset may be found from the synchronized global consensus block whose block height is the main chain binding height and the global contract state associated with the previous global consensus block (namely, the global consensus block whose block height ranges from block height 0 to the main chain binding height).

When performing voting consensus, the local verification node includes: performing block consensus on the local consensus block, to obtain a block consensus result, and performing voting consensus based on the block consensus result, to obtain a voting consensus result. Performing block consensus on the local consensus block to obtain the block consensus result may be invoking the local consensus service contract to execute the local consensus transaction in the local consensus block, and using the transaction execution result obtained by executing the local consensus transaction as the block consensus result when performing block consensus on the local consensus block. Performing voting consensus based on the block consensus result may be comparing the block consensus result among consensus nodes. If it is determined that the block consensus result determined by a specific quantity of other consensus nodes (such as 51% of the local consensus nodes in the local consensus network) is the same as the block consensus result obtained by the block consensus result (to be specific, the block consensus result is consistent), a voting consensus result indicating voting approval may be generated, which indicates that consensus is reached on the block consensus result. In other words, the local verification node agrees to upload the local consensus block to the local consensus sub-chain. A voting consensus result of one local verification node is transmitted to other local verification nodes and local consensus nodes, and the local verification node also receives the voting consensus results transmitted by other local verification nodes and local consensus nodes. Correspondingly, the local consensus node that packages and generates the local consensus block also performs the voting consensus process and transmits the obtained voting consensus result to the local verification node.

It is to be understood that when performing block consensus on the local consensus block, each local consensus node in the local consensus network executes the local consensus transaction in the local consensus block to obtain the block consensus result, and mutually verifies whether the block consensus results are consistent among the consensus nodes (including the local consensus node and the local verification node), to generate the corresponding voting consensus result. Each local consensus node may receive voting consensus results generated by remaining local consensus nodes. In other words, when performing block consensus, each local consensus node performs a step of data review on the main chain binding height and the main chain read dataset, when performing data review, determines whether the block height of the synchronized global consensus block is greater than or equal to the main chain binding height, searches for the read dataset associated with the first global consensus block from the global consensus block corresponding to the main chain binding height and the global contract state associated with the previous global consensus block, and uses the read dataset as a to-be-confirmed data set, and performs consistency verification on the main chain read dataset based on the to-be-confirmed data set.

Figure 5:
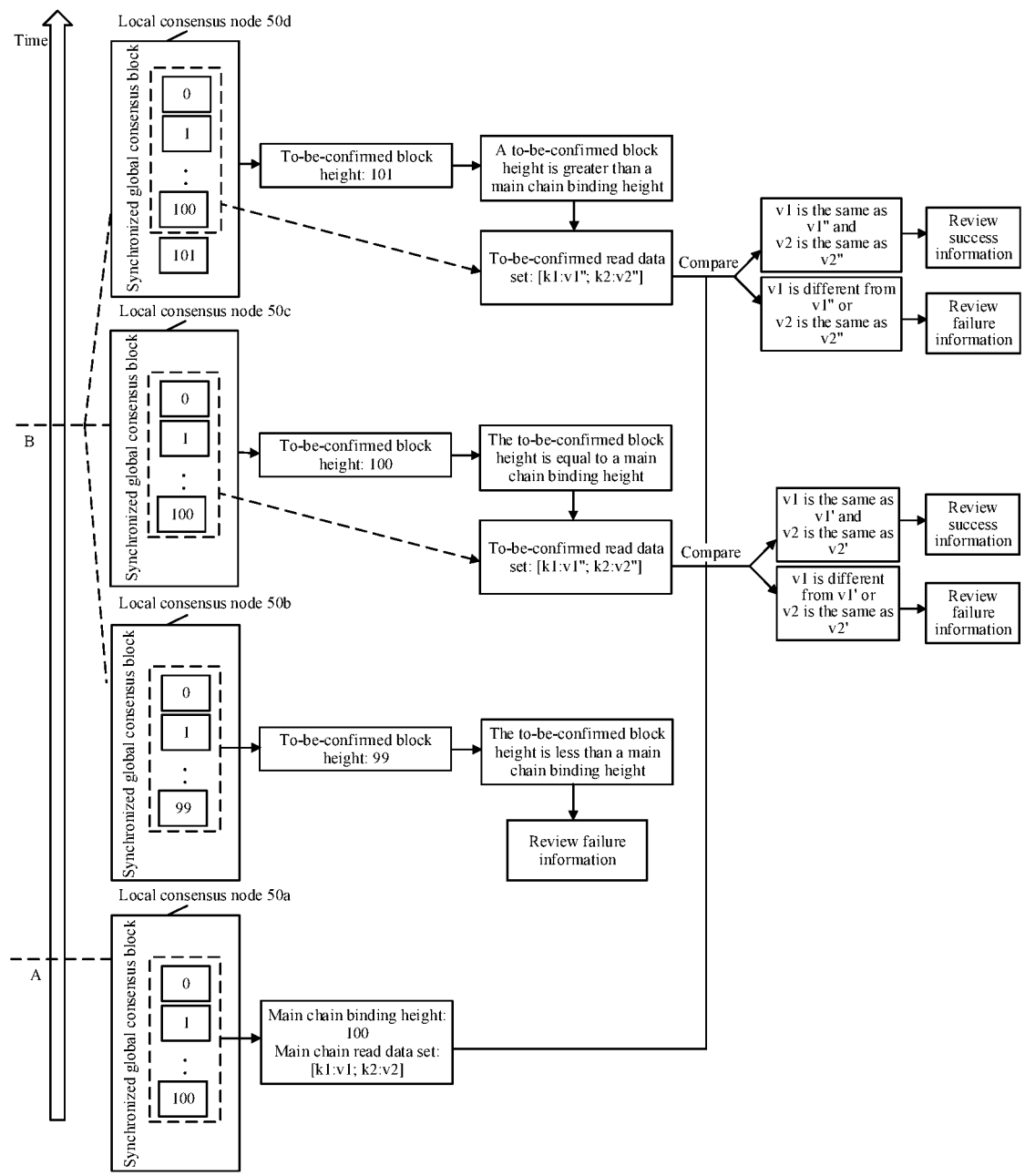
FIG. 5 is a schematic diagram of a data reviewing scenario according to an embodiment of this application.

For example, FIG. 5 is a schematic diagram of a data reviewing scenario according to an embodiment of this application. As shown in FIG. 5, for example, a local consensus node 50a packages a local consensus transaction at a time point A, and obtains a block height (namely, a block height of a first global consensus block) of a global consensus block synchronized at the time point A. For example, a height value of a block height synchronized in this case is 100, then the block height 100 is used as a main chain binding height, and a main chain read dataset (for example, a key-value pair in the main chain read dataset may be represented as: [k1:v1: k2:v2]) is searched from a global contract state associated with a global consensus block 0 to a global consensus block 100 in a main chain sub-ledger database, thereby broadcasting the obtained local consensus block to a local consensus node 50b, a local consensus node 50c, and a local consensus node 50d.

In one or more implementations, when a review timestamp of the local consensus node 50b is a time point B, to be specific, data review is performed on the local consensus block at the time point B, a main chain synchronization height maintained locally by the local consensus node 50b at the time point B may be obtained. The main chain synchronization height maintained locally by the local consensus node 50b refers to a block height (namely, a block height of a second global consensus block) of a global consensus block synchronized from a main chain currently maintained by the local consensus node 50b (namely, the review timestamp: the time point B): for example, in this case, a height value of the block height that is synchronized from the main chain and that is currently maintained locally by the local consensus node 50b is 99, then a block height whose height value is 99 may be used as a target block height, and then when it is determined that the target block height is less than the main chain binding height, it may be confirmed that the main chain synchronization height maintained locally by the local consensus node 50b lags behind the main chain synchronization height: and in this case, the local consensus node 50b has no way to perform block voting (to be specific, the local consensus node 50b does not have a transaction read dataset required to execute a local consensus transaction in this case), and then determine review failure information (referred to as a data review result) of the local consensus block. The review failure information is used for indicating that the data review fails.

Correspondingly, when a review timestamp of the local consensus node 50c is a time point B, to be specific, data review is performed on the local consensus block at the time point B, a main chain synchronization height maintained locally by the local consensus node 50c at the time point B may be obtained. The main chain synchronization height maintained locally by the local consensus node 50c refers to a block height (namely, a block height of a second global consensus block) of a global consensus block synchronized from a main chain currently maintained by the local consensus node 50c (namely, the review timestamp: the time point B): for example, in this case, a height value that is synchronized from the main chain and that is currently maintained locally by the local consensus node 50c is 100, then a block height whose height value is 100 may be used as a target block height, and then it is determined that the target block height is equal to the main chain binding height: in this case, the local consensus node 50c may perform block voting (to be specific, the local consensus node 50c has the transaction read dataset required to execute the local consensus transaction in the local consensus block in this case); therefore, in the local main chain sub-ledger database, a target read dataset (namely, a read dataset associated with the first global consensus block) may be searched from a global contract state associated with a global consensus block corresponding to a block height whose height value ranges from 0 to 100, the to-be-confirmed data set is compared with the main chain read dataset, and a comparison result is used as a data review result: for example, a key-value pair in the target read dataset may be represented as: [k1:v1': k2:v2']. v1' and v2' represent the value data found locally by the local consensus node 50c. When v1 and v1' are the same, and v2 and v2' are the same, it indicates that the target read dataset is consistent with the main chain read dataset, thereby generating review success information (namely, a data review result) of the local consensus block. The review success information is used for representing that the data review succeeds: and in addition, when v1 and v1' are different, or v2 and v2' are different, it indicates that the target read dataset is inconsistent with the main chain read dataset, thereby generating review failure information (namely, a data review result) of the local consensus block. The review failure information is used for representing that the data review fails.

Correspondingly, a process of performing data review on the local consensus block by the local consensus node 50d at the time point B is similar to a process of performing data review on the local consensus block by the local consensus node 50c at the time point B. This is not repeatedly described in this embodiment of this application herein. In addition, a key-value pair in the target read dataset of the local consensus node 50d may be represented as: [k1:v1": k2:v2"]. v1" and v2" represent the value data found locally by the local consensus node 50d. When v1 and v1" are the same, and v2 and v2" are the same, it indicates that the target read dataset is consistent with the main chain read dataset, thereby generating review success information, and representing that the data review succeeds: and when v1 and v1" are different, or v2 and v2" are different, it indicates that the target read dataset is inconsistent with the main chain read dataset, thereby generating review failure information, and representing that the data review fails. In addition, the time points B corresponding to the local consensus node 50b to the local consensus node 50d may be different.

S303: In a case of determining that consensus is reached based on the voting consensus result returned by the local verification node, upload the local consensus block to a local consensus sub-chain corresponding to the local consensus network, and write the local consensus block into a local consensus ledger database.

The local consensus node may receive the voting consensus result returned by the local verification node, and determine whether block consensus is reached (also referred to as reaching consensus) based on the received voting consensus result and a voting consensus result (to be specific, determine whether the block consensus result obtained by the local consensus node is consistent with the block consensus result obtained by the local verification node) determined by the local consensus node. If it is determined that a quantity of voting consensus results indicating voting approval exceeds a specific quantity (such as 51% of the quantity of local consensus nodes in the local consensus network), it indicates that block consensus is reached. In this case, the local consensus node may write the local consensus block into the maintained local consensus sub-chain and into the local consensus ledger database. Correspondingly, the local verification node also receives these voting consensus results, and determine that block consensus is reached based on these voting consensus results, to upload the local consensus nodes to the local consensus sub-chains respectively maintained by the local consensus nodes and write the local consensus nodes into respective local consensus ledger databases. In other words, the local consensus sub-chain and the local consensus ledger database completely store data reference of the local consensus block for the main chain.

It is to be understood that through the foregoing process, block consensus of the local consensus block may be implemented in the local consensus network, the local consensus block that reaches block consensus is uploaded to a local consensus sub-chain that is independent of the main chain, and there is an association relationship between the local consensus block and the main chain. The local consensus block may not only reference data on the main chain based on the association relationship, but also verify consistency of the referenced data based on the association relationship, thereby ensuring that a service transaction may be safely and accurately executed. Through the block consensus manner, a local consensus sub-chain may be easily built and used, so that a multi-layer chain network may be constructed. The multi-layer chain network includes a core consensus network and a service network deployed with a local consensus network. The multi-layer chain network implements level division of a blockchain network. The local consensus node in the local consensus network may obtain the data on the main chain in the core consensus network, and may be further used for performing local consensus locally, allowing each local consensus node of the local consensus network to process related service transactions in a region in which the local consensus network is located, and forming a multi-level layering of the service transactions. For example, a service transaction related to the whole country may be executed by the core consensus node in the core consensus network, and a service transaction related to a specific region may be executed by the local consensus node in the local consensus network associated with the region. In addition, data isolation of service transaction data may be further implemented through the local consensus network. For example, service transaction data related to a region A is uploaded to the local consensus sub-chain in the local consensus network associated with the region A. Service transaction data related to a region B is uploaded to the local consensus sub-chain in the local consensus network associated with the region B, to ensure security of important transaction data. In addition, the local consensus network may further share service processing pressure on the main chain, to ensure stability of service processing on the main chain. For example, using a blockchain electronic bill system as an example, the multi-level layering of the service transactions may be: running the main chain in the core consensus network, where the core consensus node in the core consensus network may be used for executing a bill service transaction related to the whole country. Each first-level regional bill agency (such as a provincial-level tax agency) may create its own local consensus network, and build its own local consensus sub-chain in its respective local consensus network.

It is to be understood that because the local consensus network is deployed in the service network, the service network may include a plurality of types of SPV nodes, such as a first-type of SPV node and a second-type of SPV node. The first type of SPV node is configured to synchronize the consensus block from the blockchain maintained by the consensus node through a consensus node with a network connection relationship, and build its own blockchain. For example, the local consensus node may synchronize the global consensus block from the main chain maintained by the core consensus node through a core consensus node with a network connection relationship: and in other words, the local consensus node in the local consensus network may be the first-type of SPV node. For ease of understanding, the local consensus node in the local consensus network is referred to as a first-level SPV local consensus node. The second-type of SPV node may refer to a local service node that has a network connection relationship with the first-type of SPV node. For example, a local service node that has a network connection relationship with the local consensus network. The local service node may be referred to as a service SPV node herein.

Therefore, data associated with each other may be obtained by clearing from the main chain through the first-level SPV local consensus node, and the service node that has a network connection relationship with each local consensus network may synchronize data from a corresponding local consensus sub-chain. The service SPV node may also generate a service transaction (referred to as a local consensus transaction) and transmit the service transaction to a corresponding first-level SPV local consensus node in the corresponding local consensus network. The first-level SPV local consensus node performs packaging and on-chain processing on the local consensus transaction. It is to be understood that service transactions on which consensus is performed in the local consensus network are not forwarded to the main chain, but are processed in respective local consensus networks. The service SPV node also obtains associated data on the local consensus sub-chain by clearing through the first-level SPV local consensus node in the corresponding local consensus network.

In this embodiment of this application, a next-level local consensus network (for example, may be referred to as a local consensus sub-network) may be further created in the service network through an SPV node, for example, each second-level regional bill agency (such as a municipal-level tax agency) may create its own local consensus sub-network. There is a network connection relationship between the local consensus sub-network and the corresponding local consensus network. It is to be understood that for a local consensus sub-network associated with the second-level regional bill agency, a local consensus network associated with the first-level regional bill agency is regarded as a core consensus network for the second-level regional bill agency. A principle of data exchange between the local consensus network and the local consensus sub-network is the same as a principle of data exchange between the core consensus network and the local consensus network. For example, a bill service transaction related to XX city may be executed in the local consensus sub-network, and a bill service transaction related to XX province may be executed in the local consensus network, thereby implementing the level division of the blockchain network. The local consensus sub-chain in the local consensus sub-network is independent of the local consensus sub-chain in the local consensus network. The local consensus sub-chain in the local consensus sub-network may synchronize data from the local consensus sub-chain in the local consensus network, when the local consensus node in the local consensus sub-network performs block consensus, may also bind the block height of the local consensus sub-chain in the local consensus network according to the same state binding principle, and when executing the service transaction in the local consensus sub-network, may quote the required data from the local consensus sub-chain in the local consensus network according to the same data reference principle, thereby performing block consensus of the related consensus blocks in the local consensus sub-network, and uploading the consensus block on which block consensus is reached to the local consensus sub-chain in the local consensus sub-network. In other words, the first-type of SPV node included in the service network may further include the local consensus node in the local consensus sub-network; and the local consensus node in the local consensus sub-network has a network connection relationship with the local consensus node in the local consensus network. The local consensus node in the local consensus sub-network may synchronize the local consensus block from the corresponding maintained local consensus sub-chain through the local consensus node in the local consensus network and build its own blockchain. For ease of understanding, the local consensus node in the local consensus sub-network may be referred to as a second-level SPV local consensus node. Correspondingly, the second-type of SPV node may include a service node that has a network connection relationship with the local consensus node in the local consensus sub-network.

In addition, if a main chain service transaction (namely, a global consensus transaction) to be performed on the main chain is generated in the local consensus network, for example, transaction summarization information corresponding to an execution result of the global consensus transaction is uploaded to the main chain, and an information on-chain transaction corresponding to the transaction summarization information is generated. The main chain service transaction is transmitted to the core consensus node in the core consensus network through an entry of the core consensus network, and the core consensus node performs consensus and execution on the main chain service transaction. In this embodiment of this application, the service network may further include a third-type of SPV node. The third-type of SPV node may play a transit role when data exchange is performed between the first-type of SPV node and the consensus node having a network connection relationship. For example, the first-type of SPV node may generate a clearing and synchronization request and transmit the clearing and synchronization request to the third-type of SPV node. The third-type of SPV node forwards the clearing and synchronization request to the consensus node having a network connection relationship. The consensus node having a network connection relationship, when obtaining a to-be-synchronized consensus block according to the clearing and synchronization request, then transmits the to-be-synchronized consensus block to the third-type of SPV node, and the third-type of SPV node returns the to-be-synchronized consensus block to the first-type of SPV node. In other words, one or more third-type of SPV nodes may be deployed between the local consensus network and the core consensus network, and the third-type of SPV nodes between the core consensus network and different local consensus nodes may be different. One or more third-type of SPV nodes may be deployed between the local consensus network and the local consensus sub-network, and the third-type of SPV nodes between the local consensus network and different local consensus sub-networks may be different. For ease of understanding, the third-type of SPV node between the local consensus network and the core consensus network may be referred to as the first-level SPV node, and the third-type of SPV node between the local consensus network and the local consensus sub-network may be referred to as the second-level SPV node.

Therefore, it is to be understood that when the first-level SPV local consensus node performs data exchange with the core consensus node in the core consensus network, the data exchange may be performed through the first-level SPV node. In other words, the first-level SPV local consensus node may synchronize data from the main chain through the first-level SPV node. For example, the first-level SPV local consensus node transmits a main chain clearing and synchronization request to the first-level SPV node. The first-level SPV node forwards the main chain clearing and synchronization request to an entry of the core consensus network, and finally transmits the main chain clearing and synchronization request to the core consensus node. The core consensus node may also return the to-be-synchronized data to the first-level SPV local consensus node through the first-level SPV node. In another example, the first-level SPV local consensus node may transmit the main chain service transaction to the first-level SPV node when generating the main chain service transaction. The first-level SPV node forwards the main chain service transaction to an entry of the core consensus network, and finally transmits the main chain service transaction to the core consensus node. In another example, the first-level SPV node may continuously synchronize the latest global consensus block from the main chain through the core consensus node, and when receiving the main chain clearing and synchronization request transmitted by the local consensus node, select a to-be-synchronized global block from the locally synchronized data, and transmit the to-be-synchronized global block to the local consensus node. It is to be understood that first-level SPV nodes corresponding to different local consensus networks are different, and one local consensus network may correspond to one or more first-level SPV nodes. Correspondingly, a next-level local consensus sub-network may be constructed according to the SPV node that has a network connection relationship with the local consensus network. In this case, there is an SPV node between the local consensus network and the local consensus sub-network. For example, the SPV node may be referred to as a second-level SPV node. An operating principle of the second-level SPV node is the same as an operating principle of the first-level SPV node.

Figure 6A:
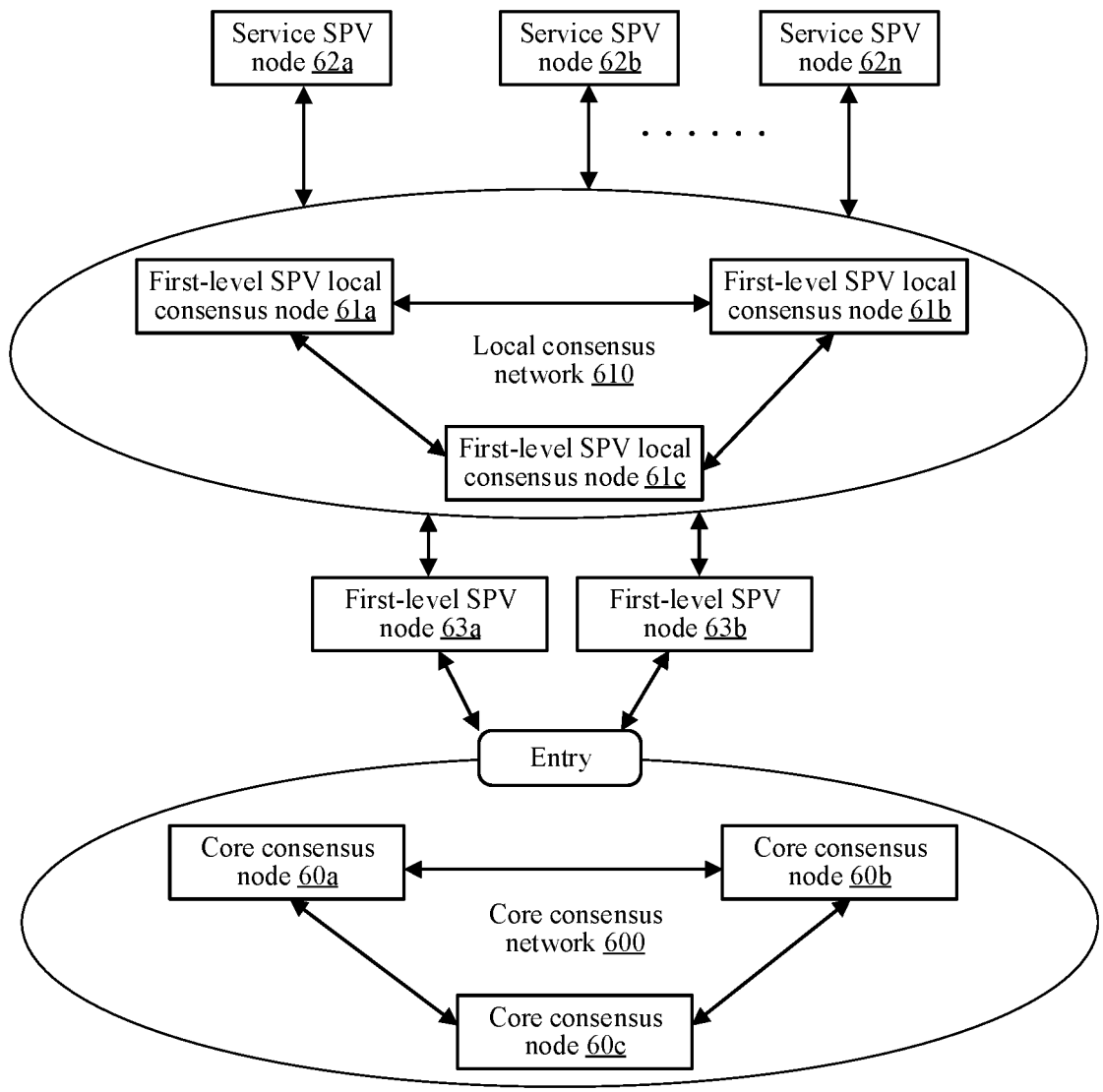
FIG. 6A is a schematic diagram of a blockchain framework based on a multi-layer chain network according to an embodiment of this application.
Figure 6B:
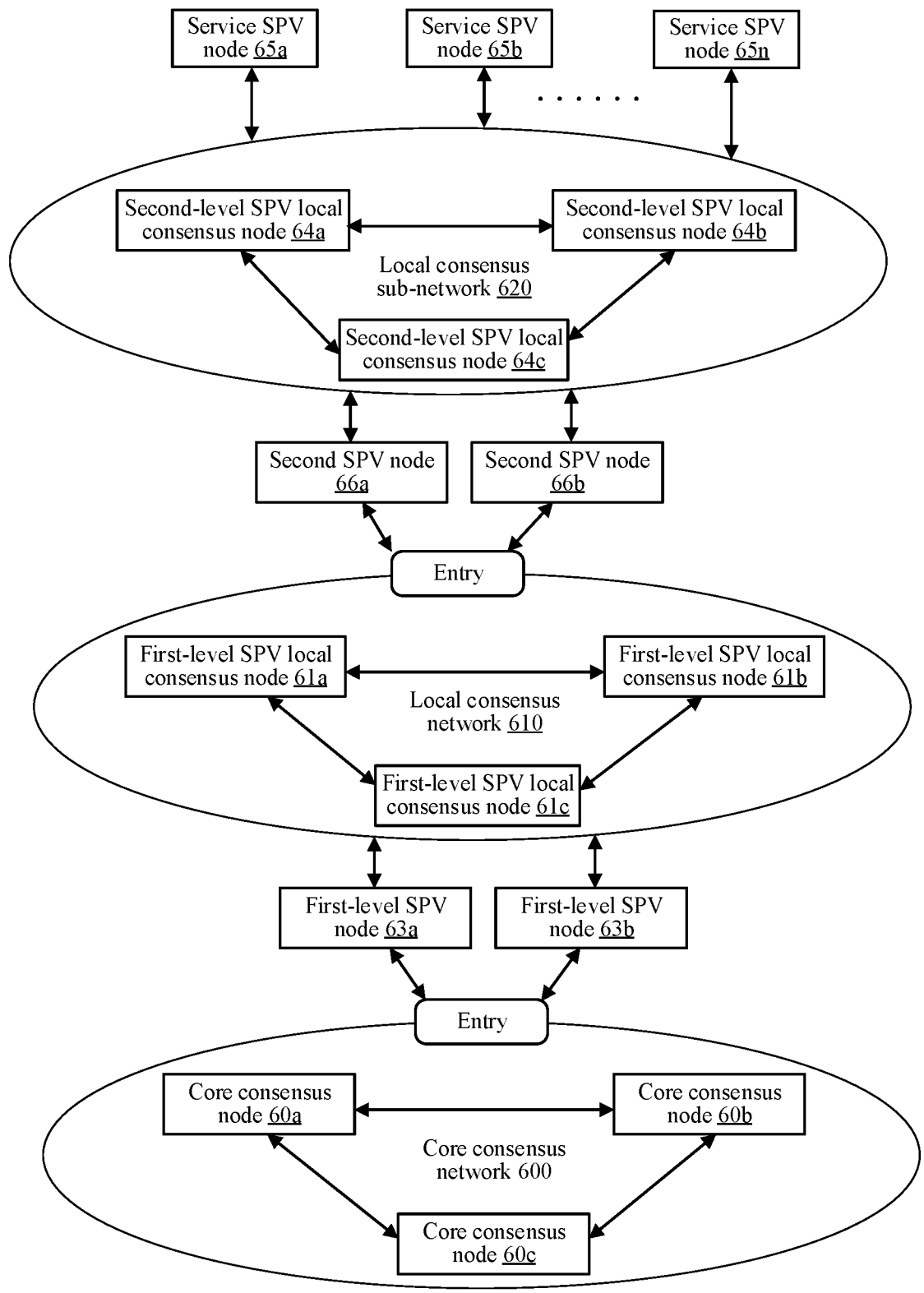
FIG. 6B is a schematic diagram of another blockchain framework based on a multi-layer chain network according to an embodiment of this application.

For example, FIG. 6A and FIG. 6B are schematic diagrams of a blockchain framework based on a multi-layer chain network according to an embodiment of this application, where as shown in FIG. 6A, a core consensus network 600 includes a core consensus node 60a, a core consensus node 60b, and a core consensus node 60c: a local consensus network 610 includes a first-level SPV local consensus node 61a, a first-level SPV local consensus node 61b, and a first-level SPV local consensus node 61c; data exchange may be directly performed between the local consensus network 610 and the core consensus network 600. For example, the first-level SPV local consensus node 61a may generate a main chain clearing and synchronization request, and transmit the main chain clearing and synchronization request to the core consensus node 60a through an entry of the core consensus network, to synchronize data on the main chain through the core consensus node 60a: and the local consensus network 610 may perform data exchange with a service SPV node (62a, 62b, ..., and 62n). For example, the service SPV node 62a may submit a service transaction to the first-level SPV local consensus node 61a. The first-level SPV local consensus node 61a broadcasts the service transaction to remaining first-level SPV local consensus nodes. Subsequently, the service transaction may be packaged into a block in the local consensus network 610 and uploaded to a local consensus sub-chain, or data exchange may be performed between the local consensus network 610 and the core consensus network 600 through the first-level SPV node. The first-level SPV node may include a first-level SPV node 63a and a first-level SPV node 63b, which represent active-active services. The two first-level SPV nodes have the same functions and permissions. For example, the first-level SPV local consensus node 61a may transmit the generated main chain clearing and synchronization request to the first-level SPV node 63a. The first-level SPV node 63a transmits the generated main chain clearing and synchronization request to the core consensus node 60a through the entry of the core consensus network. The core consensus node 60a obtains to-be-synchronized data (such as a global consensus block and a global contract state) from a main chain and transmits the to-be-synchronized data to the first-level SPV node 63a through the entry of the core consensus network. The to-be-synchronized data is returned by the first-level SPV node 63a to the first-level SPV local consensus node 61a. It is to be understood that there may be a plurality of first-level SPV nodes. Here are only two examples. In an actual scenario, a quantity is not limited.

In this embodiment of this application, a plurality of local consensus networks may be created based on FIG. 6A. In an actual scenario, a quantity of local consensus networks is not limited: and in addition, there may be a first-level SPV node between each local consensus network and the core consensus network, and one local consensus network may correspond to one or more first-level SPV nodes.

In this embodiment of this application, as shown in FIG. 6B, a local consensus sub-network 620 may be created based on FIG. 6A. The local consensus sub-network 620 includes a second-level SPV local consensus node 64a, a second-level SPV local consensus node 64b, and a second-level SPV local consensus node 64c. The local consensus sub-network 620 may directly perform data exchange with the local consensus network 610; for example, the second-level SPV local consensus node 64a may transmit the generated sub-chain clearing and synchronization request to the first-level SPV local consensus node 61a through an entry of the local consensus network, to synchronize the data on the local consensus sub-chain through the first-level SPV local consensus node 61a: the local consensus sub-network 620 may perform data exchange with a service SPV node 65a, a service SPV node 65b, ..., and a service SPV node 65n: and for example, the service SPV node 65a may submit the service transaction to the second-level SPV local consensus node 64a. The second-level SPV local consensus node 64a broadcasts the service transaction to the remaining second-level SPV local consensus nodes. Subsequently, the service transaction may be packaged into a block in the local consensus network 620 and uploaded to the local consensus sub-chain in the local consensus sub-network 620. In addition, data exchange may be performed between the local consensus sub-network 620 and the local consensus network 610 through the second-level SPV node. The second-level SPV node may include a second-level SPV node 66a and a second-level SPV node 66b, which represent active-active services. The two second-level SPV nodes have the same functions and permissions. For example, the second-level SPV local consensus node 64a may transmit the generated sub-chain clearing and synchronization request to the second-level SPV node 66a. The second-level SPV node 66a transmits the generated sub-chain clearing and synchronization request to the local consensus node 61a through the entry of the local consensus network. The first-level SPV local consensus node 61a obtains to-be-synchronized data (such as a local consensus block and an associated local contract state) from the maintained local consensus sub-chain and transmits the to-be-synchronized data to the second-level SPV node 66a through the entry of the local consensus network. The to-be-synchronized data is returned by the second-level SPV node 66a to the second-level SPV local consensus node 66a. It is to be understood that there may be a plurality of second-level SPV nodes. Here are only two examples. In an actual scenario, a quantity is not limited.

It is to be understood that a process of performing block consensus in the local consensus network 610 may be: The first-level SPV local consensus node 61a (referred to as a local consensus node) packages a local consensus transaction, and obtains a main chain binding height and a main chain read dataset when packaging the local consensus transaction, thereby storing the main chain binding height, the main chain read dataset, and the local consensus transaction into a proposed block, and using the proposed block as a local consensus block on which consensus is to be reached. Next, the local consensus block is broadcast to the first-level SPV local consensus node 61b and the first-level SPV local consensus node 61c (referred to as local verification nodes). The first-level SPV local consensus node 61a, the first-level SPV local consensus node 61b, and the first-level SPV local consensus node 61c all perform the same block consensus step, and the performed block consensus step is similar to the block consensus step of the local consensus node and the block consensus step of the local verification node. This is not repeatedly described in this embodiment of this application herein. In addition, the first-level SPV local consensus node 61a executes the local consensus transaction in the local consensus block, to obtain a block consensus result: next, whether the block consensus results obtained by the first-level SPV local consensus node 61b and the first-level SPV local consensus node 61c are consistent with the block consensus result obtained by the first-level SPV local consensus node 61a is verified. If yes, a voting consensus result indicating voting approval is generated, and if not, a voting consensus result indicating vote against is generated: in addition, the first-level SPV local consensus node 61a transmits the voting consensus result to the first-level SPV local consensus node 61b and the first-level SPV local consensus node 61c. In this case, the voting consensus results returned by the first-level SPV local consensus node 61b and the first-level SPV local consensus node 61c are also received: and if the voting consensus results corresponding to the first-level SPV local consensus node 61a, the first-level SPV local consensus node 61b, and the first-level SPV local consensus node 61c are all voting consensus results indicating voting approval, it is determined that block consensus is reached, thereby uploading the local consensus block to the local consensus sub-chain maintained by the first-level SPV local consensus node 61a.

Correspondingly, the first-level SPV local consensus node 61b (or 61c) determines a process of reaching block consensus and performing on-chain processing, and the process is similar to a process in which when determining that the block consensus is reached, the first-level SPV local consensus node 61*a* uploads the local consensus block to the local consensus sub-chain. This is not repeatedly described in this embodiment of this application herein.

It is to be understood that a process in which the local service node synchronizes data from the local consensus sub-chain is similar to a process in which the local consensus node synchronizes data from the main chain. This is not repeatedly described in this embodiment of this application herein. The local service node may refer to the service SPV node 62*a* in FIG. 6A, or may refer to the second-level SPV local consensus node 64*a* in FIG. 6B. When the local consensus sub-chain is synchronized, the sub-chain clearing and synchronization request transmitted by the local service node is obtained. The local service node includes a local chain sub-ledger database. The sub-chain clearing and synchronization request carries a local block height (the local consensus sub-chain is maintained by the local consensus node, and the local block height is a block height of the local consensus block) that the local service node synchronizes from the local consensus sub-chain. Based on a local clearing and synchronization rule and the local block height, the local consensus block that is not synchronized to the local service node is determined from the local consensus sub-chain, and a target local block is selected from the local consensus block that is not synchronized to the local service node, to obtain a local contract state associated with the target local block, and the target local block and the associated local contract state are returned to the local service node, so that the local service node writes the target local block and the associated local contract state into the local chain sub-ledger database. The local contract state is a read dataset read by a local consensus transaction in the target local block. The local consensus transaction is executed by a local consensus service contract on a local chain of the local consensus network, thereby implementing data synchronization of the local consensus sub-chain. The local service node may obtain service data related to the local service node by clearing from the synchronized data.

It is to be understood that the local service node may refer to the service SPV node (such as the service SPV node 62*a* in FIG. 6A) of the local consensus network, or may further refer to a consensus node (such as the second-level SPV local consensus node 64*a* in FIG. 6B) in a local consensus sub-network of a next-level local consensus network. The local block height carried by the sub-chain clearing and synchronization request is equal to the block height of the first global consensus block. It is to be understood that the local contract state returned by the local consensus node to the local service node involves data referenced by the to-be-synchronized consensus block from the main chain, namely, the main chain read dataset in the to-be-synchronized consensus block. In addition, if the local service node is the consensus node in the local consensus sub-network, the local service node may further build, in the local consensus sub-network, a blockchain that is independent of the local consensus sub-chain in the local consensus network.

Correspondingly, a process and a principle of block consensus in the local consensus sub-network are similar to a process and a principle of block consensus in the local consensus network. This is not repeatedly described in this embodiment of this application herein.

The local consensus block that is not synchronized to the local service node refers to an unsynchronized consensus block determined from the local consensus sub-chain when the local consensus node receives the sub-chain clearing and synchronization request; and for example, may be a local consensus block whose block height is greater than the local block height on the local consensus sub-chain. It is to be understood that in this case, it may be determined that there is no local consensus block on the local consensus sub-chain that is not synchronized to the local service node.

A process and a principle in which the local consensus node determines the target local block from the local consensus sub-chain based on the local clearing and synchronization rule and the local block height are similar to a process and a principle in which the core consensus node determines the to-be-synchronized global block from the main chain. A process in which the local consensus node determines the target local block may be: determining a synchronization result based on the local clearing and synchronization rule and the local block height: when the synchronization result indicates that there is no local consensus block on the local consensus sub-chain that is not synchronized to the local service node, obtaining a local consensus block with a maximum local block height from the local consensus sub-chain, and using the local consensus block with the maximum local block height as the target local block: and when the synchronization result indicates that on the local consensus sub-chain, there is at least one local consensus block that is not synchronized to the local service node, using at least one local consensus block that is not synchronized to the local service node as the target local block.

It is to be understood that when there is no local consensus block that is not synchronized to the local service node, it indicates that the maximum local block height on the local consensus sub-chain is the block height carried in the sub-chain clearing and synchronization request. In other words, the local consensus block corresponding to the maximum local block height on the local consensus sub-chain is a latest local consensus block that has been synchronized to the local service node. The local consensus node may return a local consensus block corresponding to the maximum local block height on the local consensus sub-chain to the local service node. Alternatively, notification information indicating that no local consensus block is newly added may also be generated, and the notification information may be returned to the local service node. In addition, when it is determined that there is a local consensus block that is not synchronized to the local service node, it indicates that there is a newly added local consensus block on the local consensus sub-chain in this case. The local consensus node may use the newly added local consensus block as the target local block to synchronize the target local block to the local service node. In other words, the local service node may obtain the local consensus block corresponding to the maximum local block height from the local consensus sub-chain through the local consensus node.

It is to be understood that the local service nodes may synchronize data on the local consensus sub-chain. However, because the local consensus block on the local consensus sub-chain may reference data on the main chain, the local service node may also synchronize the part of the referenced main chain data, to be specific, may synchronize the part of the referenced main chain data to the main chain data related to the local service node through the local consensus node, thereby ensuring security and privacy of transaction data on the main chain, and further facilitating global management of the local consensus sub-chain through the main chain.

In addition, the local consensus node may further generate a service transaction that needs to be executed on the main chain, including performing transaction summarization processing on a transaction execution result corresponding to the local consensus transaction based on the transaction on-chain rule, to obtain summarized transaction information, generate an information on-chain transaction that carries the summarized transaction information, and invoke a main chain forwarding and on-chain component to generate a main chain on-chain request that carries the information on-chain transaction; and next, transmit the main chain on-chain request to the core consensus node. The main chain on-chain request is used for indicating the core consensus node to write the information on-chain transaction into the main chain, to write the summarized transaction information into the main chain. The transaction summarization processing may be performing transaction summarization processing on the transaction execution result in the local consensus block on which block consensus is currently reached, and may be further performing transaction summarization processing on the transaction execution result in the local consensus block on which block consensus is currently reached and the previous local consensus block. A specific rule for transaction summarization processing is not limited herein. For example, when the local consensus transaction is a lottery service transaction, the transaction summarization processing is used for indicating to summarize transaction results (such as lottery results) obtained from the lottery service transaction executed at a specified time period, to obtain the transaction summarization information (such as statistical information such as an age of a winner, an award amount, and the like); and next, an information on-chain transaction corresponding to the transaction summarization information is generated, so that the core consensus node may write the transaction summarization information into the main chain according to the information on-chain transaction.

This embodiment of this application proposes a consensus mechanism for a local consensus block. Through the consensus mechanism for the local consensus block, a local consensus block that has an association relationship with the main chain may be generated. The association relationship is embodied based on the main chain binding height and the main chain read dataset that are packaged into the local consensus block. Data in the main chain sub-ledger database is synchronized from the main chain in the core consensus network: the main chain binding height is a block height of the first global consensus block synchronized from the main chain when packaging the local consensus transaction. The main chain read dataset is a read dataset that needs to be read, that is obtained by clearing from the main chain sub-ledger database, and that is used for executing the local consensus transaction in the local consensus block. The main chain read dataset is data that needs to be referenced from the main chain when executing the local consensus transaction: and when performing block consensus on the local consensus block, the local consensus node performs data review on the main chain binding height and the main chain read dataset, and performs the subsequent block consensus processes after the data review succeeds. By performing block consensus on the local consensus block in the local consensus network, and writing the local consensus block that reaches block consensus into the local consensus sub-chain, a local consensus sub-chain independent of the main chain may be built, which facilitates level management of transaction data of a service transaction of each service party: for example, each service party may build its own local consensus sub-chain, to respectively store service data (for example, transaction data involved in execution of a service transaction by a service party A may be uploaded to a local consensus sub-chain A, and transaction data involved in execution of a service transaction by a service party B may be uploaded to a local consensus sub-chain B) related to each service party in a local consensus block of each local consensus sub-chain, so that transaction data involved in the transaction executed in the local consensus network may be stored in the associated local consensus sub-chain, to ensure security, privacy, and data isolation of important transaction data: and in addition, through the local consensus block that has an association relationship with the main chain, the data on the main chain may be directly and quickly referenced when executing the local consensus transaction in the local consensus block, thereby avoiding a cumbersome cross-chain procedure between the main chain and the local consensus sub-chain. In addition, performing review on the main chain binding height and the main chain read dataset may further ensure consistency of the data referenced from the main chain when each local consensus node executes the local consensus transaction, to reach block consensus on the local consensus block, which in turn facilitates building and use of the local consensus sub-chain.

Figure 7:
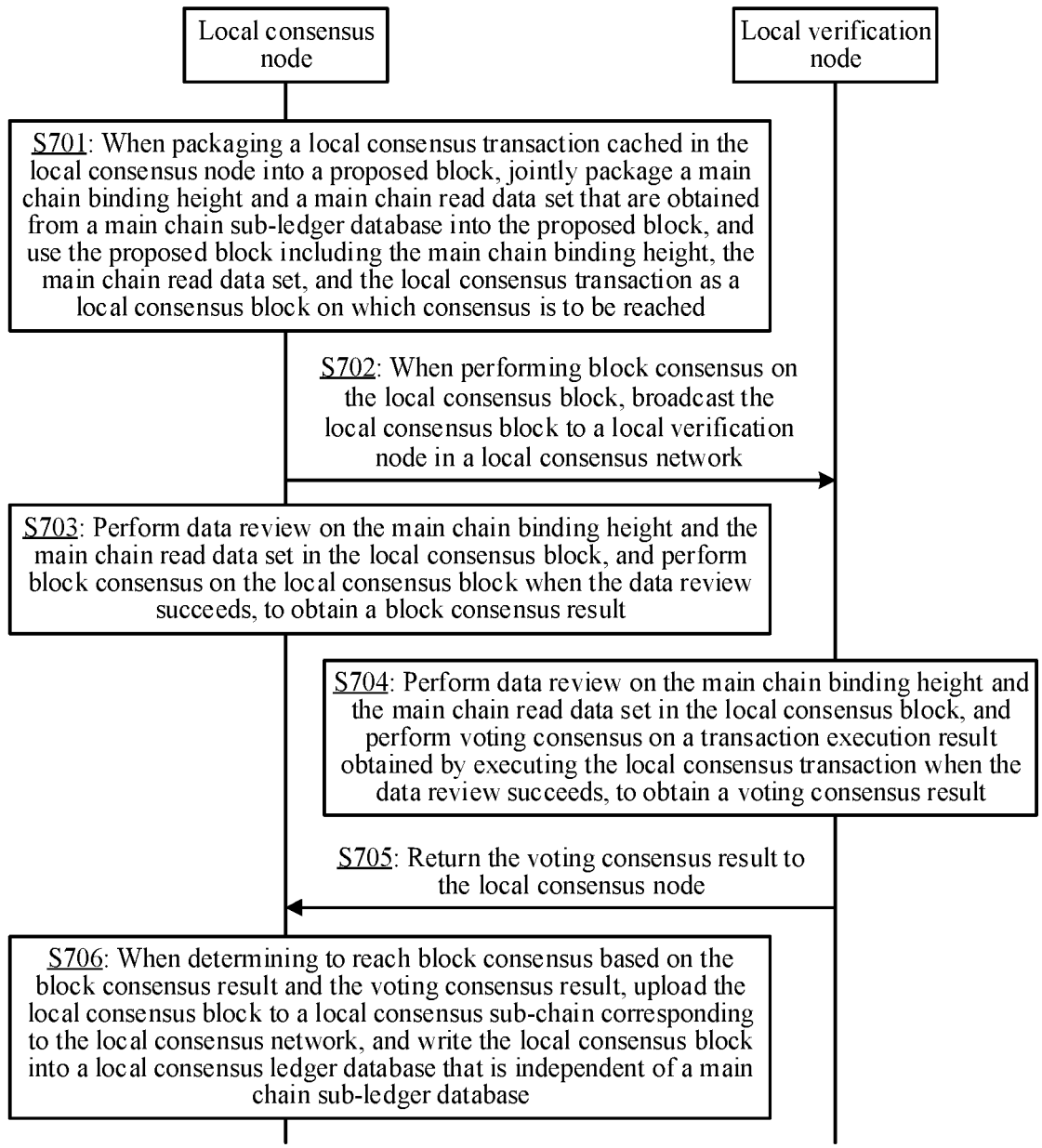
FIG. 7 is a schematic flowchart of a blockchain data processing method according to an embodiment of this application.

FIG. 7 is a schematic flowchart of a blockchain data processing method according to an embodiment of this application. As shown in FIG. 7, the method may be performed by a local consensus node and a local verification node in a local consensus network. For example, the local consensus node may be any consensus node (such as a local consensus node 10*a*) in the local consensus network 100*a* shown in FIG. 1. The local verification node may be any consensus node (for example, 10*b*) other than the local consensus node in the local consensus network 100*a* shown in FIG. 1. The method includes step S701 to step S706. Each step will be described below.

S701: When packaging a local consensus transaction cached in a local consensus node into a proposed block, the local consensus node jointly packages a main chain binding height and a main chain read dataset that are obtained from a main chain sub-ledger database into the proposed block, and using the proposed block including the main chain binding height, the main chain read dataset, and the local consensus transaction as a local consensus block on which consensus is to be reached.

For a specific implementation of step S701, refer to related descriptions of the foregoing embodiments.

S702: When performing block consensus on the local consensus block, the local consensus node broadcasts the local consensus block to a local verification node in a local consensus network.

It is to be understood that the local verification node may be a consensus node other than the local consensus node in the local consensus network.

S703: The local consensus node performs data review on the main chain binding height and the main chain read dataset in the local consensus block, and performs block consensus on the local consensus block when the data review succeeds, to obtain a block consensus result.

When performing block consensus on the local consensus block, the local consensus node also performs the step of data review on the main chain binding height and the main chain read dataset. It is to be understood that when performing block consensus on the local consensus block, the local consensus node may invoke a local consensus service contract on a local consensus sub-chain corresponding to the local consensus network, to perform data review on the main chain binding height and the main chain read dataset in the local consensus block, and obtain a data review result. When the data review result indicates that the data review succeeds, block consensus is then performed on the local consensus block. In addition, the local consensus service contract is invoked to execute the local consensus transaction in the local consensus block, and a transaction execution result obtained by executing the local consensus transaction is used as the block consensus result that is obtained when performing block consensus on the local consensus block.

In some embodiments, a manner for the local consensus node to perform data review and obtain the data review result may be: invoking the local consensus service contract on the local consensus sub-chain to perform the following processing: obtaining a target block height from the main chain sub-ledger database, where the target block height is a block height of a second global consensus block that is synchronized from a main chain through a core consensus node, and the second global consensus block is a global consensus block that is synchronized to the main chain when performing block consensus: and comparing the target block height with the main chain binding height in the local consensus block, to obtain a first comparison result, and determining the data review result according to the first comparison result.

A process of determining the data review result according to the first comparison result may be: when the first comparison result indicates that the target block height is less than the main chain binding height, generating a data review result indicating that the data review fails: when the first comparison result indicates that the target block height is equal to the main chain binding height, determining that the first global consensus block and the second global consensus block are the same global consensus block. In other words, in a period in which the local consensus transaction is packaged into block consensus, the local consensus node is not synchronized from the main chain to the global consensus block. In this case, a latest synchronized global consensus block (the second global consensus block) is still the first global consensus block: and therefore, invoking the local consensus service contract to search for a read dataset related to the first global consensus block in the main chain sub-ledger database, using the read dataset as a target read dataset, using a key-value pair in the target read dataset as a first key-value pair, using a key-value pair in the main chain read dataset in the local consensus block as a second key-value pair, comparing the first key-value pair with the second key-value pair, to obtain a second comparison result, and using the second comparison result as the data review result. It is to be understood that the read dataset related to the first global consensus block is obtained by searching from the data currently synchronized from the main chain sub-ledger database, and key-value data of each key-value pair in the read dataset related to the first global consensus block is consistent with key-value data of each key-value pair in the main chain read dataset. In other words, value data of a corresponding record may be found from the main chain sub-ledger database according to the key-value data of each key-value pair in the main chain read dataset, to use the key-value data of each key-value pair in the main chain read dataset and corresponding value data as the read dataset related to the first global consensus block.

Therefore, when the data review result indicates that the data review succeeds, the local consensus service contract is invoked to execute the local consensus transaction in the local consensus block, and the transaction execution result obtained by executing the local consensus transaction is used as the block consensus result when performing block consensus on the local consensus block; and in other words, when the data review result indicates that the first key-value pair is consistent with the second key-value pair, it indicates that the data review result indicates that the data review succeeds. The local consensus service contract may be invoked to read the main chain read dataset in the local consensus block, and execute the block consensus transaction in the local consensus block through the main chain read dataset that is read, to use the transaction execution result obtained by executing the local consensus transaction as the block consensus result when performing block consensus on the local consensus block. It is to be understood that when the data review result indicates that the first key-value pair is inconsistent with the second key-value pair, it indicates that the data review result indicates that the data review fails, and a subsequent consensus process is not executed.

It is to be understood that when the first comparison result indicates that the target block height is greater than the main chain binding height, it is determined that the first global consensus block and the second global consensus block are different global consensus blocks, and the local consensus node has been synchronized from the main chain to the first global consensus block. Therefore, the local consensus service contract may be invoked to search for the read dataset associated with the first global consensus block in the main chain sub-ledger database, the read dataset is used as the target read dataset, and according to the foregoing process, the target read dataset is compared with the main chain read dataset, to obtain the data review result. It is to be understood that when the read dataset associated with the first global consensus block is searched, searching is performed in the first global consensus block synchronized to the main chain sub-ledger database, and in the global contract state data associated with the first global consensus block. For the search manner, refer to the foregoing related descriptions. In other words, when the target block height is greater than or equal to the main chain binding height, the read dataset associated with the first global consensus block may be found from the main chain sub-ledger database, to be used as the target read dataset. The target read dataset is used for verifying consistency of the main chain read dataset.

It is to be understood that in a period in which the local consensus transaction is packaged into block consensus, the local consensus transaction may be resynchronized from the main chain to the global consensus block. In other words, the block height of the second global consensus block may be compared with the block height of the first global consensus block. When the block height of the second global consensus block is greater than the block height of the first global consensus block (the first comparison result indicates that the target block height is greater than the main chain binding height), it is determined that the first global consensus block and the second global consensus block are different global consensus blocks. In other words, the second global consensus block is a newly synchronized consensus block, and the second global contract state data associated with the second global consensus block is added to the main chain sub-ledger database. The second global contract state data is a read dataset that is read when executing the global consensus transaction in the second global consensus block, and the execution is implemented by invoking the global consensus service contract on the main chain in the core consensus network. It is to be understood that the to-be-confirmed data set is obtained based on the first global contract state data associated with the first global consensus block in the main chain sub-ledger database.

It is to be understood that when the block consensus result is obtained, voting consensus needs to be performed on the block consensus result, to be specific, it is determined whether the block consensus result on the local verification node is consistent with the block consensus result on the local consensus node. For example, when a specific quantity of block consensus results are the same, it indicates that the block consensus result on the local verification node is consistent with the block consensus result on the local consensus node, and a voting consensus result indicating voting approval may be generated: and when a specific quantity of block consensus results are not the same, it indicates that the block consensus result on the local verification node is inconsistent with the block consensus result on the local consensus node, and a voting consensus result indicating voting against may be generated. The local consensus node may transmit the voting consensus node to the local verification node.

S704: The local verification node performs data review on the main chain binding height and the main chain read dataset in the local consensus block, and performs voting consensus on the transaction execution result obtained by executing the local consensus transaction when the data review succeeds, to obtain a voting consensus result.

It is to be understood that a process and a principle in which the local verification node performs data review on the main chain binding height and the main chain read dataset in the local consensus block are the same as a process and a principle in which the local consensus node performs data review. In other words, it is determined whether the block height of the global consensus block that is synchronized during block consensus is greater than or equal to the main chain binding height. If the block height of the global consensus block that is synchronized during block consensus is greater than or equal to the main chain binding height, the target read dataset is searched from the main chain sub-ledger database. It is determined whether the target read dataset is consistent with the main chain read dataset. If yes, it indicates that the data review succeeds. When the data review succeeds, it indicates that there is a voting consensus permission. If the data review succeeds, the voting consensus is not performed, and the voting consensus result is not generated.

Figure 8:
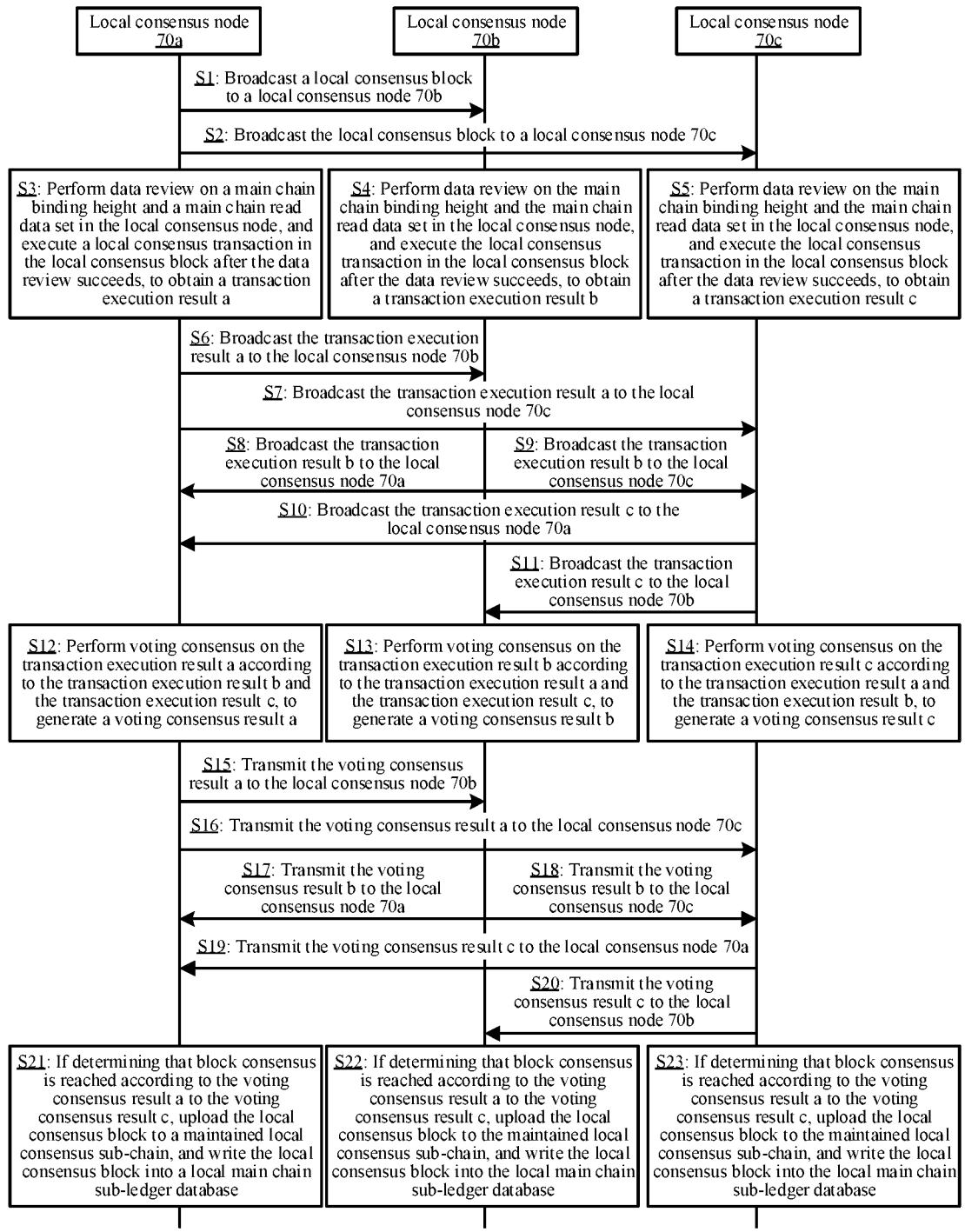
FIG. 8 is an interactive schematic diagram of block consensus according to an embodiment of this application.

It is to be understood that a process in which the local verification node executes the local consensus transaction to obtain the transaction execution result is also a process in which the local verification node performs block consensus on the local consensus block to obtain the block consensus result. Therefore, performing voting consensus on the transaction execution result may be determining whether the transaction execution result on other local consensus nodes is consistent with the transaction execution result on the local verification node, and if yes, a voting consensus result indicating voting approval is generated. In addition, after obtaining the voting consensus result, the local verification node transmits the voting consensus result to other local consensus nodes. In addition, the local verification node also receives voting consensus nodes transmitted by other local consensus nodes. For example, FIG. 8 is an interactive schematic diagram of block consensus according to an embodiment of this application. A local consensus network includes a local consensus node 70a, a local consensus node 70b, and a local consensus node 70c. After obtaining a transaction execution result, the local consensus node 70a verifies whether a transaction execution result on the local consensus node 70b and a transaction execution result on the local consensus node 70c are consistent with a transaction execution result of the local consensus node 70a and generates a corresponding voting consensus result, and transmits the voting consensus result to the local consensus node 70b and the local consensus node 70c. After obtaining the transaction execution result, the local consensus node 70b verifies whether the transaction execution result on the local consensus nodes 70a and the transaction execution result on 70c are consistent with a transaction execution result of the local consensus node 70b and generates a corresponding voting consensus result, and transmits the voting consensus result to the local consensus node 70a and the local consensus node 70c. After obtaining the transaction execution result, the local consensus node 70c verifies whether the transaction execution result on the local consensus node 70a and the transaction execution result on the local consensus node 70b are consistent with a transaction execution result of the local consensus node 70c and generates a corresponding voting consensus result, and transmits the voting consensus result to the local consensus node 70a and the local consensus node 70b.

S705: The local verification node returns the voting consensus result to the local consensus node.

S706: When determining to reach block consensus based on the block consensus result and the voting consensus result, the local consensus node uploads the local consensus block to a local consensus sub-chain corresponding to the local consensus network, and writes the local consensus block into a local consensus ledger database that is independent of the main chain sub-ledger database.

It is to be understood that the local consensus node may determine the corresponding voting consensus result according to the block consensus result, and determine whether the block consensus is reached according to the voting consensus result obtained by the local consensus node and the received voting consensus result. If it is determined that the block consensus is reached, the local consensus block is uploaded to a local consensus sub-chain corresponding to the local consensus block, and the local consensus block is written into the local consensus ledger database that is independent of the main chain sub-ledger database. Correspondingly, the local verification node also determines that the block consensus is reached, uploads the local consensus block to the corresponding maintained local consensus sub-chain, and writes the local consensus block into the local consensus ledger database.

Still referring to FIG. 8, the data exchange process includes S1 to S23, and each step is described below.

S1: A local consensus node 70a broadcasts a local consensus block to a local consensus node 70b.

S2: A local consensus node 70a broadcasts a local consensus block to a local consensus node 70c.

S3: The local consensus node 70a performs data review on a main chain binding height and a main chain read dataset in the local consensus node, and executes a local consensus transaction in the local consensus block after the data review succeeds, to obtain a transaction execution result a.

S4: The local consensus node 70b performs data review on the main chain binding height and the main chain read dataset in the local consensus node, and executes the local consensus transaction in the local consensus block after the data review succeeds, to obtain a transaction execution result b.

S5: The local consensus node 70c performs data review on the main chain binding height and the main chain read dataset in the local consensus node, and executes the local consensus transaction in the local consensus block after the data review succeeds, to obtain a transaction execution result c.

S6: The local consensus node 70a broadcasts the transaction execution result a to the local consensus node 70b.

S7: The local consensus node 70a broadcasts the transaction execution result a to the local consensus node 70c.

S8: The local consensus node 70b broadcasts the transaction execution result b to the local consensus node 70a.

S9: The local consensus node 70b broadcasts the transaction execution result b to the local consensus node 70c.

S10: The local consensus node 70c broadcasts the transaction execution result c to the local consensus node 70a.

S11: The local consensus node 70c broadcasts the transaction execution result c to the local consensus node 70b.

S12: The local consensus node 70a performs voting consensus on the transaction execution result a according to the transaction execution result b and the transaction execution result c, to generate the voting consensus result a.

The voting consensus result a indicates whether the transaction execution result b and the transaction execution result c are consistent with the transaction execution result a.

S13: The local consensus node 70b performs voting consensus on the transaction execution result b according to the transaction execution result a and the transaction execution result c, to generate the voting consensus result b.

The voting consensus result b indicates whether the transaction execution result a and the transaction execution result c are consistent with the transaction execution result b.

S14: The local consensus node 70c performs voting consensus on the transaction execution result c according to the transaction execution result a and the transaction execution result b, to generate the voting consensus result c.

The voting consensus result c indicates whether the transaction execution result a and the transaction execution result b are consistent with the transaction execution result c.

S15: The local consensus node 70a transmits the voting consensus result a to the local consensus node 70b.

S16: The local consensus node 70a transmits the voting consensus result a to the local consensus node 70c.

S17: The local consensus node 70b transmits the voting consensus result b to the local consensus node 70a.

S18: The local consensus node 70b transmits the voting consensus result b to the local consensus node 70c.

S19: The local consensus node 70c transmits the voting consensus result c to the local consensus node 70a.

S20: The local consensus node 70c transmits the voting consensus result c to the local consensus node 70b.

S21: If determining that the block consensus is reached according to the voting consensus result a to the voting consensus result c, the local consensus node 70a uploads the local consensus block to a maintained local consensus sub-chain, and writes the local consensus block into a local main chain sub-ledger database.

S22: If determining that the block consensus is reached according to the voting consensus result a to the voting consensus result c, the local consensus node 70b uploads the local consensus block to the maintained local consensus sub-chain, and writes the local consensus block into the local main chain sub-ledger database.

S23: If determining that the block consensus is reached according to the voting consensus result a to the voting consensus result c, the local consensus node 70c uploads the local consensus block to the maintained local consensus sub-chain, and writes the local consensus block into the local main chain sub-ledger database.

Figure 9:
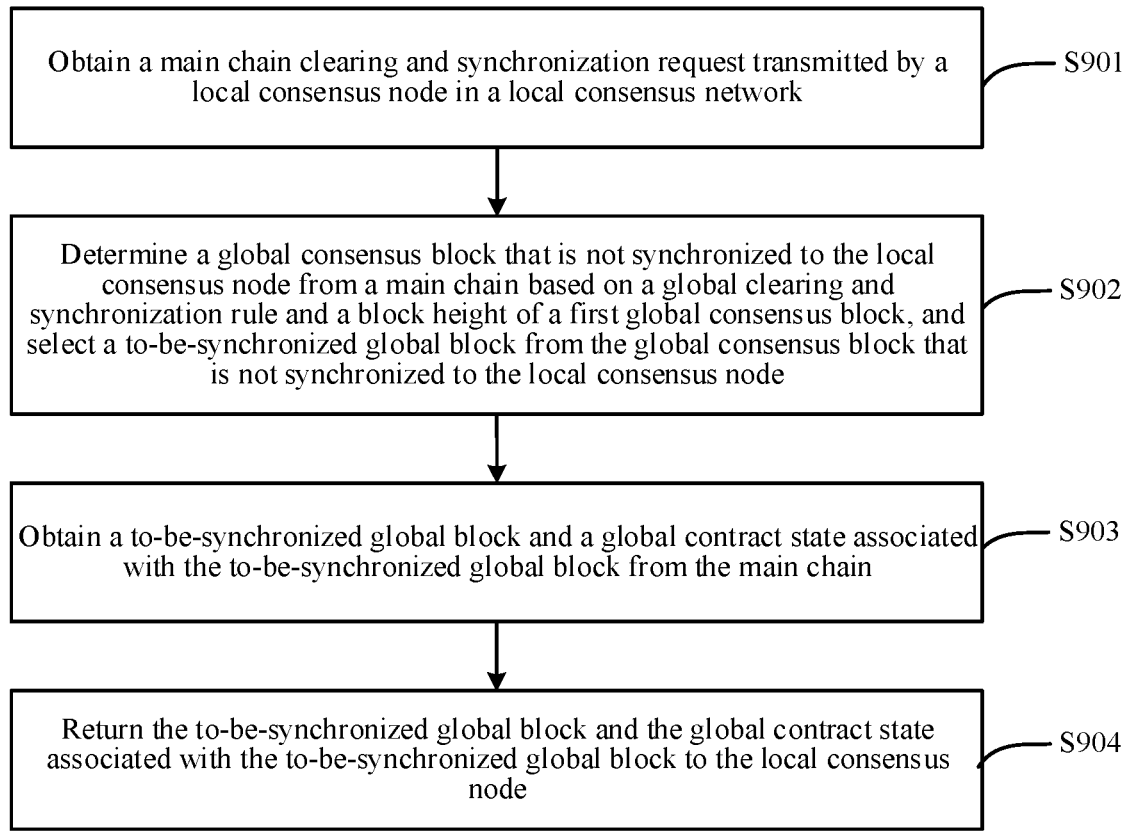
FIG. 9 is a schematic flowchart of a blockchain data processing method according to an embodiment of this application.

FIG. 9 is a schematic flowchart of a blockchain data processing method according to an embodiment of this application. As shown in FIG. 9, the method may be performed by a core consensus node in a core consensus network: and for example, the core consensus node may be any consensus node in the core consensus network 200a shown in FIG. 1. The method may include step S901 to step S904. Each step will be described below.

S901: Obtain a main chain clearing and synchronization request transmitted by a local consensus node in a local consensus network.

It is to be understood that the main chain clearing and synchronization request is used for requesting the core consensus node to obtain data to be synchronized to the local consensus node from the main chain, and return the data to be synchronized to the local consensus node to the local consensus node. The main chain clearing and synchronization request may carry a block height of a first global consensus block. The first global consensus block may be a global consensus block that the local consensus node synchronizes from the main chain when packaging a local consensus transaction: and for example, when packaging the local consensus transaction, the local consensus node may obtain a block height of the currently latest synchronized global consensus block from the main chain sub-ledger database, uses the obtained latest synchronized global consensus block as the first global consensus block, and writes the block height of the latest synchronized global consensus block into the main chain clearing and synchronization request.

S902: Determine a global consensus block that is not synchronized to the local consensus node from a main chain based on a global clearing and synchronization rule and a block height of a first global consensus block, and select a to-be-synchronized global block from the global consensus block that is not synchronized to the local consensus node.

It is to be understood that when the core consensus node determines the global consensus block that is not synchronized to the local consensus node, a global consensus block whose block height on the main chain is greater than the block height of the first global consensus block may be used as the global consensus block that is not synchronized to the local consensus node.

In this embodiment of this application, a process in which the core consensus node determines the to-be-synchronized global block may be: if determining that there is no global consensus block that is on the main chain and that is not synchronized to the local consensus node, obtaining a global consensus block corresponding to a maximum global block height from the main chain, and using the global consensus block corresponding to the maximum global block height as the to-be-synchronized global block: and if determining that there is at least one global consensus block that is on the main chain and that is not synchronized to the local consensus node, using at least one global consensus block that is not synchronized to the local consensus node as the to-be-synchronized global block.

It is to be understood that when there is no global consensus block that is on the main chain and that is not synchronized to the local consensus node, it indicates that the maximum global block height on the main chain is the block height carried in the main chain clearing and synchronization request. In other words, the local consensus block corresponding to the maximum global block height on the main chain is the first global consensus block that has been synchronized to the local consensus node. In this case, the core consensus node may return the global consensus block corresponding to the maximum global block height on the main chain to the local consensus node, to be specific, return the first global consensus block on the main chain to the local consensus node: and notification information indicating that no global consensus block is newly added may also be generated, and the notification information may be returned to the local consensus node. In addition, when it is determined that there is a global consensus block that is not synchronized to the local consensus node, it indicates that there is a newly added global consensus block on the main chain in this case. The core consensus node uses the newly added global consensus block as the to-be-synchronized global block to synchronize the to-be-synchronized global block to the local consensus node. In other words, the local consensus node may obtain the global consensus block corresponding to the maximum global block height from the main chain through the core consensus node. In other words, the local consensus node synchronizes the latest global consensus block from the main chain.

In the local consensus network in this embodiment of this application, because the block height synchronized to the consensus node used for voting consensus is greater than or equal to the block height of the first global consensus block, and there is a case that the consensus node is not synchronized to the latest global consensus block in time, the consensus node fails to perform voting consensus. Therefore, when synchronizing the global consensus block on the main chain to the local consensus node, the core consensus node may reduce the block height of the global consensus block that each local consensus node synchronizes from the main chain by buffering the block height. For example, if the block height of the global consensus block on the main chain is 100, and a buffer block height is 20, the block height of the global consensus block that the local consensus node may synchronize from the main chain is 80.

Therefore, a process of selecting the to-be-synchronized global block may be: obtaining the buffer block height, using a sum of the block height of the first global consensus block and the buffer block height as a target block height, determining a global synchronization height based on the block height of the global consensus block that is not synchronized to the local consensus node and the target block height, obtaining a global consensus block corresponding to the global synchronization height from the global consensus block that is not synchronized to the local consensus node, and using the global consensus block corresponding to the global synchronization height as the to-be-synchronized global block.

It is to be understood that a process of determining a global synchronization height may be: if the block height of the global consensus block that is not synchronized to the local consensus node is equal to a target block height, using the block height of the first global consensus block as the global synchronization height: if the block height of the global consensus block that is not synchronized to the local consensus node is greater than the target block height, obtaining the block height between the block height of the first global consensus block and the to-be-synchronized block height, and using the block height between the block height of the first global consensus block and the to-be-synchronized block height as the global synchronization height: and the to-be-synchronized block height refers to a sum of a newly added block height and the block height of the first global consensus block. The newly added block height refers to a height difference between the maximum global block height of the global consensus block on the main chain and the target block height.

In other words, when it is determined that the block height of the global consensus block that is not synchronized to the local consensus node is greater than the target block height, it indicates that there is a newly added global consensus block on the main chain between a previous data synchronization period and this data synchronization period. In this case, the block height of the main chain increases, and a difference between the block height of the main chain and the block height of the first global consensus block is greater than the buffer block height. Therefore, the to-be-synchronized global block may be determined according to a quantity of newly added global consensus blocks between the previous data synchronization period and this data synchronization period. In other words, L global consensus blocks are newly added between the previous data synchronization period and this data synchronization period, and L global consensus blocks may be sequentially synchronized to the local consensus node, where L is a positive integer.

For example, if a block height of the first global consensus block is 80 and a buffer block height is 20, a target block height is 100. If a block height of the global consensus block on the main chain is 103 in this case, it indicates that 3 global consensus blocks are newly added on the main chain in this period. Therefore, a newly added block height is 3: and in this case, starting from a next global consensus block of the first global consensus block, 3 global consensus blocks are sequentially synchronized to the local consensus node, which means that a global synchronization height is 81, 82, and 83.

Correspondingly, when it is determined that the block height of the global consensus block that is not synchronized to the local consensus node is equal to the target block height, it indicates that there is no newly added global consensus block on the main chain between a previous data synchronization period and this data synchronization period. In this case, the block height of the main chain does not increase, and a difference between the block height of the main chain and the block height of the first global consensus block is equal to the buffer block height: and therefore, the first global consensus block may be obtained from the main chain and synchronized to the local consensus node, or notification information indicating that no global consensus block is newly added is generated, and the notification information is returned to the local consensus node. Through the foregoing process, the main chain data synchronization on the local consensus node may be completed. It is to be understood that a main chain data synchronization process of each local consensus node in the local consensus network is the same.

S903: Obtain a to-be-synchronized global block and a global contract state associated with the to-be-synchronized global block from the main chain.

It is to be understood that the global contract state is a read dataset that is read when executing the global consensus transaction in the to-be-synchronized global block. The global consensus transaction is executed by the global consensus service contract on the main chain in the core consensus network.

S904: Return the to-be-synchronized global block and the global contract state associated with the to-be-synchronized global block to the local consensus node.

It is to be understood that when the to-be-synchronized global block and the global contract state associated with the to-be-synchronized global block are returned to the local consensus node, if being in a period in which the local consensus node packages the local consensus transaction and performs block consensus, the to-be-synchronized global block may be the second global consensus block synchronized from the local consensus node. The local consensus node may store the to-be-synchronized global block and the global contract state in the main chain subledger database in the local consensus node.

An embodiment of this application further provides a blockchain data processing method, performed by a core consensus node in a core consensus network, the core consensus network being deployed in a multi-layer chain network, a local consensus network being deployed in a service network independent of the core consensus network in the multi-layer chain network, the local consensus network including a local consensus node, and the method including: obtaining a main chain synchronization request transmitted by the local consensus node, the main chain synchronization request carrying a block height of a third global consensus block, and the third global consensus block being a global consensus block that the local consensus node synchronizes from a main chain before synchronizing a first global consensus block: determining, from the main chain, a global consensus block whose block height is greater than the block height of the third global consensus block as the first global consensus block that is not synchronized to the local consensus node: obtaining a first global contract state of the first global consensus block from the main chain: the first global contract state being a read dataset that is read when a global consensus transaction in the first global consensus block is executed: and returning the first global consensus block and the first global contract state to the local consensus node, the local consensus node being configured to package a local consensus transaction, a main chain binding height, and a main chain read dataset into a local consensus block based on a block height of the first global consensus block and the first global contract state, and upload the local consensus block to the local consensus network when reaching consensus on the local consensus block based on the local consensus network.

Figure 10:
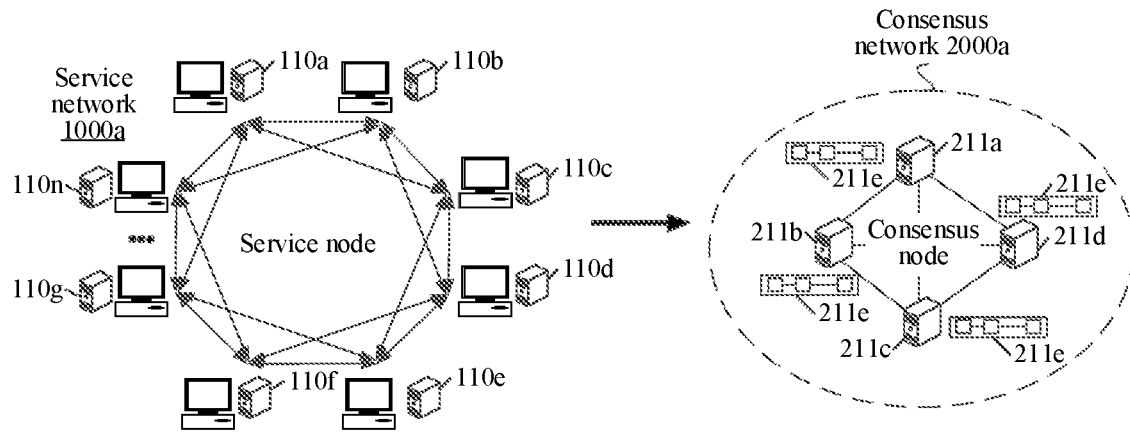
FIG. 10 is a schematic diagram of a level structure of a blockchain network.

FIG. 10 is a schematic diagram of a level structure of a blockchain network. The level structure shown in FIG. 10 is applied to a blockchain electronic bill system. A blockchain network corresponding to the blockchain electronic bill system includes a service network 1000a deployed in a public network and a consensus network 2000a deployed in a private cloud.

In the service network 1000a shown in FIG. 10, a plurality of service nodes are deployed. A service node 110a, a service node 110b, a service node 110c, a service node 110d, a service node 110e, a service node 110f, a service node 110g, . . . , and a service node 110n are exemplarily shown. A quantity of service nodes deployed in the service network 1000a is not limited herein. It is to be understood that the service nodes in the service network 1000a do not need to participate in accounting. In addition, each service node running in the service network 1000a may access one or more consensus networks through network communication, and consensus networks may also perform data exchange with each other through network communication.

It is to be understood that in the consensus network 2000a as shown in FIG. 10, a plurality of consensus nodes are deployed. A consensus node 211a, a consensus node 211b, a consensus node 211c, and a consensus node 211d are exemplarily shown. A quantity of consensus nodes deployed in the consensus network 2000a is not limited herein. In addition, as shown in FIG. 10, for a plurality of consensus nodes running in the consensus network 2000a, a blockchain 211e is jointly maintained.

For ease of understanding, in this embodiment of this application, the service node and the consensus node that are located in the blockchain electronic bill system corresponding to FIG. 10 may be collectively referred to as blockchain nodes (referred to as nodes for short), and the consensus network 2000a participating in the blockchain electronic bill system corresponding to FIG. 10 may be referred to as a core consensus network, and each node in the core consensus network in FIG. 10 may be collectively referred to as a core consensus node. It is to be understood that in a blockchain electronic bill system corresponding to FIG. 10, the service network and the consensus network may interact with each other through a routing boundary.

In the blockchain electronic bill system in FIG. 10, the core consensus node is configured to perform performing consensus in the core consensus network in which the corresponding blockchain is located. In other words, the core consensus node is the consensus node in the core consensus network. A process of writing transaction data in the core consensus network in FIG. 10 into a corresponding blockchain ledger (for example, a distributed database) may be: A client transmits the transaction data to a specific service node, and then the transaction data is transmitted between service nodes in the service network in the blockchain network in the form of a baton until the consensus node (for example, the consensus node 211b in the consensus network 2000a) in the core consensus network in the blockchain network receives the transaction data; in this case, the consensus node (for example, the consensus node 211b in the consensus network 2000a) then packages the transaction data into a block, to perform consensus among other consensus nodes: and when reaching consensus, writes the block into a distributed database of the core consensus network (for example, the consensus network 2000a) in which the block is located.

It is to be understood that in the blockchain electronic bill system in FIG. 10, a smart contract may be deployed on a blockchain of the core consensus network. The smart contract is code executed by each blockchain node (namely, each consensus node) in the blockchain electronic bill system. Through the smart contract, any logic may be executed and a result is obtained. For example, when a transaction service request is received through the client, the smart contract that has been deployed on the blockchain (for example, the blockchain 211e) of the corresponding core consensus network (for example, the consensus network 2000a) is invoked, to respond to the transaction service request. In addition, the smart contracts may be distinguished by a contract invoking address, a contract identity document (ID), or a contract name. The transaction service request initiated by the client may also carry the contract invoking address, the contract identity document, or the contract name of the smart contract, to specify a smart contract that needs to be run.

In FIG. 10, a service node in the service network may transmit the transaction service request to the consensus node (for example, the consensus node 211a) in the corresponding core consensus network, to perform identity authentication on the transaction service request through a chain entry of the corresponding core consensus network, and authorize to transmit the transaction service request to another consensus node (for example, the consensus node 211b) in the corresponding core consensus network when the identity authentication succeeds, to invoke the smart contracts running in these consensus nodes (for example, the consensus node 211a and the consensus node 211b shown in FIG. 10) to execute the transaction service requested by the user.

Based on the level structure of the blockchain network shown in FIG. 10, this embodiment of this application further provides a multi-layer blockchain. The multi-layer blockchain includes a main chain and a local consensus sub-chain under the main chain. The main chain may be maintained through the core consensus node in the consensus network in the level structure of the blockchain network in FIG. 10, and the local consensus node used for maintaining the local consensus sub-chain under the main chain may be located in the service network. The local consensus sub-chain may also be referred to as a local sub-chain, a local chain, or the like. It is to be understood that a quantity of local consensus sub-chains under the main chain may be one or more. A local consensus network corresponding to each local consensus sub-chain may be used for processing a transaction submitted by a service node in one region, and different local consensus networks may be used for processing transactions submitted by service nodes in different regions: and a core consensus network corresponding to the main chain may be used for processing a global transaction or summarization information submitted by each local consensus sub-chain. It is to be understood that in the multi-layer blockchain, one local consensus sub-chain usually stores a transaction associated with the corresponding local consensus sub-chain. In other words, transactions associated with service nodes in different regions are stored on different local consensus sub-chains: and therefore, when archiving transactions associated with service nodes in each region, transactions on the local consensus sub-chains corresponding to different regions may be separately archived, to implement controllability of separately archiving transactions associated with service nodes in different regions, and to ensure data isolation during archiving, thereby ensuring security of data archiving.

For example, in the electronic bill system, the core consensus network corresponding to the main chain is used for performing nationwide bill service processing: under the main chain, one local consensus sub-chain may be deployed for each provincial-level region. The local consensus network corresponding to each local consensus sub-chain is used for performing data exchange with service nodes in the provincial-level region, to perform bill service processing in the provincial-level region: and the local consensus network used for performing bill service processing in the provincial-level region may also be referred to as a provincial-level local consensus network, and a local consensus sub-chain maintained by the provincial-level local consensus network may be referred to as a provincial-level local consensus sub-chain. In addition, in the provincial-level local consensus network, a regional local consensus network with finer granularity (compared with the corresponding granularity of the provincial-level local consensus network) may be further subdivided: and for example, under the provincial-level local consensus sub-chain, one local consensus sub-chain (which may be referred to as a district-level local consensus sub-chain) may be deployed for each district-level region. A local consensus network (which may be referred to as a district-level local consensus network) corresponding to each district-level local consensus sub-chain may be used for performing data exchange with a service node in the district-level region, to perform bill service processing in the district-level region.

Figure 11:
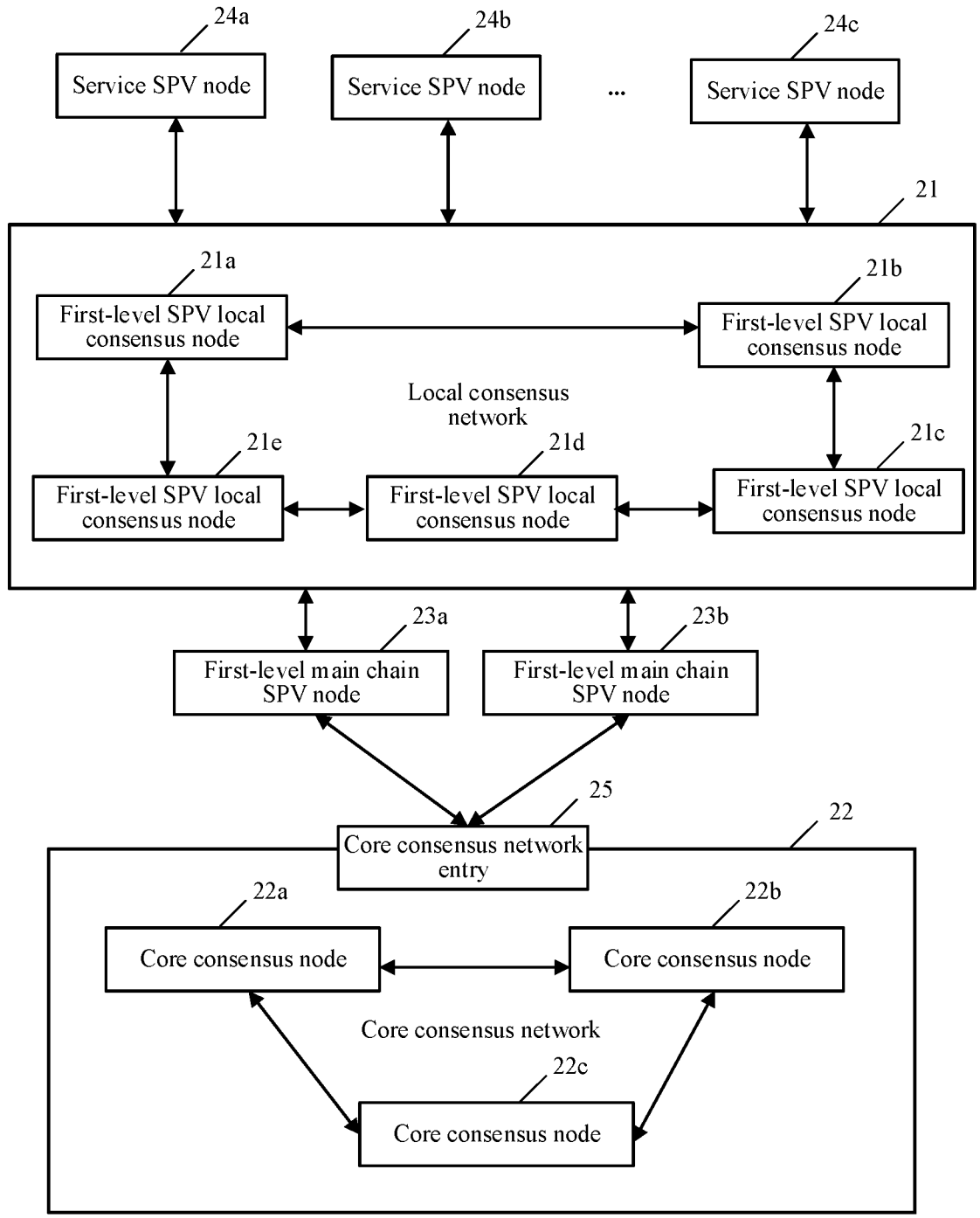
FIG. 11 is a schematic diagram of a structure of a multi-layer blockchain network according to an embodiment of this application.

FIG. 11 is a schematic diagram of a structure of a multi-layer blockchain network according to an embodiment of this application. As shown in FIG. 11, the multi-layer blockchain network may include a local consensus network 21 and a core consensus network 22. The local consensus network 21 (for example, a provincial-level local consensus network) may be used for maintaining a local consensus sub-chain and performing processing on a service transaction (for example, an electronic bill service transaction) submitted by a service node in a first-level (for example, provincial-level) region. A consensus node in the local consensus network 21 may be a lightweight node (an SPV node), also referred to as a first-level SPV local consensus node (also referred to as a local consensus node), for example, a first-level SPV local consensus node 21a, a first-level SPV local consensus node 21b, a first-level SPV local consensus node 21c, a first-level SPV local consensus node 21d, and a first-level SPV local consensus node 21e shown in FIG. 11. It is to be understood that the multi-layer blockchain network may also include a plurality of local consensus networks, to perform processing on service transactions in different first-level regions. Only the local consensus network 21 is used as an example for description. For local consensus networks corresponding to other first-level regions, refer to the related description of the local consensus network 21.

A core consensus network 22 is used for maintaining a main chain in the multi-layer blockchain and performing processing on an overall (for example, nationwide) electronic bill service. A blockchain node in the core consensus network may be referred to as a core consensus node, such as a core consensus node 22a, a core consensus node 22b, and a core consensus node 22c shown in FIG. 11. It is to be understood that the local consensus network 21 may perform data exchange with the core consensus network 22, so that a secure and efficient service flow system may be constructed on the premise that the local consensus network and the core consensus network cooperate with each other. It is to be understood that the electronic bill system based on the multi-layer blockchain network is conducive to level service processing, which may ensure that each region independently runs a region-level service and reduce service traffic on the main chain. In addition, on the premise of data isolation, service privacy isolation, and legality compliance, a service carried by the core consensus network may be further reduced, and global management may be implemented when improving execution efficiency of a global task.

In the multi-layer blockchain network, data exchange may be performed between the local consensus network 21 and the core consensus network 22 through the first-level main chain SPV node. In the multi-layer blockchain network, a plurality of first-level main chain SPV nodes (a first-level main chain SPV node 23a and a first-level main chain SPV node 23b as shown in FIG. 11) may be included. A role, data, and a permission of each first-level main chain SPV node are completely the same. For example, the first-level main chain SPV node may synchronize ledger data on the main chain maintained by the core consensus network to the local consensus node in the local consensus network, so that the local consensus node may perform service processing based on the ledger data of the main chain.

It is to be understood that the first-level main chain SPV node may also receive a main chain service transaction submitted by each service object through the client; and for example, when archiving the local consensus sub-chain, the service object may submit an archiving configuration transaction that is used for indicating archiving of local consensus data on the local consensus sub-chain. Then the first-level main chain SPV node may forward the received archiving configuration transaction to a core consensus network entry 25, so that the core consensus network portal 25 forwards the received archiving configuration transaction to the core consensus node used for processing the service transaction, such as the core consensus node 22a, the core consensus node 22b, and the core consensus node 22c in FIG. 11. In this embodiment of this application, the first-level main chain SPV node may further receive a service transaction transmitted by the local consensus node, and forward the service transaction transmitted by the local consensus node to the core consensus network entry 25: and for example, during execution of archiving services, the first-level main chain SPV node may receive a digest transmitting transaction (referred to as a first digest transmitting transaction or a second digest transmitting transaction) determined by the local consensus node (the first-level SPV local consensus node 21a as shown in FIG. 11) based on digest information of to-be-archived local consensus data, and forward the digest transmitting transaction to the core consensus network entry 25, so that the core consensus network entry 25 may forward the received digest transmitting transaction to the core consensus node.

It is to be understood that the multi-layer blockchain network may further include service SPV nodes, such as a service SPV node 24a, a service SPV node 24c, and a service SPV node 24b in FIG. 11. The service SPV node may be a service node in a region corresponding to the local consensus network 21, and may perform data exchange with the local consensus network 21 to perform regional service processing. For example, the first-level SPV local consensus node (the first-level SPV local consensus node 21a as shown in FIG. 11) in the local consensus network may receive a service transaction (also referred to as a local service transaction) transmitted by the service SPV node (the service SPV node 24a as shown in FIG. 11) for the local consensus sub-chain. Then the first-level SPV local consensus node (the first-level SPV local consensus node 21a as shown in FIG. 11) verifies legality of the received local service transaction, and performs packaging consensus on the local service transaction that passes verification, to upload the local service transaction to the first-level local consensus sub-chain.

It is to be understood that the service transaction submitted to the local consensus network 21 is not forwarded to the core consensus network, instead, service processing on the service transaction is completed in the local consensus network. Certainly, summarization information in the local consensus network may also be uploaded to the core consensus network. For example, the local consensus network 21 may perform a lottery service according to an invoice. After receiving a lottery service transaction for the local consensus sub-chain 21, the first-level SPV local consensus node (the first-level SPV local consensus node 21a shown in FIG. 11) in the local consensus network 21 does not forward each lottery service transaction to the core consensus network. However, after completing a cycle of lottery service, results of the lottery in the cycle may be summarized. For example, information such as a quantity of times of drawing each award in the cycle is summarized, and then the summarization information is uploaded to the core consensus network 22.

It is to be understood that the first-level local consensus network 21 may synchronize the ledger data on the main chain, and store the ledger data that is obtained by clearing and that is associated with the first-level local consensus network 21. Therefore, when performing processing on the local service transaction, the local consensus network may reference data synchronized from the main chain, such as a read key-value set of a contract state of the contract that is used when the main chain executes the transaction in the block. For example, if the service object draws a lottery based on an electronic bill that is issued based on the main chain, and the lottery service transaction is performed in the local consensus network, the local consensus node may determine related data required for the lottery service transaction from the data that is stored by the local consensus node and that is synchronized from the main chain, for example, data such as a list of companies that may participate in the lottery drawing and a proportion of companies participating in the lottery drawing. Then processing is performed on the lottery service transaction based on the data that is related to the lottery service transaction and that is synchronized from the main chain.

It is to be understood that in addition to the first-level local consensus network, there is a next-level local consensus network (for example, a provincial-level local consensus network may further include a district-level local consensus network) and a service SPV node. These nodes no longer synchronize the ledger data of the main chain, but may indirectly obtain service-related main chain service information from the first-level local consensus network: and in addition, these nodes may synchronize the ledger data of the first-level local consensus network, and also obtain ledger data related to these nodes (such as the district-level local consensus network and the service SPV node) in a manner of secure SPV data clearing.

Figure 12:
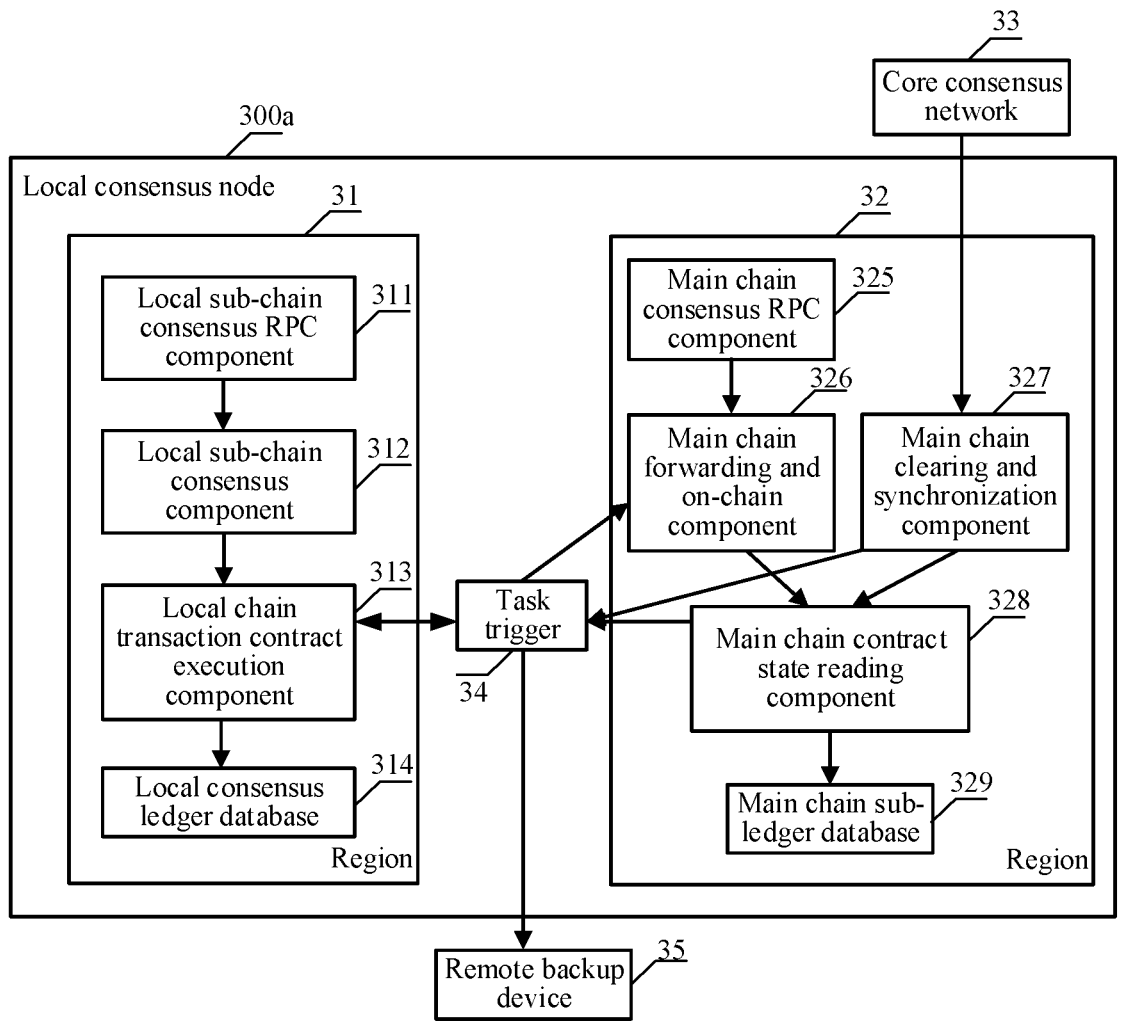
FIG. 12 is a schematic diagram of a structure a local consensus node according to an embodiment of this application.

For ease of understanding, FIG. 12 is a schematic diagram of a structure a local consensus node according to an embodiment of this application. As shown in FIG. 12, the local consensus node 300a may be any local consensus node in a local consensus network, such as a first-level SPV local consensus node 21a, a first-level SPV local consensus node 21b, and the like in the local consensus network 21 shown in FIG. 11. The local consensus node 300a may include components shown in a region 31 and a region 32. The component in the region 31 is used for receiving a local service transaction, packaging the local service transaction into a block, and performing block consensus and on-chain processing on the block obtained by packaging, to obtain a local consensus block on a local consensus sub-chain: and the component in the region 32 is used for synchronizing data on a main chain and obtaining main chain data (for example, when executing the local service transaction, referencing a contract state on the main chain) related to the component by clearing from the synchronized main chain data, and may further generate a service transaction to be executed by a core consensus network, and transmit the service transaction to be executed by the core consensus network to the core consensus network.

It is to be understood that the local consensus node 300a may synchronize a global consensus block on the main chain, a contract state associated with the global consensus block, and the ledger data (denoted as main chain synchronization data) from the core consensus network 33 (which may be a core consensus node in the core consensus network 33) through a main chain clearing and synchronization component 327, based on a chain identifier of a local consensus sub-chain maintained by the local consensus node 300a, clear data associated with the local consensus node 300a from the main chain synchronization data, also referred to as data associated with the local consensus sub-chain maintained by the local consensus node 300*a*, and write the main chain synchronization data that is obtained by clearing and that is associated with the local consensus node into a main chain sub-ledger database 329. It is to be understood that the main chain sub-ledger database 329 may be used for storing the ledger data associated with the local consensus node that is obtained by clearing from the global consensus block synchronized from the main chain:

It is to be understood that when generating a service transaction to be uploaded to the main chain, the local consensus node 300*a* may trigger a main chain consensus RPC component 325 to invoke a main chain forwarding and on-chain component 326, to forward the service transaction to be uploaded to the main chain to the core consensus network 33, and then the core consensus node in the core consensus network 33 may write the received service transaction into the main chain: and for example, the main chain consensus RPC component 325 may perform transaction verification on a digest transmitting transaction to be uploaded to the main chain, and invoke the main chain forwarding and on-chain component 326 through the main chain consensus RPC component 325, to forward the digest transmitting transaction whose transaction verification succeeds to the core consensus network 33. In this embodiment of this application, the local consensus node 300*a* may further transmit a service transaction to be transmitted to the core consensus network to a first-level main chain SPV node through the main chain forwarding and on-chain component 326, then the first-level main chain SPV node forwards the service transaction to a core consensus network entry, and then the core consensus network entry forwards the service transaction to the core consensus node used for processing the service transaction.

It is to be understood that when receiving a local service transaction (for example, a local consensus transaction transmitted by a service object through a service node), the local consensus node 300*a* may invoke the local sub-chain consensus RPC component 311 to perform transaction verification on the local consensus transaction and put the local sub-chain consensus RPC component 311 into a transaction pool, and then invoke a local sub-chain consensus component 312 through the local sub-chain consensus RPC component 311 to obtain the cached local service transaction from the transaction pool. The local sub-chain consensus component 312 packages the obtained local service transaction to obtain a block proposal (referred to as a proposed block). In this case, a main chain contract state reading component 328 may be invoked through the local sub-chain consensus component 312, to obtain a main chain binding height and a main chain read dataset from the main chain sub-ledger database, and the local sub-chain consensus component 312 jointly packages the obtained main chain binding height and main chain read dataset into the block proposal, so that the block proposal may perform state binding with the main chain through the main chain binding height, and the main chain data may be referenced through the main chain read dataset: and because the block proposal in this case is a local consensus block on which consensus is to be reached, when the local sub-chain consensus component 312 performs block consensus on the local consensus block on which consensus is to be reached, the local consensus block on which consensus is to be reached may be broadcast to a local verification node in the local consensus network to perform voting consensus on the local consensus block on which consensus is to be reached. If consensus is reached by voting, the local consensus block on which consensus is reached by voting may be used as the local consensus block on the local consensus sub-chain. It is to be understood that the local consensus data (such as the ledger data of the local consensus block and a contract state of a contract on a local sub-chain) on the local consensus sub-chain may be stored in a local consensus ledger database 314 in the local consensus node 300*a*.

It is to be understood that when performing review and voting on the local consensus block through the local sub-chain consensus component 312, in addition to performing a regular inspection on block header information and a format, a signature, validity, and the like of each transaction, the local consensus node 300*a* may further perform data review on the main chain binding height and the main chain read dataset in the local consensus block. The data review process is similar to the data review process described in FIG. 2. This is not repeatedly described in this embodiment of this application herein. In this embodiment of this application, to resolve a problem that because the main chain binding height is too new, too many nodes (greater than a node quantity threshold) fail to vote, the main chain binding height is less than a latest main chain block height by a specific threshold, such as at least 20 block heights.

It is to be understood that the local consensus sub-chain 300*a* may invoke a corresponding service transaction contract through a local chain transaction contract execution component 313 to perform service processing. For example, when detecting an archiving task event, the local consensus node may invoke a contract for performing archiving task processing through the local chain transaction contract execution component 313 to perform data archiving.

It is to be understood that the local consensus node 300*a* may further include a task trigger 34. The task trigger 34 may be triggered when detecting that the main chain clearing and synchronization component 327 obtains a task event by clearing, and then the task trigger may determine a type of the task event, and schedule the task event based on the determined type to execute a corresponding task. For example, the main chain clearing and synchronization component 327 may obtain a task event that matches the local consensus sub-chain maintained by the local consensus node by clearing, and then the task trigger may detect a type corresponding to the task event that is obtained by clearing. When detecting that the task event is the archiving task event, the task trigger triggers a local chain transaction contract execution component 313 to invoke a target archiving service contract used for processing the archiving task event on the local consensus sub-chain, to perform processing on the archiving task event. In this embodiment of this application, the task trigger 34 may further perform information forwarding and scheduling in a process of performing task processing. For example, the local consensus node 300*a* may transmit to-be-archived local consensus data to a remote backup device 35 (such as a server) through the task trigger 34; and in another example, the local consensus node 300*a* may trigger the main chain forwarding and on-chain component 326 through the task trigger 34 to upload a transaction to be transmitted to the core consensus network 33.

Based on FIG. 12, this embodiment of this application proposes a multi-layer blockchain data processing solution, which may be executed by a local consensus node (300*a* in FIG. 12) including a main chain clearing and synchronization component: when obtaining the archiving task event by clearing from a first block synchronized from the main chain through the main chain clearing and synchronization component, the local consensus node transmits a digest (such as a block data digest) corresponding to the to-be-archived local consensus data to a core consensus node corresponding to the main chain, and when a digest confirmation event is obtained by clearing from the main chain to a second block through the main chain clearing and synchronization component, transmits the to-be-archived local consensus data (such as to-be-backed up ledger data) to the remote backup device for backup; and then when receiving a remote backup signature (referred to as a first backup signature) returned by the remote backup device, the local consensus node transmits the remote backup signature to the core consensus node, so that when successfully comparing the digest with the remote backup signature, the core consensus node determines that the to-be-archived local consensus data has been backed up to the remote backup device.

In this embodiment of this application, the local consensus node may be controlled to archive local consensus data (for example, ledger data of an archiving block stored locally by the local consensus node) of the local consensus node according to the currently obtained archiving task command through mutual cooperation between multi-layer blockchains, to implement controllability when archiving local consensus data on the local consensus sub-chain. In addition, because before backing up local ledger data of the local consensus node to the remote backup device, the local consensus node uploads a digest of the locally stored archiving block of the local consensus node to the main chain through the core consensus node. Compared with uploading an original text of the transaction in the archiving block stored locally to the main chain through the core consensus node, the local consensus node may ensure asynchronization of the original text of the transaction executed locally by the local consensus node. Therefore, when archiving the local consensus data on the local consensus sub-chain, privacy and security of the transaction executed on the local consensus node may be ensured. In addition, in the data archiving process, the core consensus node may further compare the digest with the first backup signature, thereby ensuring data security of the ledger backup information backed up on the remote backup device in the archiving process of the local consensus data on the local consensus sub-chain.

Figure 13:
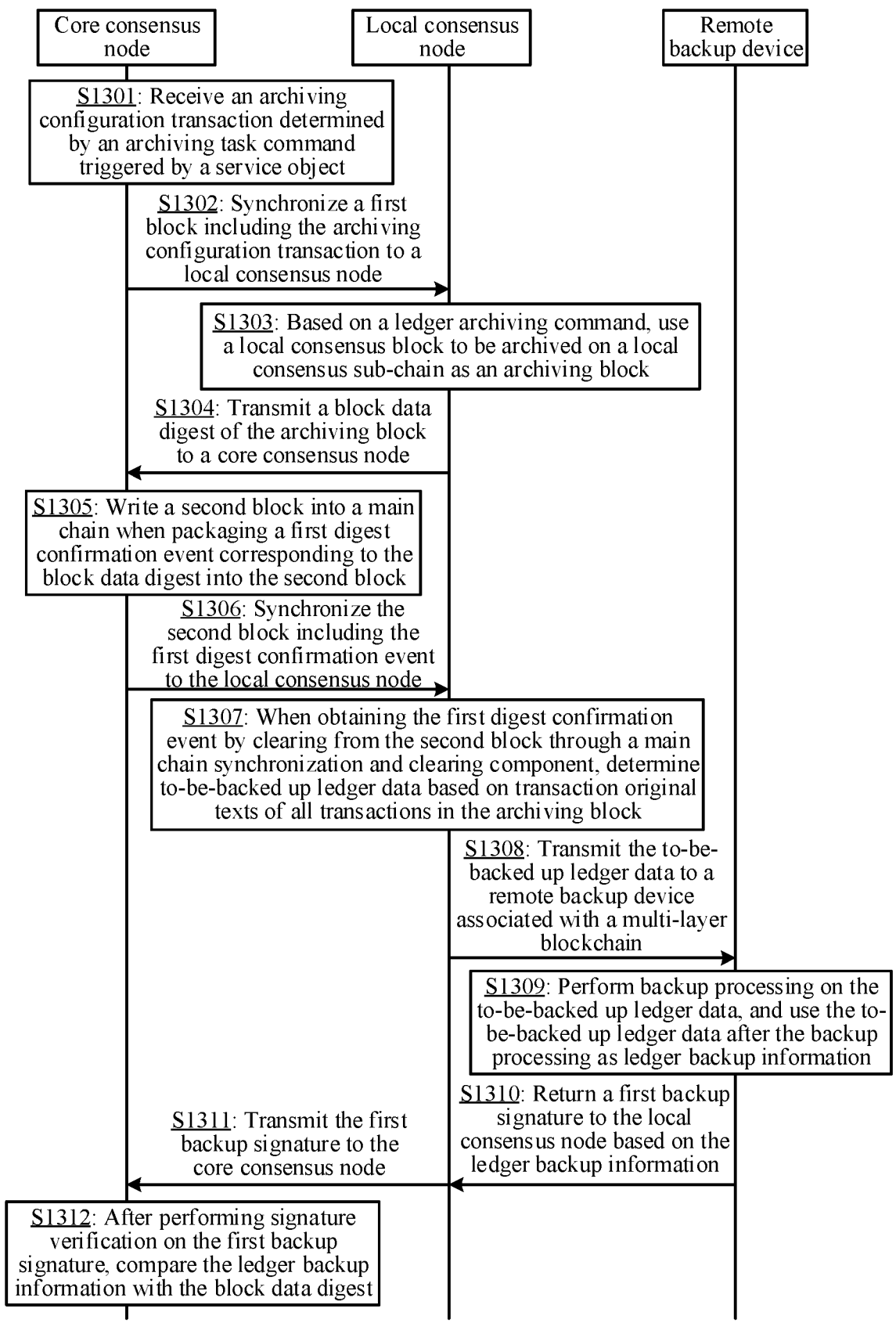
FIG. 13 is a schematic flowchart of a multi-layer blockchain data processing process according to an embodiment of this application.

The archiving process of the local consensus data on the local consensus sub-chain is described below with reference to the illustration. FIG. 13 is a schematic flowchart of a multi-layer blockchain data processing process according to an embodiment of this application. An example of a process of archiving ledger data on a local consensus sub-chain is used for description. First, a core consensus node receives an archiving configuration transaction determined by an archiving task command triggered by a service object (step S1301); then, the core consensus node synchronizes a first block including the archiving configuration transaction to a local consensus node (step S1302): the first block belongs to a main chain consensus block on a main chain; the local consensus node may obtain an archiving task event that matches a chain identifier of a local consensus sub-chain by clearing from the first block through a main chain clearing and synchronization component (a main chain clearing and synchronization component 327 as shown in FIG. 12): when an archiving task command indicated by the archiving task event is a ledger archiving command, the local consensus node uses a to-be-archived local consensus block on the local consensus sub-chain as an archiving block based on the ledger archiving command (step S1303): then the local consensus node may determine a block data digest corresponding to the archiving block, and the local consensus node may trigger a local chain transaction contract execution component (the local chain transaction contract execution component 313 shown in FIG. 12) through a task trigger (the task trigger 34 as shown in FIG. 12) to determine the block data digest: and next, the local consensus node transmits the block data digest of the archiving block to the core consensus node (step S1304). The local consensus node may trigger a main chain forwarding and on-chain component (the main chain forwarding and on-chain component 326 as shown in FIG. 12) through the task trigger to transmit the block data digest to the core consensus node.

After receiving the block data digest, the core consensus node writes a second block into the main chain when packaging a first digest confirmation event corresponding to the block data digest into the second block (step S1305): and then the core consensus node synchronizes the second block including the first digest confirmation event to the local consensus node (step S1306). When obtaining the first digest confirmation event by clearing from the second block through a main chain synchronization and clearing component (the main chain synchronization and clearing component 327 shown in FIG. 12), the local consensus node determines to-be-backed up ledger data based on transaction original texts of all transactions in the archiving block (step S1307): then the local consensus node transmits the to-be-backed up ledger data to a remote backup device associated with a multi-layer blockchain (step S1308): the remote backup device performs backup processing on the to-be-backed up ledger data, and uses the to-be-backed up ledger data after the backup processing as ledger backup information (step S1309): then returns the first backup signature to the local consensus node based on the ledger backup information (step S1310): after receiving the first backup signature, the local consensus node transmits the first backup signature to the core consensus node (step S1311): and after performing signature verification on the first backup signature, the core consensus node compares the ledger backup information with the block data digest (step S1312), and when the comparison succeeds, the core consensus node determines that the to-be-backed up ledger data has been successfully backed up to the remote backup device.

In this embodiment of this application, when determining that the to-be-backed up ledger data has been successfully backed up to the remote backup device, the core consensus node may further generate backup success information, and then return the backup success information to the local consensus node, so that when receiving the backup success information, the local consensus node clears the to-be-backed up ledger data that has been successfully backed up, to reduce storage pressure on the local consensus node.

Figure 14:
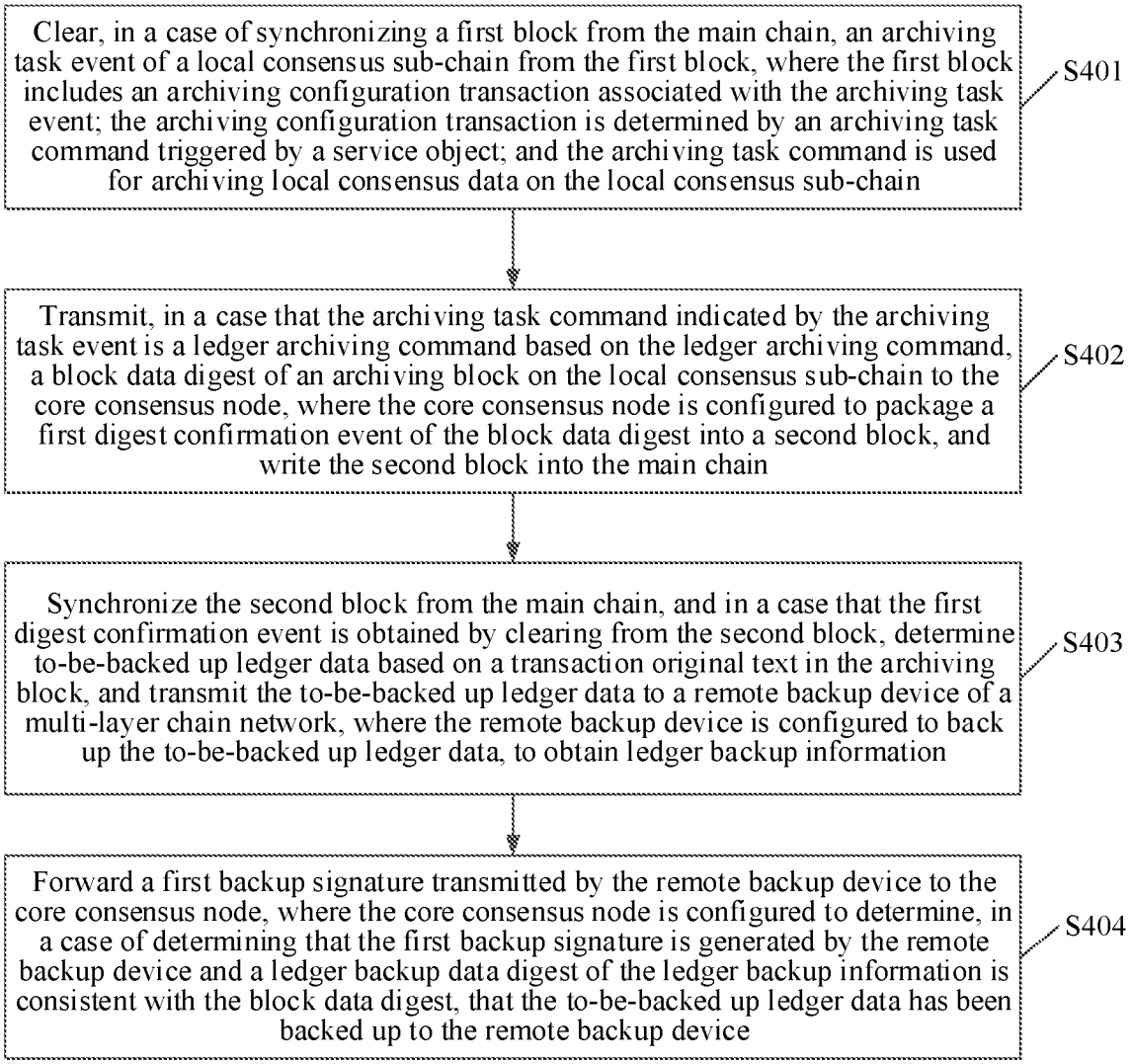
FIG. 14 is a schematic flowchart of a multi-layer blockchain data processing method according to an embodiment of this application.

An embodiment of this application provides a multi-layer blockchain data processing method. FIG. 14 is a schematic flowchart of a multi-layer blockchain data processing method according to an embodiment of this application. The method is performed by a local consensus node including a main chain clearing and synchronization component. The multi-layer blockchain data processing method may include step S401 to step S404. Each step will be described below.

S401: Clear, when synchronizing a first block from the main chain, an archiving task event of the local consensus sub-chain from the first block, where the first block includes an archiving configuration transaction associated with the archiving task event: the archiving configuration transaction is determined by an archiving task command triggered by a service object: and the archiving task command is used for archiving local consensus data on the local consensus sub-chain.

It is to be understood that a core consensus node associated with the main chain may receive an archiving configuration transaction submitted by the service object: and after verifying legality of the archiving configuration transaction, the core consensus node packages the archiving configuration transaction into the first block, and then the core consensus node may synchronize the first block to the local consensus node.

It is to be understood that the service object is an object (for example, a personal or corporate account) that includes a trigger permission of an archiving task command. For example, the service object may be a management account of an electronic bill system based on a dual-layer chain network: and then, the service object may trigger the archiving task command based on a corresponding service device, to archive the local consensus data on the local consensus sub-chain, and the service object may determine the archiving configuration transaction based on the archiving task command, and submit the archiving task configuration transaction to the core consensus node associated with the main chain.

It is to be understood that when triggering the archiving task command, the service object may specify a chain identifier of a to-be-archived local consensus sub-chain. In other words, an archiving command parameter of the archiving task command may include the chain identifier of the to-be-archived local consensus sub-chain: and then the local consensus node may obtain the chain identifier of the to-be-archived local consensus sub-chain from a transaction parameter of the archiving configuration transaction determined by the archiving task command, so that the local consensus node may obtain an archiving task event of the archiving configuration transaction by clearing from the first block based on the obtained chain identifier. Generally, the service object may archive the local consensus data on the local consensus sub-chain whose generation time point is a specific time threshold before the current time point, which is also referred to as archiving cold data. For example, ledger data corresponding to the local consensus block generated 10 days ago may be archived.

It is to be understood that the local consensus node may clear the main chain consensus block (referred to as the first block) that the main chain synchronizes to the local consensus node through a main chain clearing and synchronization component, to obtain ledger data and contract data (also referred to as a contract state) that are associated with the local consensus sub-chain maintained by the local consensus node.

It is to be understood that the local consensus node may determine the ledger data and the contract data that are associated with the local consensus sub-chain from the first block based on the chain identifier of the local consensus sub-chain. For example, the first block includes an archiving configuration transaction. When the chain identifier of the to-be-archived local consensus sub-chain indicated by a transaction parameter of the archiving configuration transaction is the same as the chain identifier of the local consensus sub-chain maintained by the local consensus node, it is determined that the archiving configuration transaction is a transaction (also referred to as a transaction associated with the local consensus node) associated with the local consensus sub-chain maintained by the local consensus node, and an archiving task event is generated based on the archiving configuration transaction, which is equivalent to obtaining the archiving task event that matches the chain identifier of the local consensus sub-chain by obtaining by clearing from the first block.

S402: transmit, when the archiving task command indicated by the archiving task event is a ledger archiving command based on the ledger archiving command, a block data digest of an archiving block on the local consensus sub-chain to the core consensus node, where the core consensus node is configured to package a first digest confirmation event of the block data digest into a second block, and write the second block into the main chain.

It is to be understood that the local consensus node may include a task trigger. Then when the main chain clearing and synchronization component obtains an archiving task event that matches the local consensus sub-chain maintained by the local consensus node by clearing, the task trigger may detect a type corresponding to a task event that is obtained by clearing. If the task trigger detects that the type of the task event is the archiving task event, and an archiving task command indicated by the archiving task event is a ledger archiving command corresponding to the local consensus data, the local consensus data on the local consensus sub-chain may be archived according to an instruction of the ledger archiving command.

It is to be understood that the ledger archiving command is used for indicating archiving of a transaction original text in the local consensus block on the local sub-chain, which is equivalent to archiving the ledger data in the local consensus block. When triggering the ledger archiving command, the service object may further specify a maximum block height of a to-be-archived local consensus block on the local consensus sub-chain. In other words, an archiving command parameter of the ledger archiving command may include the chain identifier of the to-be-archived local consensus sub-chain and the maximum block height of the to-be-archived local consensus block. Then, the transaction parameter of the archiving configuration transaction determined based on the ledger archiving command may also include the chain identifier of the to-be-archived local consensus sub-chain, and the maximum block height of the to-be-archived local consensus block. Therefore, when obtaining the archiving task event by clearing based on the first block, the local consensus node may obtain the maximum block height of the to-be-archived local consensus block from the archiving command parameter of the ledger archiving command indicated by the archiving task event.

It is to be understood that the local consensus node further includes a local consensus ledger database: the local consensus ledger database is used for storing ledger data of a local consensus block on the local consensus sub-chain, the main chain sub-ledger database is further used for storing ledger data associated with the local consensus node, and the stored ledger data is obtained by clearing from a global consensus block synchronized to the main chain: and the local consensus node determines an archiving block on the local consensus sub-chain, including: determining, by the local consensus node, a to-be-archived block height of the local consensus sub-chain based on the archiving command parameter indicated by the ledger archiving command, where the to-be-archived block height is a maximum block height of a to-be-archived local consensus block on the local consensus sub-chain; determining an archived block height of the local consensus sub-chain from the ledger data stored in the main chain sub-ledger database, where the to-be-archived block height is greater than the archived block height; obtaining an intermediate block height between the archived block height and the to-be-archived block height, and using a local consensus block corresponding to the intermediate block height as the archiving block: and It is to be understood that the archiving command parameter of the ledger archiving command includes the maximum block height of the to-be-archived local consensus block, so that the local consensus node may use the maximum block height of the to-be-archived local consensus block in the archiving command parameter as the to-be-archived block height.

It is to be understood that the maximum block height of the to-be-archived local consensus block on the local consensus sub-chain is a height value of the maximum block height of the to-be-archived local consensus block indicated by the ledger archiving command. A height value that is different from a maximum block height of an unarchived local consensus block on the local consensus sub-chain. For example, a height value of a block height of the latest local consensus block on the local consensus sub-chain is 120, namely, the maximum block height of the unarchived local consensus block on the local consensus sub-chain is 120. The ledger archiving command indicates to archive the local consensus block before the height value is 100. In other words, the maximum block height of the to-be-archived local consensus block on the local consensus sub-chain is 100. Therefore, it may be determined that the height value of the to-be-archived block height in the local consensus sub-chain is 100.

It is to be understood that if there is an archived local consensus block height on the local consensus sub-chain in the main chain sub-ledger database, the block height of the archived local consensus block on the local consensus sub-chain may be used as the archived block height: and for example, if the height value of the block height of the archived local consensus block on the local consensus sub-chain is n, it indicates that the local consensus block whose height value ranges from 0 to n (including n) on the local consensus sub-chain has been archived, to be specific, the archived block height is n. It is to be understood that a block height between the archived block height and the to-be-archived block height is an intermediate block height, which may not include the archived block height, but includes the to-be-archived block height.

For example, if the to-be-archived block height included in the archiving command parameter indicated by the ledger archiving command is 100, and the archived block height found in the main chain sub-ledger database is 80, the local consensus block (excluding 80 and including 100) whose height value ranges from 80 to 100 is used as the archiving block.

It is to be understood that if the archived block height is not found in the main chain sub-ledger database, it may indicate that ledger data of the local consensus block on the local consensus sub-chain is not currently archived. Subsequently, archiving may be started from a first local consensus block (a local consensus block whose block height is 1) of the local consensus sub-chain.

In this embodiment of this application, the local consensus node determines the to-be-archived block height of the local consensus sub-chain based on the archiving command parameter indicated by the ledger archiving command: and the local consensus node searches for the archived block height from the ledger data stored in the main chain sub-ledger database. If the archived block height is not found, a first local consensus block on the local consensus sub-chain to the local consensus block corresponding to the to-be-archived block height are used as archiving blocks.

It is to be understood that if the archived block height is not found in the ledger data stored in the main chain sub-ledger database, the archived block height may be denoted as a specified value (for example, 0), and all local consensus blocks before the to-be-archived block height on the local consensus sub-chain are used as archiving blocks.

For example, if the to-be-archived block height determined by the archiving command parameter is 100, and the archived local consensus block is not found in the main chain sub-ledger database, it indicates that the block on the local consensus sub-chain is not archived, and 100 local consensus blocks before the block height 100 on the local consensus sub-chain may be used as archiving blocks.

In this embodiment of this application, the local consensus node may invoke a target archiving service contract on the local consensus sub-chain, to determine a block data digest based on block data of the archiving block: and then, at least one first digest transmitting transaction is generated according to the block data digest, and at least one first digest transmitting transaction is transmitted to the core consensus node, so that the core consensus node generates a first digest confirmation event based on the at least one first digest transmitting transaction.

It is to be understood that the target archiving service contract is a smart contract deployed on the local consensus sub-chain and is used for performing archiving service processing. It is to be understood that when invoking the target archive service contract to determine the block data digest, each archiving block may determine a corresponding block data digest. It is to be understood that a block data digest corresponding to any archiving block may include information such as a block header hash, a block hash, a transaction type, and a timestamp of the archiving block. The determined block data digest is used by a core consensus node to subsequently verify whether the archiving block is successfully backed up.

It is to be understood that the first digest transmitting transaction is a digest transmitting transaction generated according to the block data digest. A data amount of the generated first digest transmitting transaction is determined according to a data amount of the block data digest. For example, one first digest transmitting transaction may be used for transmitting a target data amount of the block data digest, and then block data digests of all archiving blocks may be divided into at least one according to the target data amount. Then, one first digest transmitting transaction is determined according to each piece of data, and at least one first digest transmitting transaction corresponding to at least one piece of data is obtained. It is to be understood that the local consensus node may trigger a main chain forwarding and on-chain component to transmit at least one first digest transmitting transaction to the core consensus node through the task trigger.

It is to be understood that after receiving all first digest transmitting transactions, the core consensus node generates a first digest confirmation event. The first digest confirmation event is used for indicating that the core consensus node has received the block data digest on the local consensus sub-chain.

It is to be understood that when generating the first digest confirmation event, the core consensus node may generate the first digest confirmation transaction associated with the first digest confirmation event, and package the first digest confirmation transaction into the second block, so that the first digest confirmation event may be packaged into the second block: and finally, the core consensus node writes the second block into the main chain.

It is to be understood that a transaction parameter of the first digest confirmation transaction carries a chain identifier of the local consensus sub-chain of the first digest transmitting transaction, so that the local consensus node may perform data clearing based on the chain identifier. In addition, the second block and the first block on the main chain are different global consensus blocks, and a block height of the first block is less than a block height of the second block.

S403: Synchronize the second block from the main chain, and when the first digest confirmation event is obtained by clearing from the second block, determine to-be-backed up ledger data based on a transaction original text in the archiving block, and transmit the to-be-backed up ledger data to a remote backup device of the multi-layer chain network, where the remote backup device is configured to back up the to-be-backed up ledger data, to obtain ledger backup information.

It is to be understood that the method for the local consensus node to clear the second block through the main chain clearing and synchronization component is similar to the method for clearing the first block. This is not repeatedly described in this embodiment of this application herein.

It is to be understood that a block body of the local consensus block on the local consensus sub-chain may include a plurality of transactions, and each transaction has a corresponding transaction original text, also referred to as a ledger quantity: the local consensus node may obtain transaction original texts of all transactions in each local consensus block through the local consensus ledger database (as shown in the local consensus ledger database 314 in FIG. 12). In other words, the transaction original texts of all the transactions in the archiving block are stored in the local consensus ledger database, and the transaction original texts of all the transactions in the archiving block may be determined from the local consensus ledger database: and for example, if a block height of the archiving block is (80,100], the transaction original texts of all the transactions in a plurality of local consensus blocks corresponding to the height (80,100] are determined from the local consensus ledger database.

It is to be understood that the local consensus node determines the to-be-backed up ledger data based on the transaction original texts of all the transactions in the archiving block, which may be determining the transaction original texts of all the transactions in the archiving block as the to-be-backed up ledger data. It is also possible to determine the transaction original text of the transaction in the archiving block and the block data digest of the archiving block as the to-be-backed up ledger data.

It is to be understood that the remote backup device may be configured to back up the local consensus data on the local consensus sub-chain. Generally, the remote backup device may be some independent hardware storage devices, which may reduce waste of storage resources for archiving data. In addition, after receiving the to-be-backed up ledger data transmitted by the local consensus node, the remote backup device may back up the to-be-backed up ledger data. In this way, backup of the to-be-backed up ledger data in the archiving block may be implemented, to transfer the local consensus data stored on the local consensus node to the remote backup device, thereby reducing storage pressure of the local consensus node.

In this embodiment of this application, in a target time period after the block data digest is transmitted to the core consensus node, if the first digest confirmation event is not obtained by clearing through the main chain clearing and synchronization component, the block data digest of the archiving block is transmitted to the core consensus node again.

It is to be understood that the target time period is one preset timeout retransmission time period. If the first digest confirmation event returned by the core consensus node is not obtained by clearing after the target time period, the block data digest is uploaded to the core consensus node again. For example, the target time period is 10 minutes. Timing starts after the block data digest is transmitted to the core consensus node. If the local consensus node still does not obtain the first digest confirmation event by clearing through the main chain clearing and synchronization component after 10 minutes, the block data digest of the archiving block is transmitted to the core consensus node again. It is to be understood that in an archiving process, the local consensus node backs up the to-be-archived ledger data corresponding to the archiving block to the remote backup device after receiving the digest confirmation event returned by the core consensus node, reliability of uploading the block data digest is ensured through the timeout retransmission mechanism and fault tolerance of the archiving process is improved.

S404: Forward a first backup signature transmitted by the remote backup device to the core consensus node, where the core consensus node is configured to determine, when determining that the first backup signature is generated by the remote backup device and a ledger backup data digest of the ledger backup information is consistent with the block data digest, that the to-be-backed up ledger data has been backed up to the remote backup device.

It is to be understood that when using the to-be-backed up ledger data after the backup processing as ledger backup information, the remote backup device may generate a first backup signature based on the ledger backup information. The first backup signature is used for indicating that the remote backup device has performed backup processing on the to-be-backed up ledger data.

It is to be understood that when generating the first backup signature based on the ledger backup information, the remote backup device may generate the first remote backup confirmation information based on the ledger backup information, and perform signature processing on the first remote backup confirmation information by using a private key in the remote backup device, to obtain first signature information, and obtain the first backup signature based on the first remote backup confirmation information and the first signature information. The first remote backup confirmation information is the ledger backup data digest determined based on the ledger backup information. The method for determining the ledger backup data digest may be consistent with the method for determining the block data digest, so that the core consensus node may determine consistency based on the first remote backup confirmation information and the block data digest.

It is to be understood that the core consensus node performs signature verification on the first backup signature, which may be performing verification on the first backup signature through a public key corresponding to the remote backup device, thereby ensuring that the first backup signature uploaded by the local consensus node is generated by the remote backup device, and ensuring that the first backup signature is not tampered with. The core consensus node compares the ledger backup information corresponding to the first backup signature with the block data digest, and may verify that the ledger backup information indicated by the first backup signature has been backed up to the remote backup device.

In this embodiment of this application, if the ledger backup data digest corresponding to the first remote backup confirmation information in the first backup signature is consistent with the block data digest received by the core consensus node, it indicates that the ledger backup information corresponding to the first backup signature is successfully compared with the block data digest, and the core consensus node may determine that the to-be-backed up ledger data has been backed up to the remote backup device.

It is to be understood that the core consensus node may store the received block data digest and the first backup signature, to determine the remote backup device backed up by the local consensus block corresponding to the block data digest through the public key corresponding to the first backup signature, and may find the remote backup ledger information of the local consensus block indicated by the block data digest from the determined remote backup device.

It is to be understood that when determining that the to-be-backed up ledger data has been successfully backed up to the remote backup device, the core consensus node may further generate first backup success information, to notify the local consensus node that the to-be-backed up ledger data has been successfully backed up to the remote backup device. The local consensus node clears, when receiving first backup success information returned by the core consensus node, the to-be-backed up ledger data that has been backed up to the remote backup device, where the first backup success information is generated by the core consensus node when determining that the to-be-backed up ledger data has been successfully backed up.

It is to be understood that when the to-be-backed up ledger data that has been backed up to the remote backup device is cleared, all the to-be-backed up ledger data in the local consensus node may be cleared, or all transactions in the archiving block and the transaction original texts of all the transactions are removed, to reserve block header data of the archiving block.

It is to be understood that the to-be-backed up ledger data that has been backed up to the remote backup device in the local consensus node is cleared, which is equivalent to transferring some cold data in the local consensus node to the remote backup device for storage, thereby reducing storage pressure on the local consensus node.

It is to be understood that the local consensus node may obtain the block synchronized from the main chain to the first backup success information by clearing through the component clearing and synchronization component, and may store the first backup success information in the main chain sub-ledger database. In this way, the first backup success information may include a maximum block height of the local consensus block that has been backed up to the remote backup device. Then the next time the archiving task event used for indicating archiving of the ledger data is obtained by clearing, a block height of the archived local consensus block on the local consensus sub-chain may be found from the ledger data stored in the main chain sub-ledger database, and the next block archiving is performed based on the block height of the found archived local consensus block. For example, if the maximum block height of the local consensus block that has been backed up to the remote backup device in the first backup success information is 100, the block height of the archived local consensus block on the current local consensus sub-chain is 100.

Figure 15:
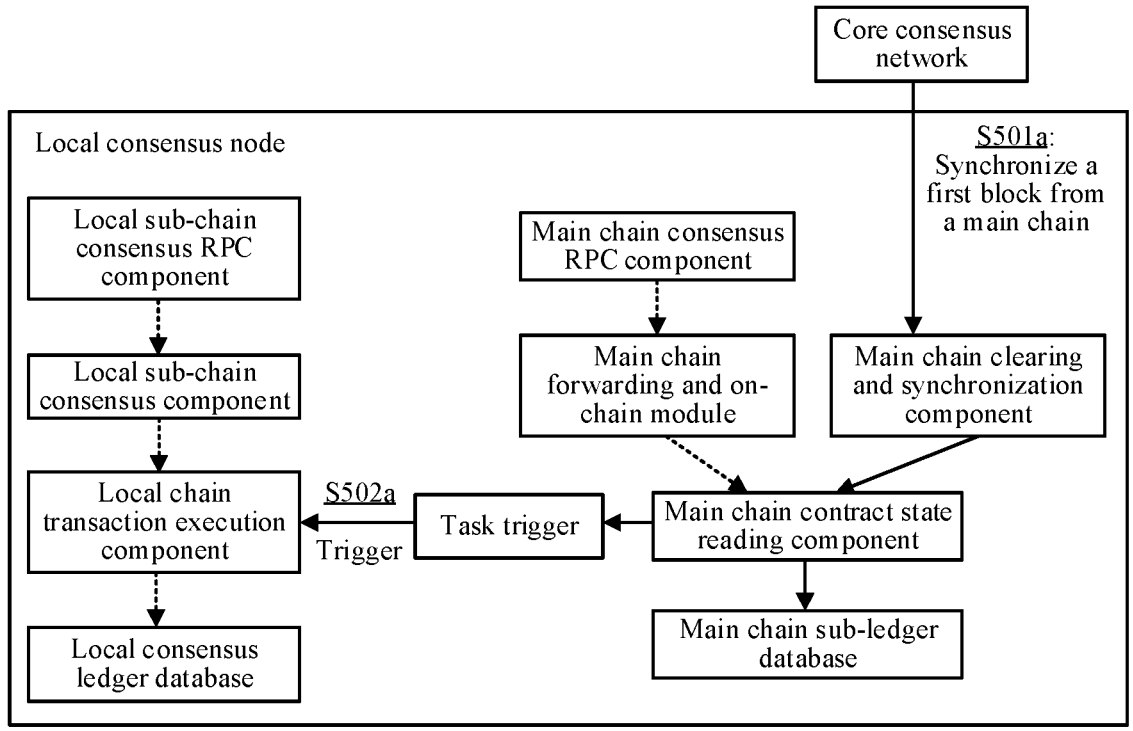
FIG. 15 is a schematic flowchart of a ledger data archiving process according to an embodiment of this application.

For example, FIG. 15 is a schematic flowchart of a ledger data archiving process according to an embodiment of this application. As shown in FIG. 15, a local consensus node synchronizes a first block from a main chain through a main chain clearing and synchronization component (step S501$a$), and obtains ledger data and an archiving task event that are related to the local consensus node from the first block by clearing. A task trigger detects a type of the archiving task event when detecting that a clearing and synchronization component obtains the archiving task event by clearing. If an archiving task command indicated by the archiving task event is a ledger archiving command, the task trigger triggers a local chain transaction execution component (step S502$a$), so that the local chain transaction execution component may invoke a corresponding target service archiving contract to determine a block data digest of a to-be-archived local consensus block (also referred to as an archiving block).

Figure 16:
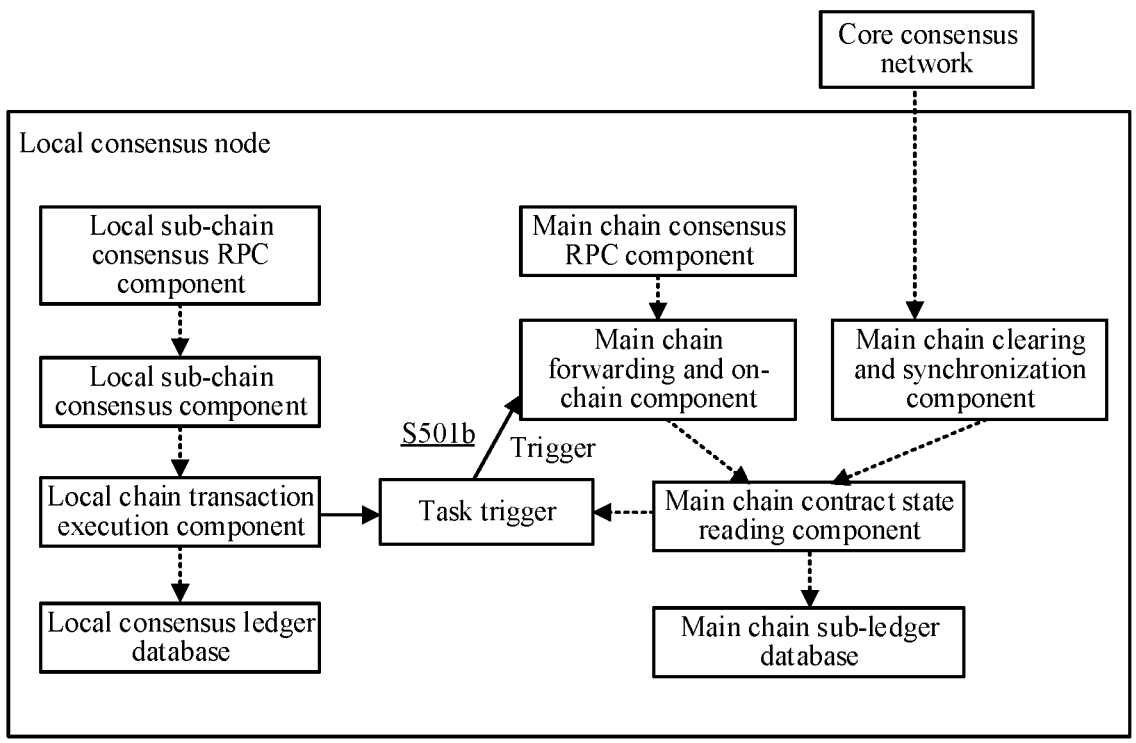
FIG. 16 is a schematic flowchart of a ledger data archiving process according to an embodiment of this application.

FIG. 16 is a schematic flowchart of a ledger data archiving process according to an embodiment of this application. When a local chain transaction execution component determines a block data digest of a to-be-archived local consensus block, a task trigger triggers a main chain forwarding and on-chain component (step S501$b$), so that the main chain forwarding and on-chain component transmits a block data digest to a core consensus network. When transmitting the block data digest to the core consensus network, a local consensus node may put the block data digest into at least one first digest transmitting transaction, thereby transmitting the block data digest to the core consensus network in the form of a transaction.

Figure 17:
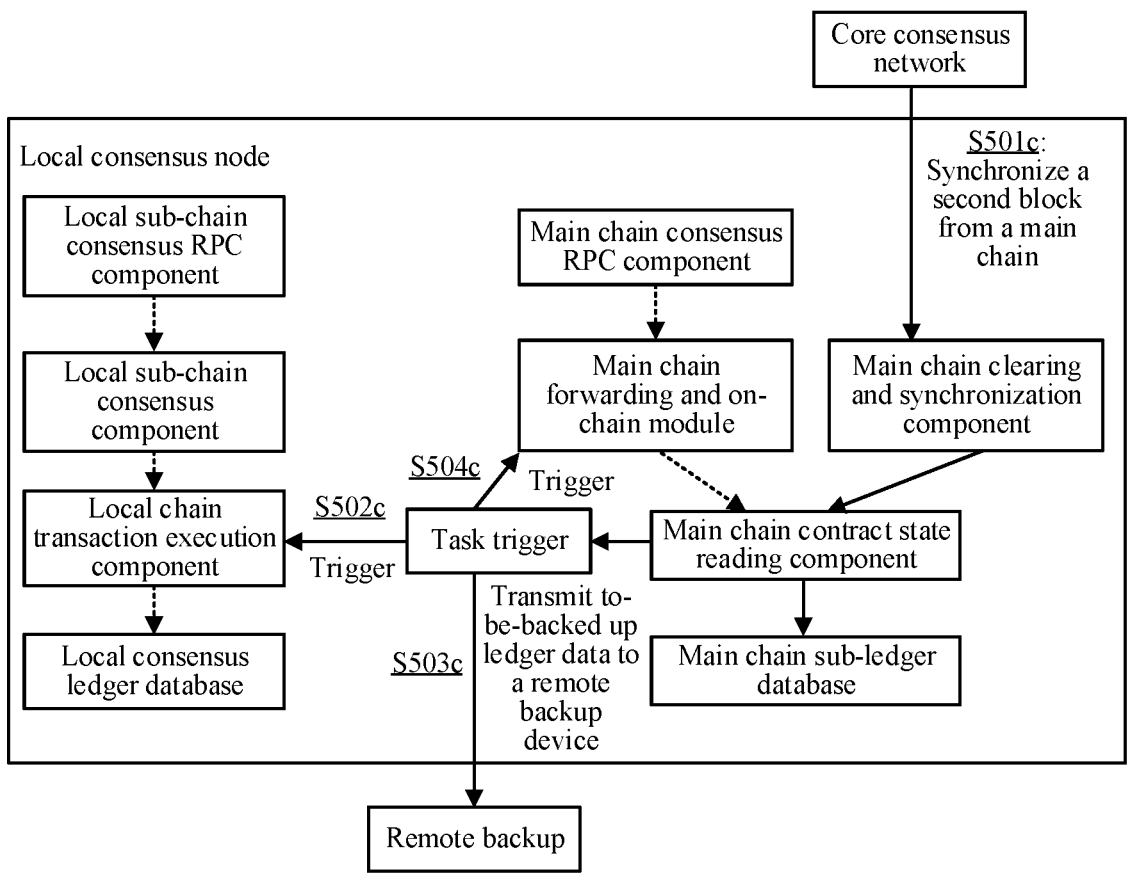
FIG. 17 is a schematic flowchart of a ledger data archiving process according to an embodiment of this application.

FIG. 17 is a schematic flowchart of a ledger data archiving process according to an embodiment of this application. A local consensus node synchronizes a second block from a main chain through a main chain clearing and synchronization component (step S501$c$), and clears ledger data related to the local consensus node from the second block, to obtain a first digest confirmation event by clearing, and when the main chain clearing and synchronization component obtains a first digest confirmation event by clearing, a task trigger triggers a local chain transaction execution component (step S502$c$), so that the local chain transaction execution component invokes a corresponding target archiving service contract to determine to-be-backed up ledger data corresponding to an archiving task event; and then the task trigger transmits the to-be-backed up ledger data to a remote backup device (step S503$c$). The remote backup device may further return one first backup signature to the local consensus node after performing backup processing on the to-be-backed up ledger data. When receiving the first backup signature, the local consensus node triggers the main chain forwarding and on-chain component through the task trigger (step S504$c$), so that the main chain forwarding and on-chain component uploads the first backup signature to a core consensus network. A core consensus node in the core consensus network performs a consistency comparison based on the first backup signature and a block data digest, and when the comparison succeeds, determines that backup of the to-be-backed up ledger data succeeds, and then generates first backup success information.

The local consensus node may receive the first backup success information transmitted by the core consensus node in the core consensus network, and then clear the to-be-backed up ledger data that is successfully backed up. The first backup success information may be packaged into a fourth block by the core consensus node, and then the local consensus node may synchronize a fourth block from the main chain through the main chain clearing and synchronization component, and obtain ledger data related to the local consensus node from the fourth block by clearing. When detecting that the main chain clearing and synchronization component obtains the first backup success information by clearing through the task trigger, the local consensus node triggers the local chain transaction execution component, so that the local chain transaction execution component invokes a corresponding target archiving service contract to clear the to-be-backed up ledger data backed up to the remote backup device.

Figure 18:
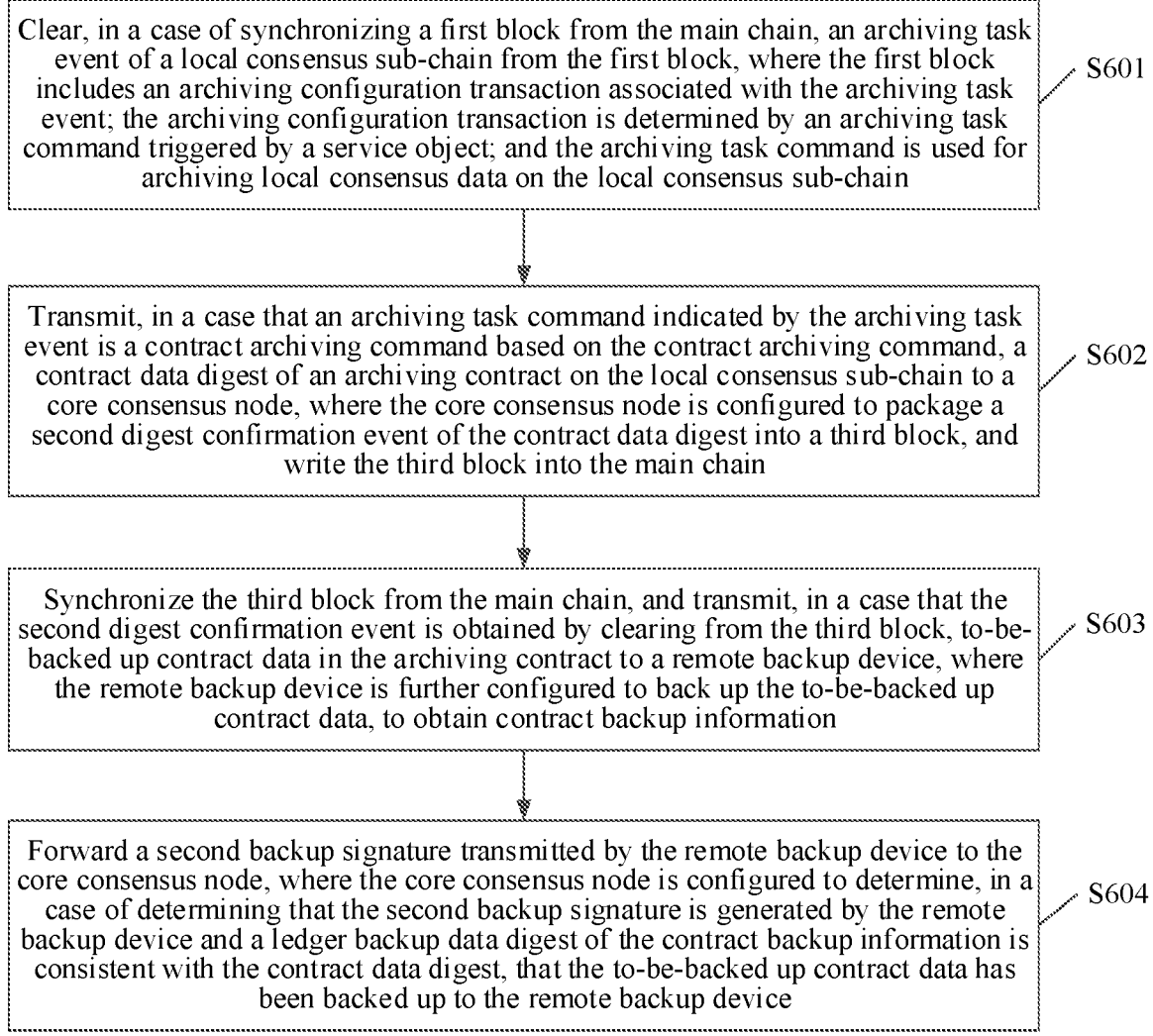
FIG. 18 is a schematic flowchart of a multi-layer blockchain data processing method according to an embodiment of this application.

An embodiment of this application provides a multi-layer blockchain data processing method. FIG. 18 is a schematic flowchart of a multi-layer blockchain data processing method according to an embodiment of this application. The method is performed by a local consensus node and includes step S601 to step S604.

S601: Clear, when synchronizing a first block from the main chain, an archiving task event of the local consensus sub-chain from the first block, where the first block includes an archiving configuration transaction associated with the archiving task event: the archiving configuration transaction is determined by an archiving task command triggered by a service object: and the archiving task command is used for archiving local consensus data on the local consensus sub-chain.

It is to be understood that for step S601, refer to the related description of step S401. This is not described again herein.

S602: transmit, when an archiving task command indicated by the archiving task event is a contract archiving command based on the contract archiving command, a contract data digest of an archiving contract on the local consensus sub-chain to a core consensus node, where the core consensus node is configured to package a second digest confirmation event of the contract data digest into a third block, and write the third block into the main chain.

It is to be understood that the task trigger in the local consensus node triggers the main chain clearing and synchronization component, to obtain a task event that matches the local consensus sub-chain maintained by the local consensus node by clearing, the task trigger may detect a type corresponding to a task event that is obtained by clearing. If the task trigger detects that the task event is the archiving task event, and an archiving task command indicated by the archiving task event is a contract archiving command corresponding to the local consensus data, the local consensus data (contract data of a contract) on the local consensus sub-chain may be archived according to an instruction of the contract archiving command.

It is to be understood that the contract archiving command corresponding to the local consensus data is used for indicating archiving of the contract data on the local consensus sub-chain. Therefore, when triggering the contract archiving command, a service object specifies a chain identifier of the local consensus sub-chain that requests to be archived, the contract identifier of the to-be-archived contract on the local consensus sub-chain, and a maximum contract index value of the to-be-archived contract: therefore, a command parameter of the contract archiving command includes the chain identifier of the local consensus sub-chain that requests to be archived, the contract identifier of the to-be-archived contract on the local consensus sub-chain, and the maximum contract index value of the to-be-archived contract: then, a transaction parameter of the archiving configuration transaction determined based on the contract archiving command includes the chain identifier that requests to be archived, the contract identifier of the to-be-archived contract, and the maximum contract index value of the to-be-archived contract: and therefore, when obtaining the archiving task event from the first block including the archiving configuration transaction by clearing, the local consensus node may obtain the archiving command parameter of the contract archiving task command indicated by the archiving task event, and the archiving command parameter includes the chain identifier of the local consensus sub-chain that requests to be archived, the contract identifier of the to-be-archived contract on the local consensus sub-chain, and the maximum contract index value of the to-be-archived contract. It is to be understood that the contract identifier of the to-be-archived contract in the contract archiving command may be a contract invoking address, a contract identity document, or a contract name. This is not limited herein. The contract index value is a data sequence index in the contract, such as serial numbers 0, 1, 2, 3, and the like.

In this embodiment of this application, the local consensus node may determine the to-be-archived contract on the local consensus sub-chain based on the contract identifier indicated by the archiving command parameter in the contract archiving command, and use the to-be-archived contract on the local consensus sub-chain as the archiving contract.

It is to be understood that the main chain sub-ledger database is further used for storing contract data associated with the local consensus node, and the stored contract data is obtained by clearing from a global consensus block synchronized to the main chain; and based on the contract archiving command, the local consensus node transmits the contract data digest of the archiving contract on the local consensus sub-chain to the core consensus node, including: determining, by the local consensus node, a to-be-archived contract index value in the archiving contract based on an archiving command parameter indicated by the contract archiving command, where the to-be-archived contract index value is a maximum to-be-archived contract index value in the archiving contract: searching an archived contract index value in the archiving contract from ledger data stored in the main chain sub-ledger database, where the to-be-archived contract index value is greater than the archived contract index value: determining, based on a contract index value between the archived contract index value and the to-be-archived contract index value, the to-be-backed up contract data in the archiving contract on the local consensus sub-chain: and transmitting contract data digest information of the to-be-archived contract data to the core consensus node.

It is to be understood that when invoking a contract to perform service processing, the local consensus node may update a contract state of the contract, where the contract state may be a state value of a contract parameter represented by a key-value pair in the contract, and determine the contract index value of the contract state: and the next time invoking the contract to perform service processing, update the contract state again, and determine a contract index value of the updated contract state, where the contract index value determined this time is 1 greater than the contract index value determined previously. In addition, when archiving contract data in the contract, archiving may be performed according to the contract index value of the contract state (also referred to as contract data) of the contract.

It is to be understood that the archiving command parameter of the contract archiving command includes the maximum contract index value of the to-be-archived contract on the local consensus sub-chain, so that the maximum contract index value of the to-be-archived contract may be used as the to-be-archived contract index value. It is to be understood that the maximum contract index value of the to-be-archived contract on the local consensus sub-chain is the to-be-archived maximum contract index value indicated by the contract archiving command, which is different from the maximum contract index value of the archiving contract on the local consensus sub-chain that is not archived. For example, the current maximum contract index value on the local consensus sub-chain is 50. In other words, the maximum contract index value that is not archived in the archiving contract on the local consensus sub-chain is 50. The contract archiving command indicates to archive the contract index value before the contract index value 30. In other words, the maximum contract index value of the to-be-archived contract in the archiving contract on the local consensus sub-chain is 30. Therefore, it may be determined that the to-be-archived contract index value is 30.

It is to be understood that if there is an archived contract index value on the local consensus sub-chain in the main chain sub-ledger database, the archived contract index value on the local consensus sub-chain may be used as the archived contract index value: and for example, if the archived contract index value on the local consensus sub-chain is n, it indicates that the contract data whose contract index value ranges from 0 to n (including n) in the archiving contract on the local consensus sub-chain has been archived, to be specific, the archived contract index value is n. It is to be understood that a contract index value between the archived contract index value and the to-be-archived contract index value may not include the archived contract index value, but includes the to-be-archived contract index value: and the contract index value between the determined archived contract index value and the to-be-archived contract index value may also be referred to as the archiving contract index value in the archiving contract.

For example, if the maximum contract index value included in the archiving command parameter indicated by the contract archiving command is 50, and the archived contract index value found in the main chain sub-ledger database is 40, contract data corresponding to a contract index value between 40 and 50 (excluding 40 and including 50) is used as the to-be-archived contract data in the archiving contract.

It is to be understood that if the archived contract index value on the local consensus sub-chain is not found in the main chain sub-ledger database, it indicates that the contract data of the archiving contract on the local consensus sub-chain is not currently archived, and then the contract data in the archiving contract may be archived starting from a difference (such as the contract index value 0) between an index value corresponding to a first contract in the archiving contract on the local consensus sub-chain and 1.

In this embodiment of this application, the local consensus node determines the to-be-archived contract index value in the archiving contract based on the archiving command parameter indicated by the contract archiving command. The to-be-archived contract index value is the maximum contract index value of the to-be-archived contract in the archiving contract: and the local consensus node searches for the archived contract index value from ledger data stored in the main chain sub-ledger database. If the archived contract index value is not found, the contract data between the difference between a first archiving index value on the local consensus sub-chain and 1 and the to-be-archived contract index value is used as the to-be-archived contract data.

It is to be understood that if the archived contract index value is not found in the contract data stored in the main chain sub-ledger database, the archived contract index value may be denoted as a specified value (for example, 0), so that the contract data corresponding to the to-be-archived contract index value in the archiving contract on the local consensus sub-chain is used as the to-be-archived contract data.

For example, if the maximum contract index value included in the archiving command parameter indicated by the contract archiving command is 50, to be specific, the to-be-archived contract index value is 50, and the contract index value of the archived local consensus block is not found in the main chain sub-ledger database, it indicates that contract archiving is not performed on the block on the local consensus sub-chain, and then contract data corresponding to the contract index value between 0 and 50 may be used as the to-be-archived contract data in the archiving contract.

It is to be understood that the local consensus node performs calculation based on the to-be-archived contract data in the archiving contract, to obtain the contract data digest. For example, a hash operation may be performed on the to-be-archived contract data, to obtain the contract data digest.

In this embodiment of this application, the local consensus node may invoke a target archiving service contract on the local consensus sub-chain, to determine the contract data digest based on the to-be-archived contract data in the archiving contract: and at least one second digest transmitting transaction is generated according to the contract data digest, and at least one second digest transmitting transaction is transmitted to the core consensus node, so that the core consensus node generates a second digest confirmation event based on the at least one second digest transmitting transaction.

It is to be understood that when invoking the target archiving service contract to determine the contract data digest, the contract data digest of the to-be-archived contract data may be determined according to a specific calculation rule: and for example, a hash operation may be performed on the to-be-archived contract data, to obtain the contract data digest, so that the core consensus node verifies whether the to-be-archived contract data in the archiving contract is successfully backed up.

It is to be understood that the second digest transmitting transaction may be a digest transmitting transaction generated according to the contract data digest. A data amount of the generated second digest transmitting transaction may be determined according to a data amount of the contract data digest. For example, one second digest transmitting transaction may be used for a target data amount of the contract data digest, and then the contract data digest may be divided into at least one according to the target data amount. Then, one second digest transmitting transaction is determined according to each piece of data, and at least one second digest transmitting transaction corresponding to at least one piece of data is obtained. It is to be understood that the local consensus node may trigger a main chain forwarding and on-chain component to transmit at least one second digest transmitting transaction to the core consensus node through the task trigger.

It is to be understood that after receiving all second digest transmitting transactions, the core consensus node generates a second digest confirmation event. The second digest confirmation event is used for indicating that the core consensus node has received the block data digest on the local consensus sub-chain.

It is to be understood that when generating the second digest confirmation event, the core consensus node may generate the second digest confirmation transaction associated with the second digest confirmation event, and package the second digest confirmation transaction into the third block, so that the second digest confirmation event may be packaged into the third block: and finally, the core consensus node writes the third block into the main chain.

It is to be understood that a transaction parameter of the second digest confirmation transaction carries a chain identifier of the local consensus sub-chain of the second digest transmitting transaction, so that the local consensus node may perform data clearing based on the chain identifier. In addition, the third block and the first block on the main chain may be different global consensus blocks, and a block height of the first block is less than a block height of the third block.

It is to be understood that before archiving the contract data of the archiving contract on the local consensus sub-chain, it is determined that the archiving contract registers a contract name and a contract index value in the main chain, and then the service object may trigger the contract archiving command to perform contract registration on the main chain. When registering a contract on the local consensus sub-chain on the main chain, the core consensus node checks a description file of a to-be-registered contract, to confirm whether the to-be-registered contract implements an archiving interface. If the to-be-registered contract does not implement the archiving interface, the core consensus node cannot subsequently archive the contract on the local consensus sub-chain that does not implement the archiving interface. It is to be understood that when the core consensus node triggers an archiving process for the contract on the local consensus sub-chain, an archiving task event indicated by each archiving configuration transaction may only be archived for one contract. In a case of archiving a plurality of contracts on a local sub-chain, the local consensus node may serially execute the contract archiving task for each contract.

S603: Synchronize the third block from the main chain, and transmit, when the second digest confirmation event is obtained by clearing from the third block, to-be-backed up contract data in the archiving contract to a remote backup device, where the remote backup device is further configured to back up the to-be-backed up contract data, to obtain contract backup information.

It is to be understood that the method for the local consensus node to clear the third block through the main chain clearing and synchronization component is similar to the method for clearing the first block. This is not repeatedly described in this embodiment of this application herein.

It is to be understood that the local consensus node may store the contract data on the local consensus sub-chain through the local consensus ledger database, and then determine the to-be-archived contract data from the local consensus ledger database: and for example, a contract identifier of the archiving contract is M1, and the to-be-archived contract data in the archiving contract is the contract data corresponding to the contract index value (30,150]. Then the contract data corresponding to the contract index value (30,150] may be determined from the contract data whose contract identifier is M1 from the local consensus ledger database.

It is to be understood that determining the to-be-backed up contract data based on the to-be-archived contract data in the archiving contract may be determining the to-be-archived contract data in the archiving contract as the to-be-backed up contract data.

It is to be understood that after receiving the to-be-backed up contract data transmitted by the local consensus node, the remote backup device may back up and store the to-be-backed up contract data. In this way, backup of the to-be-backed up contract data corresponding to the archiving block may be implemented, to transfer the local consensus data stored on the local consensus node to the remote backup device, thereby reducing storage pressure of the local consensus node.

In this embodiment of this application, in a target time period after the contract data digest is transmitted to the core consensus node, if the second digest confirmation event is not obtained by clearing through the main chain clearing and synchronization component, the contract data digest of the archiving contract is transmitted to the core consensus node again.

For example, the target time period is 10 minutes. Timing starts after the contract data digest is transmitted to the core consensus node. If the local consensus node still does not obtain the second digest confirmation event by clearing through the main chain clearing and synchronization component after 10 minutes, the block data digest of the archiving block is transmitted to the core consensus node again. It is to be understood that in an archiving process, the local consensus node backs up the to-be-backed up contract data to the remote backup device only after receiving the digest confirmation event returned by the core consensus node, reliability of uploading the contract data digest is ensured through the timeout retransmission mechanism and fault tolerance of the archiving process is improved.

S604: Forward a second backup signature transmitted by the remote backup device to the core consensus node, where the core consensus node is configured to determine, when determining that the second backup signature is generated by the remote backup device and a ledger backup data digest of the contract backup information is consistent with the contract data digest, that the to-be-backed up contract data has been backed up to the remote backup device.

It is to be understood that when using the to-be-backed up contract data after the backup processing as contract backup information, the remote backup device may generate second remote backup signature information based on the contract backup information. The second remote backup signature information may be used for indicating that the remote backup device has performed backup processing on the to-be-backed up contract data.

It is to be understood that when generating the second backup signature based on the contract backup information, the remote backup device may generate the second remote backup confirmation information based on the contract backup information, and perform signature processing on the second remote backup confirmation information by using a private key in the remote backup device, to obtain second signature information, and obtain the second backup signature based on the second remote backup confirmation information and the second signature information. The second remote backup confirmation information is the contract backup data digest determined based on the contract backup information. The method for determining the contract backup data digest may be consistent with the method for determining the contract data digest, so that the core consensus node may determine consistency based on the second remote backup confirmation information and the contract data digest.

It is to be understood that the core consensus node performs signature verification on the second backup signature, which may be performing verification on the second backup signature through a public key corresponding to the remote backup device, thereby ensuring that the second backup signature uploaded by the local consensus node is generated by the reliable remote backup device, and ensuring that the second backup signature is not tampered with.

The core consensus node compares the contract backup information corresponding to the second backup signature with the contract data digest, and may verify that the contract backup information indicated by the second backup signature has been backed up to the remote backup device.

In this embodiment of this application, if the contract backup data digest corresponding to the second remote backup confirmation information in the second backup signature is consistent with the contract data digest received by the core consensus node, it indicates that the contract backup information corresponding to the second backup signature is successfully compared with the contract data digest, and the core consensus node may determine that the to-be-backed up contract data has been backed up to the remote backup device.

It is to be understood that the core consensus node may store the received contract data digest and the second backup signature, to determine the remote backup device backed up by the contract data corresponding to the contract data digest through the public key corresponding to the second backup signature, and may found the remote backup contract information corresponding to the contract data digest from the determined remote backup device.

It is to be understood that when determining that the to-be-backed up contract data has been successfully backed up to the remote backup device, the core consensus node may further generate second backup success information, to notify the local consensus node that the to-be-backed up contract data has been successfully backed up to the remote backup device. The local consensus node clears, when receiving second backup success information returned by the core consensus node, the to-be-backed up contract data that has been backed up to the remote backup device, where the second backup success information is generated by the core consensus node when determining that the to-be-backed up contract data has been successfully backed up to the remote backup device.

It is to be understood that when clearing processing is performed on the to-be-backed up contract data that has been backed up to the remote backup device, all the to-be-backed up contract data in the local consensus node may be cleared. It is to be understood that the to-be-backed up contract data that has been backed up to the remote backup device in the local consensus node is cleared, which is equivalent to transferring some cold data in the local consensus node to the remote backup device for storage, thereby reducing storage pressure on the local consensus node.

For example, the local consensus node may synchronize the first block from the main chain through the main chain clearing and synchronization component, and obtain the ledger data related to the local consensus node by clearing. The task trigger may perform determining on detecting a type of the archiving task event when detecting that the clearing and synchronization component obtains the archiving task event by clearing. If it is determined that the archiving task command indicated by the archiving task event is a contract archiving command, the task trigger triggers a local chain transaction execution component, to invoke a corresponding target service archiving contract to determine the block data digest of the to-be-archived contract. Next, the task trigger may trigger a main chain forwarding and on-chain component, so that the main chain forwarding and on-chain component may transmit the contract data digest to the core consensus network. When transmitting the contract data digest to the core consensus network, the contract data digest may be put into at least one second digest transmitting transaction, thereby transmitting the contract data digest to the core consensus network in the form of a transaction.

The local consensus node may synchronize a third block from a main chain through a main chain clearing and synchronization component. When the main chain clearing and synchronization component obtains a digest confirmation event corresponding to the contract data digest by clearing from the third block, the task trigger may trigger the local chain transaction execution component, so that the local chain transaction execution component may invoke a corresponding target archiving service contract to determine the to-be-backed up contract data corresponding to the archiving task event. Then the task trigger may transmit the to-be-backed up contract data to the remote backup device. The remote backup device may further return one second backup signature to the local consensus node after performing backup processing on the to-be-backed up contract data. When receiving the second backup signature, the local consensus node may trigger the main chain forwarding and on-chain component through the task trigger, so that the main chain forwarding and on-chain component may upload the second backup signature to the core consensus network. The core consensus node in the core consensus network may perform consistency comparison based on the second backup signature and a contract data digest, and when the comparison succeeds, may determine that backup of the to-be-backed up contract data succeeds, and then generate second backup success information.

The local consensus node may receive the second backup success information transmitted by the core consensus node, and then may perform clearing processing on the to-be-backed up contract data based on the second backup success information.

In this embodiment of this application, the second backup success information may be packaged into a fifth block by the core consensus node, and then the local consensus node may synchronize the fifth block from the main chain through the main chain clearing and synchronization component, and obtain ledger data related to the local consensus node by clearing from the fifth block. When the local consensus node detects that the main chain clearing and synchronization component obtains the second backup success information by clearing through the task trigger, the task trigger may trigger the local chain transaction execution component, so that the local chain transaction execution component invokes a corresponding target archiving service contract to perform clearing processing on the to-be-backed up contract data.

It is to be understood that the local consensus node may clear the block synchronized from the main chain through the component clearing and synchronization component, to obtain the second backup success information, and may store the second backup success information in the main chain sub-ledger database. The second backup success information may include the contract identifier corresponding to the to-be-backed up contract data that has been backed up to the remote backup device and the maximum contract index value that has been backed up in the contract corresponding to the contract identifier. The maximum contract index value indicated by the second backup success information is equivalent to the archived contract index value in the contract (such as the contract whose contract identifier is M1) indicated by the second backup success information on the current local consensus sub-chain. Then, the next time the event that is obtained by clearing and that is archived for contract data of the same contract indicated by the second backup success information, the archived contract index value in the to-be-archived contract on the local consensus sub-chain may be found from the ledger data stored in the main chain sub-ledger database, and the archived contract index value in the to-be-archived contract on the found local consensus sub-chain may be used as the archived contract index value. For example, if a maximum contract index value of a contract M1 corresponding to the to-be-backed up contract data that has been backed up to the remote backup device included in the second backup success information is 100, the archived contract index value of the contract M1 on the current local consensus sub-chain is 100.

In this embodiment of this application, when obtaining the archiving task event by clearing from a first block through the main chain clearing and synchronization component, the local consensus node transmits a digest (such as a contract data digest) corresponding to the to-be-archived local consensus data to a core consensus node corresponding to the main chain: when a digest confirmation event is obtained by clearing from a second block through the main chain clearing and synchronization component, the to-be-archived local consensus data (such as to-be-backed up contract data) is transmitted to the remote backup device for backup: and then when receiving a second backup signature returned by the remote backup device, the local consensus node transmits the second backup signature to the core consensus node, so that when successfully comparing the digest with the second remote backup signature, the core consensus node determines that the to-be-archived local consensus data has been backed up to the remote backup device. In this way, the archiving configuration transaction may be received through the core consensus node corresponding to the main chain, and then archiving of local consensus data on the local consensus sub-chain used for performing regional service processing may be controlled, so that transactions related to service nodes in different regions may be separately archived, thereby improving controllability of the data archiving process of the blockchain and security of data archiving through collaborative archiving between multi-layer blockchains. In addition, in the data archiving process, the core consensus node may perform review on an archiving process of the local consensus data, thereby improving controllability and data security of the archiving process of the local consensus data.

In this embodiment of this application, the archiving configuration transaction submitted by the service object for the archiving task command is packaged into the first block through the core consensus node, and when the archiving configuration transaction is uploaded to the main chain, it may be ensured that the local consensus node deployed in the local consensus network of the multi-layer blockchain is synchronized from the main chain maintained by the core consensus node to the first block in which the archiving configuration transaction is packaged. Then the archiving task event associated with the archiving task command is obtained by clearing from the first block, and the archiving task command that is indicated by the archiving task event is obtained. Therefore, in this embodiment of this application, the local consensus node may be controlled to archive local consensus data (for example, contract state data stored locally by the local consensus node) of the local consensus node according to the currently obtained archiving task command through mutual cooperation between multi-layer blockchains, to implement controllability when archiving local consensus data on the local consensus sub-chain. In addition, because before backing up local contract data of the local consensus node to the remote backup device, the local consensus node uploads a digest of the locally stored contract data of the local consensus node to the main chain through the core consensus node, but not directly uploads contract data stored locally to the main chain through the core consensus node, which may ensure that the contract data executed locally by the local consensus node is not synchronized by other service nodes. Therefore, when archiving the local consensus data on the local consensus sub-chain, privacy and security of the transaction executed on the local consensus node may be ensured. In addition, in the data archiving process, the core consensus node may further compare the digest submitted by the local consensus node with the second backup signature, thereby ensuring data security of the ledger backup information backed up on the remote backup device in the archiving process of the local consensus data on the local consensus sub-chain.

Figure 19:
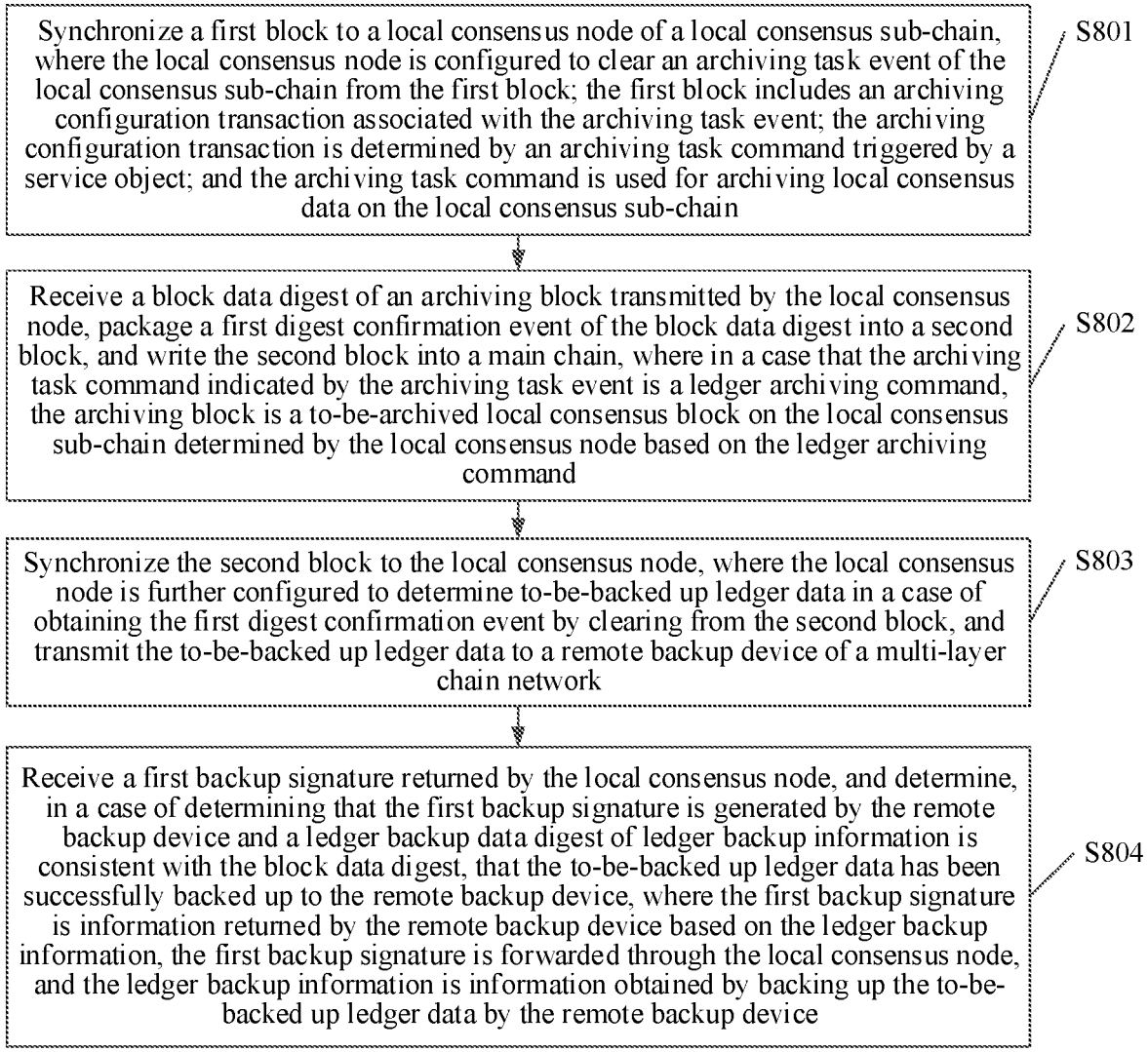
FIG. 19 is a schematic flowchart of a multi-layer blockchain data processing method according to an embodiment of this application.

An embodiment of this application provides a multi-layer blockchain data processing method. FIG. 19 is a schematic flowchart of a multi-layer blockchain data processing method according to an embodiment of this application. The method is performed by a core consensus node. The multi-layer blockchain data processing method includes step S801 to step S804. Each step will be described below.

S801: Synchronize a first block to a local consensus node of a local consensus sub-chain, where the local consensus node is configured to clear an archiving task event of the local consensus sub-chain from the first block: the first block includes an archiving configuration transaction associated with the archiving task event: the archiving configuration transaction is determined by an archiving task command triggered by a service object: and the archiving task command is used for archiving local consensus data on the local consensus sub-chain.

S802: Receive a block data digest of an archiving block transmitted by the local consensus node, package a first digest confirmation event of the block data digest into a second block, and write the second block into a main chain, where when the archiving task command indicated by the archiving task event is a ledger archiving command, the archiving block is a to-be-archived local consensus block on the local consensus sub-chain determined by the local consensus node based on the ledger archiving command.

S803: Synchronize the second block to the local consensus node, where the local consensus node is further configured to determine to-be-backed up ledger data when obtaining the first digest confirmation event by clearing from the second block, and transmit the to-be-backed up ledger data to a remote backup device of a multi-layer chain network.

S804: Receive a first backup signature returned by the local consensus node, and determine, when determining that the first backup signature is generated by the remote backup device and a ledger backup data digest of ledger backup information is consistent with the block data digest, that the to-be-backed up ledger data has been successfully backed up to the remote backup device, where the first backup signature is information returned by the remote backup device based on the ledger backup information, the first backup signature is forwarded through the local consensus node, and the ledger backup information is information obtained by backing up the to-be-backed up ledger data by the remote backup device.

Because descriptions corresponding to step S801 to step S804 are different from descriptions corresponding to step S601 to step S604, this is not repeatedly described in this embodiment of this application herein.

Figure 20:
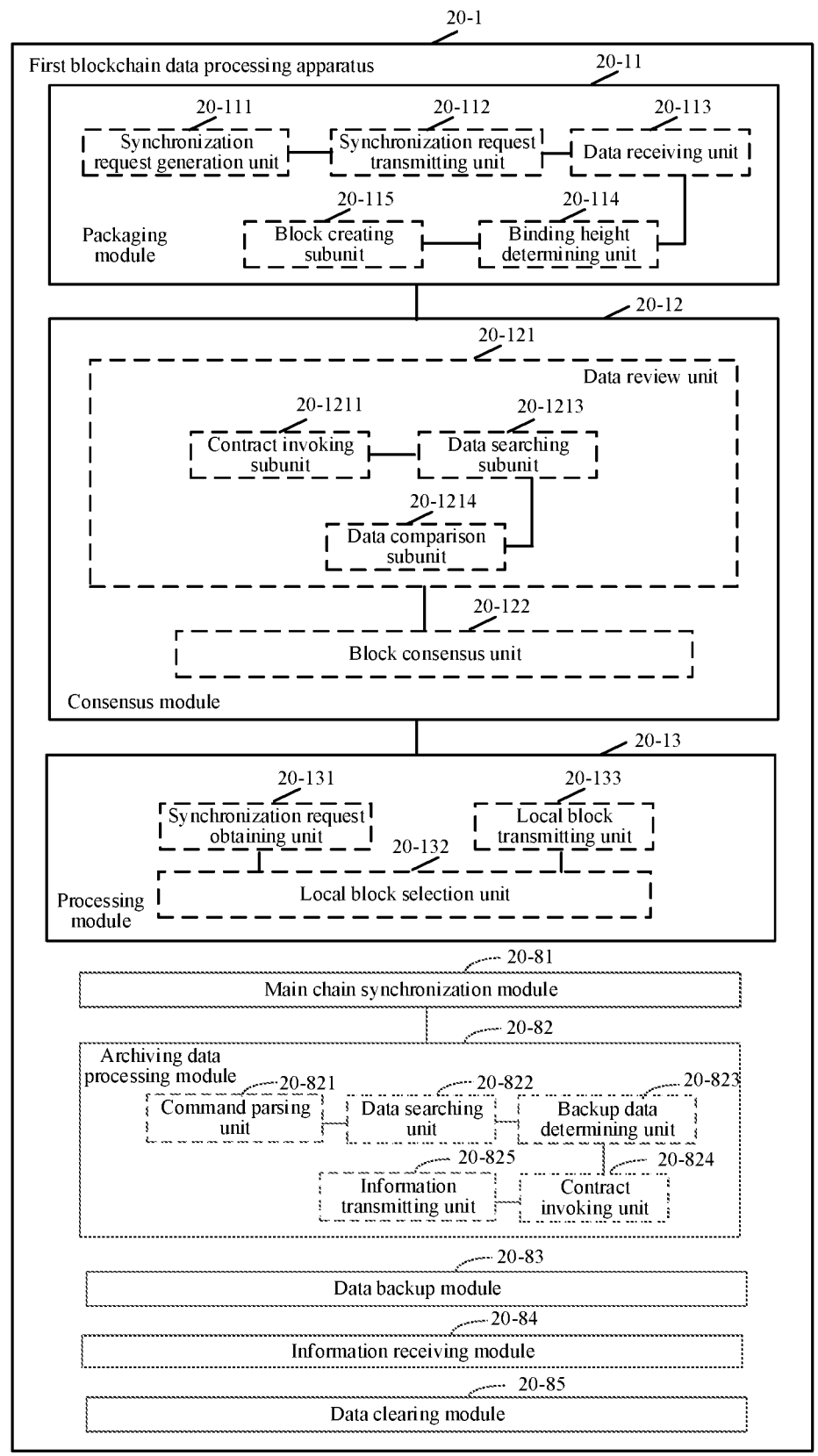
FIG. 20 is a schematic diagram of a structure of a blockchain data processing apparatus according to an embodiment of this application.

FIG. 20 is a schematic diagram of a structure of a blockchain data processing apparatus according to an embodiment of this application. As shown in FIG. 20, a first blockchain data processing apparatus 20-1 may be applied to a local consensus node, and the local consensus node may be any blockchain node in a local consensus network (for example, the local consensus network 100a). It is to be understood that the first blockchain data processing apparatus 20-1 may be one computer program (including program code) running in the blockchain node. For example, the first blockchain data processing apparatus 20-1 may be one application software: and It is to be understood that the first blockchain data processing apparatus 20-1 may be configured to perform corresponding steps in the blockchain data processing method applied to the local consensus node provided in this embodiment of this application. As shown in FIG. 20, the first blockchain data processing apparatus 20-1 may include: a packaging module 20-11, a consensus module 20-12, and a processing module 20-13, where the packaging module 20-11 is configured to package a local consensus transaction, a main chain binding height, and a main chain read dataset into a local consensus block, the local consensus transaction being a service transaction executed in the local consensus network, the main chain binding height being a block height of a first global consensus block, the first global consensus block being synchronized from a main chain of the core consensus node when packaging the local consensus transaction, the main chain read dataset being obtained by clearing from a first global contract state and being used for executing the local consensus transaction, and the first global contract state being a read dataset that is read when a global consensus transaction in the first global consensus block is executed;

the consensus module 20-12 is configured to broadcast the local consensus block to a local verification node, the local verification node being configured to obtain a voting consensus result corresponding to a transaction execution result of the local consensus transaction when a synchronized block height is greater than or equal to the main chain binding height, and a synchronized read dataset is consistent with the main chain read dataset, and the local verification node being a consensus node other than the local consensus node in the local consensus network: and the processing module 20-13 is configured to, when determining that consensus is reached based on the voting consensus result returned by the local verification node, upload the local consensus block to a local consensus sub-chain corresponding to the local consensus network, and write the local consensus block into a local consensus ledger database.

The consensus module 20-12 further includes: a data review unit 20-121 and a block consensus unit 20-122.

The data review unit 20-121 includes:

a contract invoking subunit 20-1211, configured to invoke a local consensus service contract on the local consensus sub-chain to perform data review;

a data searching subunit 20-1213, configured to obtain a target block height from a main chain sub-ledger database, where the target block height is a block height of a second global consensus block that is synchronized from the main chain through the core consensus node, and the second global consensus block is a global consensus block that is synchronized from the main chain when consensus on the local consensus block is reached; and search, when the target block height is greater than or equal to the main chain binding height, a read dataset associated with the first global consensus block in the main chain sub-ledger database, to obtain a target read dataset; and a data comparison subunit 20-1214, configured to use a key-value pair in the target read dataset as a first key-value pair, use a key-value pair in the main chain read dataset as a second key-value pair, and execute, when the first key-value pair is consistent with the second key-value pair, the local consensus transaction in the local consensus block, to obtain the transaction execution result.

The block consensus unit 20-122 is configured to cancel review of the main chain read dataset when the target block height is less than the main chain binding height: and the block consensus unit 20-122 is further configured to cancel execution of the local consensus transaction when the first key-value pair is inconsistent with the second key-value pair.

The packaging module 20-11 further includes:

a synchronization request generation unit 20-111, configured to invoke a main chain clearing and synchronization component to generate a main chain clearing and synchronization request, where the main chain clearing and synchronization request carries the block height of the first global consensus block;

a synchronization request transmitting unit 20-112, configured to transmit the main chain clearing and synchronization request to the core consensus node, where the main chain clearing and synchronization request is used for indicating the core consensus node to determine a global consensus block whose block height is greater than the block height of the first global consensus block as a global consensus block that is on the main chain and that is not synchronized to the local consensus node, and select a to-be-synchronized global block from the global consensus block that is not synchronized to the local consensus node: and a data receiving unit 20-113, configured to receive the to-be-synchronized global block returned by the core consensus node, and use the to-be-synchronized global block as the second global consensus block.

The packaging module 20-11 further includes:

a binding height determining unit 20-114, configured to obtain, when packaging the local consensus transaction, a maximum global block height and a global consensus block corresponding to the maximum global block height from the main chain through the core consensus node: and use the global consensus block corresponding to the maximum global block height as the first global consensus block, and use the maximum global block height as the main chain binding height.

The processing module 20-13 further includes:

a synchronization request obtaining unit 20-131, configured to obtain a sub-chain clearing and synchronization request transmitted by a local service node, where the local service node includes a local chain sub-ledger database, the sub-chain clearing and synchronization request carries a local block height synchronized by the local service node from the local consensus sub-chain, the local consensus sub-chain is a blockchain of the local consensus node, and the local block height is a block height of the local consensus block;

a local block selection unit 20-132, configured to determine a local consensus block whose block height is greater than the local block height on the local consensus sub-chain as a local consensus block that is not synchronized to the local service node, and select a target local block from the local consensus block that is not synchronized to the local service node: and
  a local block transmitting unit 20-133, configured to obtain a local contract state of the target local block, and return the target local block and the local contract state to the local service node, where the local service node is configured to write the target local block and the local contract state into the local chain sub-ledger database, where the local contract state is a read dataset read by executing a local consensus transaction in the target local block, and the local consensus transaction is executed by the local consensus service contract on the local consensus sub-chain of the local consensus network.

The local block selection unit 20-132 is further configured to obtain, when a maximum local block height on the local consensus sub-chain is equal to or less than the local block height, a local consensus block corresponding to the maximum local block height from the local consensus sub-chain; and use the local consensus block corresponding to the maximum local block height as the target local block.

The data receiving unit 20-113 is further configured to synchronize a target consensus block including a registration transaction from the main chain, where the registration transaction is a service transaction that applies to the core consensus node to register the local consensus sub-chain, a configuration transaction corresponding to the registration transaction is written in the target consensus block, and the configuration transaction carries configuration information: and the packaging module 20-11 further includes:
  a block creation subunit 20-115, configured to obtain the configuration information from the target consensus block, and create, when the configuration information is consistent with information configured by the local consensus node, a genesis block in the local consensus network; and start the local consensus sub-chain based on the genesis block.

The processing module 20-13 is further configured to perform transaction summarization processing on an execution result corresponding to the local consensus transaction, to obtain summarized transaction information: generate an information on-chain transaction carrying the summarized transaction information: invoke a main chain forwarding and on-chain component to generate a main chain on-chain request carrying the information on-chain transaction: and transmit the main chain on-chain request to the core consensus node, where the main chain on-chain request is used for indicating the core consensus node to write the information on-chain transaction into the main chain.

Still referring to FIG. 20, the first blockchain data processing apparatus 20-1 further includes: a main chain synchronization module 20-81, an archiving data processing module 20-82, a data backup module 20-83, and an information receiving module 20-84, where
  the main chain synchronization module 20-81 is configured to clear, when synchronizing a first block from the main chain, an archiving task event of the local consensus sub-chain from the first block, where the first block includes an archiving configuration transaction associated with the archiving task event: the archiving configuration transaction is determined by an archiving task command triggered by a service object: and the archiving task command is used for archiving local consensus data on the local consensus sub-chain;
  the archiving data processing module 20-82 is configured to transmit, when the archiving task command indicated by the archiving task event is a ledger archiving command based on the ledger archiving command, a block data digest of an archiving block on the local consensus sub-chain to the core consensus node, where the core consensus node is configured to package a first digest confirmation event of the block data digest into a second block, and write the second block into the main chain;
  the data backup module 20-83 is configured to synchronize the second block from the main chain, and when the first digest confirmation event is obtained by clearing from the second block, determine to-be-backed up ledger data based on a transaction original text in the archiving block, and transmit the to-be-backed up ledger data to a remote backup device of the multi-layer chain network, where the remote backup device is configured to back up the to-be-backed up ledger data, to obtain ledger backup information: and
  the information receiving module 20-84 is configured to forward a first backup signature transmitted by the remote backup device to the core consensus node, where the core consensus node is configured to determine, when determining that the first backup signature is generated by the remote backup device and a ledger backup data digest of the ledger backup information is consistent with the block data digest, that the to-be-backed up ledger data has been backed up to the remote backup device.

The local consensus node includes the local consensus ledger database and the main chain sub-ledger database: the local consensus ledger database is used for storing ledger data of a local consensus block on the local consensus sub-chain, the main chain sub-ledger database is used for storing ledger data associated with the local consensus node, and the stored ledger data is obtained by clearing from a synchronized global consensus block: and
  the archiving data processing module 20-82 includes: a command parsing unit 20-821, a data searching unit 20-822, a backup data determining unit 20-823, where
  the command parsing unit 20-821 is configured to read a to-be-archived block height of the local consensus sub-chain from an archiving command parameter indicated by the ledger archiving command, where the to-be-archived block height is a maximum block height of a to-be-archived local consensus block on the local consensus sub-chain;
  the data searching unit 20-822 is configured to determine an archived block height of the local consensus sub-chain from the ledger data stored in the main chain sub-ledger database, where the to-be-archived block height is greater than the archived block height: and
  the backup data determining unit 20-823 is configured to obtain an intermediate block height between the archived block height and the to-be-archived block height, and use a local consensus block corresponding to the intermediate block height as the archiving block.

The archiving data processing module 20-82 includes: a contract invoking unit 20-824 and an information transmitting unit 20-825, where
  the contract invoking unit 20-824 is configured to invoke a target archiving service contract on the local consensus sub-chain to perform processing on block data of the archiving block, to obtain the block data digest;
  the information transmitting unit 20-825 is configured to generate at least one first digest transmitting transaction according to the block data digest: and transmit the at least one first digest transmitting transaction to the core consensus node, where the core consensus node is configured to generate the first digest confirmation event based on the at least one first digest transmitting transaction.

The first blockchain data processing apparatus 20-1 further includes a data clearing module 20-85, where the data clearing module 20-85 is configured to clear, when receiving first backup success information returned by the core consensus node, the to-be-backed up ledger data that has been backed up to the remote backup device, where the first backup success information is generated by the core consensus node when determining that the to-be-backed up ledger data has been successfully backed up.

the archiving data processing module 20-82 is further configured to transmit, when the archiving task command indicated by the archiving task event is a contract archiving command based on the contract archiving command, a contract data digest of an archiving contract on the local consensus sub-chain to the core consensus node, where the core consensus node is configured to package a second digest confirmation event of the contract data digest into a third block, and write the third block into the main chain;

the data backup module 20-83 is further configured to synchronize the third block from the main chain, and transmit, when the second digest confirmation event is obtained by clearing from the third block, to-be-backed up contract data in the archiving contract to the remote backup device, where the remote backup device is further configured to back up the to-be-backed up contract data, to obtain contract backup information: and the information receiving module 20-84 is further configured to forward a second backup signature transmitted by the remote backup device to the core consensus node, where the core consensus node is configured to determine, when determining that the second backup signature is generated by the remote backup device and a ledger backup data digest of the contract backup information is consistent with the contract data digest, that the to-be-backed up contract data has been backed up to the remote backup device.

The archiving data processing module 20-82 is further configured to determine the archiving contract from the local consensus sub-chain based on a contract identifier indicated by an archiving command parameter in the contract archiving command.

The main chain sub-ledger database is further used for storing contract data associated with the local consensus node, and the stored contract data is obtained by clearing from a synchronized global consensus block; and the command parsing unit 20-821 is further configured to read, from the archiving command parameter, a to-be-archived contract index value in the archiving contract, where the to-be-archived contract index value is a maximum to-be-archived contract index value in the archiving contract;

the data searching unit 20-822 is further configured to search an archived contract index value in the archiving contract from ledger data stored in the main chain sub-ledger database, where the to-be-archived contract index value is greater than the archived contract index value;

the backup data determining unit 20-823 is further configured to determine, based on a contract index value between the archived contract index value and the to-be-archived contract index value, the to-be-backed up contract data in the archiving contract on the local consensus sub-chain.

The contract invoking unit 20-824 is further configured to invoke a target archiving service contract on the local consensus sub-chain to perform processing on the to-be-backed up contract data of the archiving contract, to obtain the contract data digest:

the information transmitting unit 20-825 is further configured to generate at least one second digest transmitting transaction according to the contract data digest: and transmit the at least one second digest transmitting transaction to the core consensus node, where the core consensus node is configured to generate the second digest confirmation event based on the at least one second digest transmitting transaction.

The information transmitting unit 20-825 is further configured to clear, when receiving second backup success information returned by the core consensus node, the to-be-backed up contract data that has been backed up to the remote backup device, where the second backup success information is generated by the core consensus node when determining that the to-be-backed up contract data has been successfully backed up.

For an implementation of the packaging module 20-11, the consensus module 20-12, the processing module 20-13, the main chain synchronization module 20-81, the archiving data processing module 20-82, the data backup module 20-83, and the information receiving module 20-84, refer to the foregoing description. This is not repeated herein. In addition, the description of the same beneficial effects of the same method is not described herein again.

Figure 21:
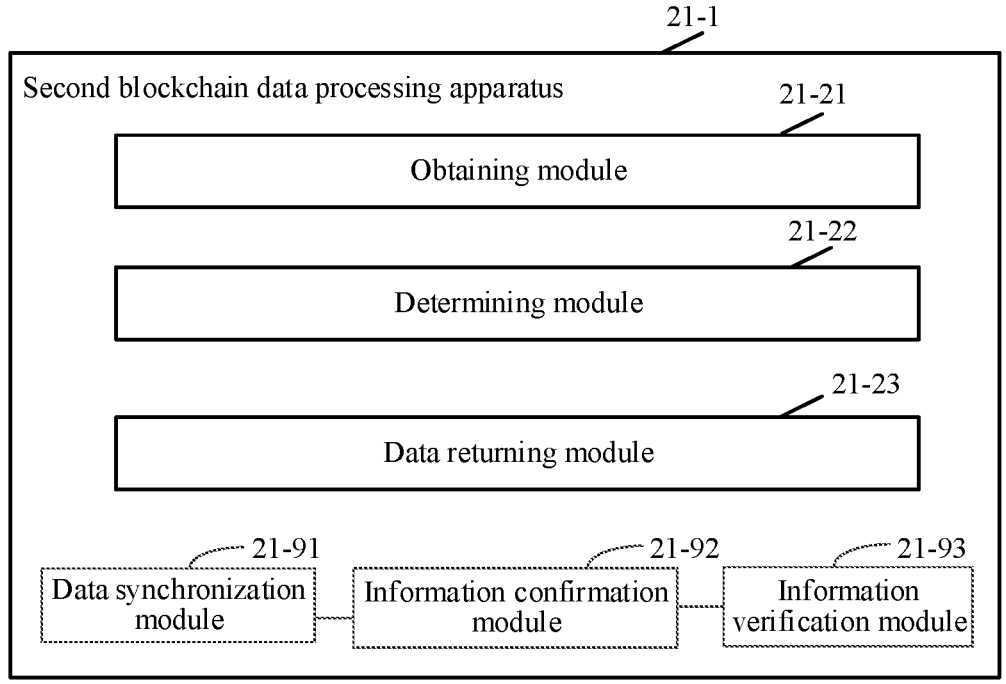
FIG. 21 is a schematic diagram of a structure of a blockchain data processing apparatus according to an embodiment of this application.

FIG. 21 is a schematic diagram of a structure of a blockchain data processing apparatus according to an embodiment of this application. As shown in FIG. 21, a second blockchain data processing apparatus 21-1 may be applied to a core consensus node. It is to be understood that the second blockchain data processing apparatus 21-1 may be one computer program (including program code) running in the blockchain node. For example, the second blockchain data processing apparatus 21-1 may be one application software; and It is to be understood that the second blockchain data processing apparatus 21-1 may be configured to perform corresponding steps in the method provided in this embodiment of this application. As shown in FIG. 21, the second blockchain data processing apparatus 21-1 may include: an obtaining module 21-21, a determining module 21-22, and a data returning module 21-23, where the obtaining module 21-21 is configured to obtain a main chain synchronization request transmitted by the local consensus node, the main chain synchronization request carrying a block height of a third global consensus block, and the third global consensus block being a global consensus block that the local consensus node synchronizes from a main chain before synchronizing a first global consensus block;

the determining module 21-22 is configured to determine, from the main chain, a global consensus block whose block height is greater than the block height of the third global consensus block as the first global consensus block that is not synchronized to the local consensus node;

the obtaining module 21-21 is further configured to obtain a first global contract state of the first global consensus block from the main chain: the first global contract state being a read dataset that is read when a global consensus transaction in the first global consensus block is executed: and the data returning module 21-23 is configured to return the first global consensus block and the first global contract state to the local consensus node, the local consensus node being configured to package a local consensus transaction, a main chain binding height, and a main chain read dataset into a local consensus block based on the block height of the first global consensus block and the first global contract state, and upload the local consensus block to the local consensus network when reaching consensus on the local consensus block based on the local consensus network.

For an implementation of the obtaining module 21-21, the determining module 21-22, and the data returning module 21-23, refer to the foregoing description. This is not repeated herein. In addition, the description of the same beneficial effects of the same method is not described herein again.

Still referring to FIG. 21, the second blockchain data processing apparatus 21-1 further includes: a data synchronization module 21-91, an information confirmation module 21-92, and an information verification module 21-93, where the data synchronization module 21-91 is configured to synchronize a first block to a local consensus node of a local consensus sub-chain, where local consensus node is configured to clear an archiving task event of the local consensus sub-chain from the first block: the first block includes an archiving configuration transaction associated with the archiving task event: the archiving configuration transaction is determined by an archiving task command triggered by a service object: and the archiving task command is used for archiving local consensus data on the local consensus sub-chain;

the information confirmation module 21-92 is configured to receive a block data digest of an archiving block transmitted by the local consensus node, package a first digest confirmation event of the block data digest into a second block, and write the second block into the main chain, where when the archiving task command indicated by the archiving task event is a ledger archiving command, the archiving block is a to-be-archived local consensus block on the local consensus sub-chain determined by the local consensus node based on the ledger archiving command;

the data synchronization module 21-91 is configured to synchronize the second block to the local consensus node, where the local consensus node is further configured to determine to-be-backed up ledger data when obtaining the first digest confirmation event by clearing from the second block, and transmit the to-be-backed up ledger data to a remote backup device of the multi-layer chain network: and the information verification module 21-93 is configured to receive a first backup signature returned by the local consensus node, and determine, when determining that the first backup signature is generated by the remote backup device and a ledger backup data digest of ledger backup information is consistent with the block data digest, that the to-be-backed up ledger data has been successfully backed up to the remote backup device, where the first backup signature is information returned by the remote backup device based on the ledger backup information, the first backup signature is forwarded through the local consensus node, and the ledger backup information is information obtained by backing up the to-be-backed up ledger data by the remote backup device.

Figure 22:
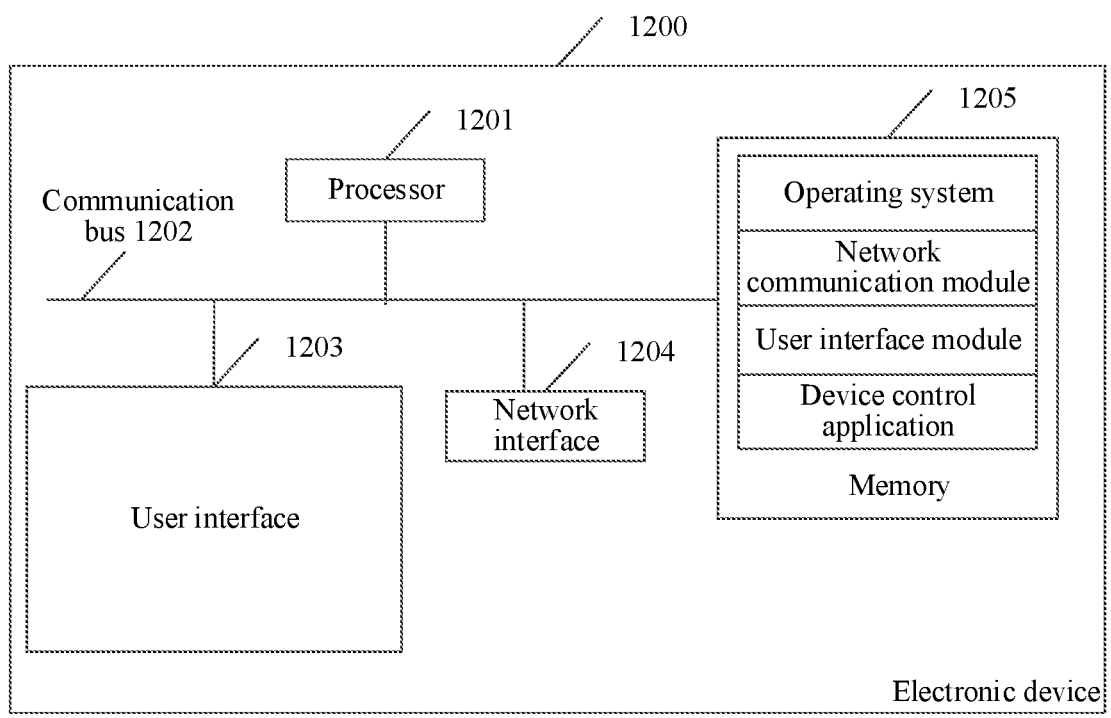
FIG. 22 is a schematic diagram of a structure of an electronic device according to an embodiment of this application.

FIG. 22 is a schematic diagram of a structure of an electronic device according to an embodiment of this application. As shown in FIG. 22, the electronic device 1200 may be a terminal or may be a server. This is not limited herein. It is to be understood that the electronic device may be a local consensus node and a core consensus node. For ease of understanding, an example in which an electronic device is used as a server is used in this embodiment of this application for description. The electronic device 1200 may include: a processor 1201, a network interface 1204, and a memory 1205. In addition, the electronic device 1200 may further include: a user interface 1203 and at least one communication bus 1202. The communication bus 1202 is configured to implement connection and communication between the components. The user interface 1203 may further include a standard wired interface and a standard wireless interface. In some embodiments, the network interface 1204 may include a standard wired interface and a standard wireless interface (such as a Wi-Fi interface). The memory 1205 may be a high-speed random access memory (RAM), or may be a non-volatile memory, for example, at least one magnetic disk memory. In some embodiments, the memory 1205 may be at least one storage apparatus that is located far away from the foregoing processor 1201. As shown in FIG. 22, the memory 1205 used as a computer storage medium may include an operating system, a network communication module, a user interface module, and a device-control application program.

The network interface 1204 in the electronic device 1200 may further provide a network communication function. In the electronic device 1200 shown in FIG. 22, the network interface 1204 may provide a network communication function: the user interface 1203 is mainly configured to provide an input interface for the user: and the processor 1201 may be configured to invoke a device control application stored in the memory 1205, to perform the blockchain data processing method applied to the local consensus node or the blockchain data processing method applied to the core consensus node provided in this embodiment of this application.

An embodiment of this application further provides a computer-readable storage medium, the computer-readable storage medium stores a computer program executed by the first blockchain data processing apparatus or the second blockchain data processing apparatus, and the computer program includes computer instructions. When executing the computer instructions, the processor may perform the blockchain data processing method applied to the local consensus node or the blockchain data processing method applied to the core consensus node provided in this embodiment of this application. In an example, the computer instructions may be deployed to be executed on one electronic device, or deployed to be executed on a plurality of electronic devices at the same location, or deployed to be executed on a plurality of electronic devices that are distributed in a plurality of locations and interconnected by a communication network. A blockchain system may be composed of a plurality of electronic devices distributed in a plurality of locations and interconnected by a communication network.

An embodiment of this application further provides a computer program product or a computer program. The computer program product or the computer program may include computer instructions, and the computer instructions may be stored in a computer-readable storage medium. A processor of a computer device reads the computer instructions from the computer-readable storage medium, and the processor may execute the computer instructions, to enable the electronic device to perform the blockchain data processing method applied to the local consensus node or the blockchain data processing method applied to the core consensus node provided in this embodiment of this application.

Figure 23:
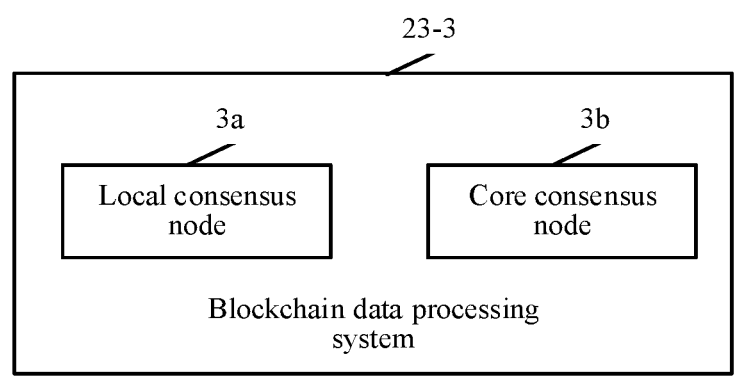
FIG. 23 is a schematic diagram of a blockchain data processing system according to an embodiment of this application.

FIG. 23 is a schematic diagram of a blockchain data processing system according to an embodiment of this application. The blockchain data processing system 23-3 may include a local consensus node 3a and a core consensus node 3b, where the local consensus node 3a may be a local consensus node in the local consensus network described in this embodiment of this application. The core consensus node 3b may be a core consensus node in the core consensus network described in this embodiment of this application.

For each step described above, and for ease of description, the foregoing method embodiments are stated as a series of action combinations. However, a person skilled in the art is to learn that this application is not limited to the described sequence of the actions because according to this application, some steps may be performed in another sequence or may be simultaneously performed. In addition, a person skilled in the art is also to learn that the embodiments described in this specification are all exemplary embodiments, and the involved actions and modules are not necessarily required to this application.

A sequence of the steps of the method in the embodiments of this application may be adjusted, and certain steps may also be combined or removed according to an actual requirement.

The modules in the apparatus in the embodiments of this application may be combined, divided, and deleted according to an actual requirement.

A person skilled in the art may understand that all or some of the procedures of the methods of the foregoing embodiments may be implemented by a computer program instructing relevant hardware. The computer program may be stored in a computer-readable storage medium. When the program is executed, the procedures of the foregoing method embodiments may be implemented. The storage medium may be a magnetic disc, an optical disc, a read-only memory (ROM), or the like.

In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit. What are disclosed above are merely examples of embodiments of this application, and certainly are not intended to limit the protection scope of this application. Therefore, equivalent variations made in accordance with the claims of this application shall fall within the scope of this application.

What is claimed is:

1. A blockchain data processing method, performed by an electronic device acting as a local consensus node in a local consensus network, the method comprising:

packaging a local consensus transaction, a main chain binding height, and a main chain read dataset into a local consensus block, the local consensus transaction being a service transaction executed in the local consensus network, wherein the local consensus network is deployed in a service network of a multi-layer chain network, and a core consensus network comprising a core consensus node is deployed in the multi-layer chain network and independent of the service network, and the main chain binding height being a block height of a first global consensus block, the first global consensus block being synchronized from a main chain of the core consensus node when packaging the local consensus transaction, the main chain read dataset being obtained by clearing from a first global contract state and being used for executing the local consensus transaction, and the first global contract state being a read dataset that is read when a global consensus transaction in the first global consensus block is executed;

broadcasting the local consensus block to a local verification node, the local verification node being configured to obtain a voting consensus result corresponding to a transaction execution result of the local consensus transaction when a synchronized block height is greater than or equal to the main chain binding height, and a synchronized read dataset is consistent with the main chain read dataset, and the local verification node being a consensus node other than the local consensus node in the local consensus network;

when determining that consensus is reached based on the voting consensus result returned by the local verification node, uploading the local consensus block to a local consensus sub-chain corresponding to the local consensus network, and writing the local consensus block into a local consensus ledger database;

invoking a local consensus service contract on the local consensus sub-chain to perform the following processing:

obtaining a target block height from a main chain sub-ledger database, wherein the target block height is a block height of a second global consensus block that is synchronized from the main chain through the core consensus node, and the second global consensus block is a global consensus block that is synchronized from the main chain when consensus on the local consensus block is reached;

searching, when the target block height is greater than or equal to the main chain binding height, a read dataset associated with the first global consensus block in the main chain sub-ledger database, to obtain a target read dataset; and using a key-value pair in the target read dataset as a first key-value pair, using a key-value pair in the main chain read dataset as a second key-value pair, and executing, when the first key-value pair is consistent with the second key-value pair, the local consensus transaction in the local consensus block, to obtain the transaction execution result.

2. The method according to claim 1, wherein after the obtaining a target block height from a main chain sub-ledger database, the method further comprises:

canceling review of the main chain read dataset when the target block height is less than the main chain binding height.

3. The method according to claim 1, wherein after the using a key-value pair in the target read dataset as a first key-value pair, and using a key-value pair in the main chain read dataset as a second key-value pair, the method further comprises:

canceling execution of the local consensus transaction when the first key-value pair is inconsistent with the second key-value pair.

4. The method according to claim 1, wherein the method further comprises:

invoking a main chain clearing and synchronization component to generate a main chain clearing and synchronization request, wherein the main chain clearing and synchronization request carries the block height of the first global consensus block;

transmitting the main chain clearing and synchronization request to the core consensus node, wherein the main chain clearing and synchronization request is used for indicating the core consensus node to determine a global consensus block whose block height is greater than the block height of the first global consensus block as a global consensus block that is on the main chain and that is not synchronized to the local consensus node, and select a to-be-synchronized global block from the global consensus block that is not synchronized to the local consensus node; and receiving the to-be-synchronized global block returned by the core consensus node, and using the to-be-synchronized global block as the second global consensus block.

5. The method according to claim 1, wherein the method further comprises:

obtaining, when packaging the local consensus transaction, a maximum global block height and a global consensus block corresponding to the maximum global block height from the main chain through the core consensus node; and using the global consensus block corresponding to the maximum global block height as the first global consensus block, and using the maximum global block height as the main chain binding height.

6. The method according to claim 1, wherein the method further comprises:

obtaining a sub-chain clearing and synchronization request transmitted by a local service node, wherein the local service node comprises a local chain sub-ledger database, the sub-chain clearing and synchronization request carries a local block height synchronized by the local service node from the local consensus sub-chain, the local consensus sub-chain is a blockchain of the local consensus node, and the local block height is a block height of the local consensus block;

determining a local consensus block whose block height is greater than the local block height on the local consensus sub-chain as a local consensus block that is not synchronized to the local service node, and selecting a target local block from the local consensus block that is not synchronized to the local service node; and obtaining a local contract state of the target local block, and returning the target local block and the local contract state to the local service node, wherein the local service node is configured to write the target local block and the local contract state into the local chain sub-ledger database, wherein the local contract state is a read dataset read by executing a local consensus transaction in the target local block, and the local consensus transaction is executed by the local consensus service contract on the local consensus sub-chain of the local consensus network.

7. The method according to claim 1, wherein the method further comprises:

synchronizing a target consensus block comprising a registration transaction from the main chain, wherein the registration transaction is a service transaction that applies to the core consensus node to register the local consensus sub-chain, a configuration transaction corresponding to the registration transaction is written in the target consensus block, and the configuration transaction carries configuration information;

obtaining the configuration information from the target consensus block, and creating, when the configuration information is consistent with information configured by the local consensus node, a genesis block in the local consensus network; and starting the local consensus sub-chain based on the genesis block.

8. The method according to claim 1, wherein the method further comprises:

clearing, when synchronizing a first block from the main chain, an archiving task event of the local consensus sub-chain from the first block, wherein the first block comprises an archiving configuration transaction associated with the archiving task event; the archiving configuration transaction is determined by an archiving task command triggered by a service object; and the archiving task command is used for archiving local consensus data on the local consensus sub-chain;

transmitting, when the archiving task command indicated by the archiving task event is a ledger archiving command based on the ledger archiving command, a block data digest of an archiving block on the local consensus sub-chain to the core consensus node, wherein the core consensus node is configured to package packaging a first digest confirmation event of the block data digest into a second block, and writing the second block into the main chain;

synchronizing the second block from the main chain, and when the first digest confirmation event is obtained by clearing from the second block, determining to-be-backed up ledger data based on a transaction original text in the archiving block, and transmitting the to-be-backed up ledger data to a remote backup device of the multi-layer chain network, wherein the remote backup device is configured to back up the to-be-backed up ledger data, to obtain ledger backup information; and forwarding a first backup signature transmitted by the remote backup device to the core consensus node, wherein the core consensus node is configured to determine, when determining that the first backup signature is generated by the remote backup device and a ledger backup data digest of the ledger backup information is consistent with the block data digest, that the to-be-backed up ledger data has been backed up to the remote backup device.

9. An electronic device acting as a local consensus node in a local consensus network, the electronic device comprising a processor and a memory, the memory being connected to the processor, the memory being configured to store a computer program, and the processor being configured to invoke the computer program, to enable the electronic device to perform a blockchain data processing method including:

packaging a local consensus transaction, a main chain binding height, and a main chain read dataset into a local consensus block, the local consensus transaction being a service transaction executed in the local consensus network, wherein the local consensus network is deployed in a service network of a multi-layer chain network, and a core consensus network comprising a core consensus node is deployed in the multi-layer chain network and independent of the service network, and the main chain binding height being a block height of a first global consensus block, the first global consensus block being synchronized from a main chain of the core consensus node when packaging the local consensus transaction, the main chain read dataset being obtained by clearing from a first global contract state and being used for executing the local consensus transaction, and the first global contract state being a read dataset that is read when a global consensus transaction in the first global consensus block is executed;

broadcasting the local consensus block to a local verification node, the local verification node being configured to obtain a voting consensus result corresponding to a transaction execution result of the local consensus transaction when a synchronized block height is greater than or equal to the main chain binding height, and a synchronized read dataset is consistent with the main chain read dataset, and the local verification node being a consensus node other than the local consensus node in the local consensus network;

when determining that consensus is reached based on the voting consensus result returned by the local verification node, uploading the local consensus block to a local consensus sub-chain corresponding to the local consensus network, and writing the local consensus block into a local consensus ledger database;

invoking a local consensus service contract on the local consensus sub-chain to perform the following processing:

obtaining a target block height from a main chain sub-ledger database, wherein the target block height is a block height of a second global consensus block that is synchronized from the main chain through the core consensus node, and the second global consensus block is a global consensus block that is synchronized from the main chain when consensus on the local consensus block is reached;

searching, when the target block height is greater than or equal to the main chain binding height, a read dataset associated with the first global consensus block in the main chain sub-ledger database, to obtain a target read dataset; and using a key-value pair in the target read dataset as a first key-value pair, using a key-value pair in the main chain read dataset as a second key-value pair, and executing, when the first key-value pair is consistent with the second key-value pair, the local consensus transaction in the local consensus block, to obtain the transaction execution result.

10. The electronic device according to claim 9, wherein after the obtaining a target block height from a main chain sub-ledger database, the method further comprises:

canceling review of the main chain read dataset when the target block height is less than the main chain binding height.

11. The electronic device according to claim 9, wherein after the using a key-value pair in the target read dataset as a first key-value pair, and using a key-value pair in the main chain read dataset as a second key-value pair, the method further comprises:

canceling execution of the local consensus transaction when the first key-value pair is inconsistent with the second key-value pair.

12. The electronic device according to claim 9, wherein the method further comprises:

invoking a main chain clearing and synchronization component to generate a main chain clearing and synchronization request, wherein the main chain clearing and synchronization request carries the block height of the first global consensus block;

transmitting the main chain clearing and synchronization request to the core consensus node, wherein the main chain clearing and synchronization request is used for indicating the core consensus node to determine a global consensus block whose block height is greater than the block height of the first global consensus block as a global consensus block that is on the main chain and that is not synchronized to the local consensus node, and select a to-be-synchronized global block from the global consensus block that is not synchronized to the local consensus node; and receiving the to-be-synchronized global block returned by the core consensus node, and using the to-be-synchronized global block as the second global consensus block.

13. The electronic device according to claim 9, wherein the method further comprises:

obtaining, when packaging the local consensus transaction, a maximum global block height and a global consensus block corresponding to the maximum global block height from the main chain through the core consensus node; and using the global consensus block corresponding to the maximum global block height as the first global consensus block, and using the maximum global block height as the main chain binding height.

14. The electronic device according to claim 9, wherein the method further comprises:

obtaining a sub-chain clearing and synchronization request transmitted by a local service node, wherein the local service node comprises a local chain sub-ledger database, the sub-chain clearing and synchronization request carries a local block height synchronized by the local service node from the local consensus sub-chain, the local consensus sub-chain is a blockchain of the local consensus node, and the local block height is a block height of the local consensus block;

determining a local consensus block whose block height is greater than the local block height on the local consensus sub-chain as a local consensus block that is not synchronized to the local service node, and selecting a target local block from the local consensus block that is not synchronized to the local service node; and obtaining a local contract state of the target local block, and returning the target local block and the local contract state to the local service node, wherein the local service node is configured to write the target local block and the local contract state into the local chain sub-ledger database, wherein the local contract state is a read dataset read by executing a local consensus transaction in the target local block, and the local consensus transaction is executed by the local consensus service contract on the local consensus sub-chain of the local consensus network.

15. The electronic device according to claim 9, wherein the method further comprises:

synchronizing a target consensus block comprising a registration transaction from the main chain, wherein the registration transaction is a service transaction that applies to the core consensus node to register the local consensus sub-chain, a configuration transaction corresponding to the registration transaction is written in the target consensus block, and the configuration transaction carries configuration information;

obtaining the configuration information from the target consensus block, and creating, when the configuration information is consistent with information configured by the local consensus node, a genesis block in the local consensus network; and starting the local consensus sub-chain based on the genesis block.

16. The electronic device according to claim 9, wherein the method further comprises:

clearing, when synchronizing a first block from the main chain, an archiving task event of the local consensus sub-chain from the first block, wherein the first block comprises an archiving configuration transaction associated with the archiving task event; the archiving configuration transaction is determined by an archiving task command triggered by a service object; and the archiving task command is used for archiving local consensus data on the local consensus sub-chain;

transmitting, when the archiving task command indicated by the archiving task event is a ledger archiving command based on the ledger archiving command, a block data digest of an archiving block on the local consensus sub-chain to the core consensus node, wherein the core consensus node is configured to package packaging a first digest confirmation event of the block data digest into a second block, and writing the second block into the main chain;

synchronizing the second block from the main chain, and when the first digest confirmation event is obtained by clearing from the second block, determining to-be-backed up ledger data based on a transaction original text in the archiving block, and transmitting the to-be-backed up ledger data to a remote backup device of the multi-layer chain network, wherein the remote backup device is configured to back up the to-be-backed up ledger data, to obtain ledger backup information; and forwarding a first backup signature transmitted by the remote backup device to the core consensus node, wherein the core consensus node is configured to determine, when determining that the first backup signature is generated by the remote backup device and a ledger backup data digest of the ledger backup information is consistent with the block data digest, that the to-be-backed up ledger data has been backed up to the remote backup device.

17. A non-transitory computer-readable storage medium, storing a computer program, the computer program that, when executed by a processor of an electronic device acting as a local consensus node in a local consensus network, enabling the electronic device to perform a blockchain data processing method including:

packaging a local consensus transaction, a main chain binding height, and a main chain read dataset into a local consensus block, the local consensus transaction being a service transaction executed in the local consensus network, wherein the local consensus network is deployed in a service network of a multi-layer chain network, and a core consensus network comprising a core consensus node is deployed in the multi-layer chain network and independent of the service network, and the main chain binding height being a block height of a first global consensus block, the first global consensus block being synchronized from a main chain of the core consensus node when packaging the local consensus transaction, the main chain read dataset being obtained by clearing from a first global contract state and being used for executing the local consensus transaction, and the first global contract state being a read dataset that is read when a global consensus transaction in the first global consensus block is executed;

broadcasting the local consensus block to a local verification node, the local verification node being configured to obtain a voting consensus result corresponding to a transaction execution result of the local consensus transaction when a synchronized block height is greater than or equal to the main chain binding height, and a synchronized read dataset is consistent with the main chain read dataset, and the local verification node being a consensus node other than the local consensus node in the local consensus network;

when determining that consensus is reached based on the voting consensus result returned by the local verification node, uploading the local consensus block to a local consensus sub-chain corresponding to the local consensus network, and writing the local consensus block into a local consensus ledger database;

invoking a local consensus service contract on the local consensus sub-chain to perform the following processing:

obtaining a target block height from a main chain sub-ledger database, wherein the target block height is a block height of a second global consensus block that is synchronized from the main chain through the core consensus node, and the second global consensus block is a global consensus block that is synchronized from the main chain when consensus on the local consensus block is reached;

searching, when the target block height is greater than or equal to the main chain binding height, a read dataset associated with the first global consensus block in the main chain sub-ledger database, to obtain a target read dataset; and using a key-value pair in the target read dataset as a first key-value pair, using a key-value pair in the main chain read dataset as a second key-value pair, and executing, when the first key-value pair is consistent with the second key-value pair, the local consensus transaction in the local consensus block, to obtain the transaction execution result.

18. The non-transitory computer-readable storage medium according to claim 17, wherein the method further comprises:

obtaining, when packaging the local consensus transaction, a maximum global block height and a global consensus block corresponding to the maximum global block height from the main chain through the core consensus node; and using the global consensus block corresponding to the maximum global block height as the first global consensus block, and using the maximum global block height as the main chain binding height.

19. The non-transitory computer-readable storage medium according to claim 17, wherein the method further comprises:

obtaining a sub-chain clearing and synchronization request transmitted by a local service node, wherein the local service node comprises a local chain sub-ledger database, the sub-chain clearing and synchronization request carries a local block height synchronized by the local service node from the local consensus sub-chain, the local consensus sub-chain is a blockchain of the local consensus node, and the local block height is a block height of the local consensus block;

determining a local consensus block whose block height is greater than the local block height on the local consensus sub-chain as a local consensus block that is not synchronized to the local service node, and selecting a target local block from the local consensus block that is not synchronized to the local service node; and obtaining a local contract state of the target local block, and returning the target local block and the local contract state to the local service node, wherein the local service node is configured to write the target local block and the local contract state into the local chain sub-ledger database, wherein the local contract state is a read dataset read by executing a local consensus transaction in the target local block, and the local consensus transaction is executed by the local consensus service contract on the local consensus sub-chain of the local consensus network.

20. The non-transitory computer-readable storage medium according to claim 17, wherein the method further comprises:

synchronizing a target consensus block comprising a registration transaction from the main chain, wherein the registration transaction is a service transaction that applies to the core consensus node to register the local consensus sub-chain, a configuration transaction corresponding to the registration transaction is written in the target consensus block, and the configuration transaction carries configuration information;

obtaining the configuration information from the target consensus block, and creating, when the configuration information is consistent with information configured by the local consensus node, a genesis block in the local consensus network; and starting the local consensus sub-chain based on the genesis block.

* * * * *